United States Patent [19]
Nishimura et al.

[11] Patent Number: 5,235,599
[45] Date of Patent: Aug. 10, 1993

[54] SELF-HEALING NETWORK WITH DISTRIBUTED FAILURE RESTORATION CAPABILITIES

[75] Inventors: Yasuyo Nishimura; Hideki Sakauchi; Satoshi Hasegawa, all of Tokyo, Japan

[73] Assignee: NEC Corporation, Tokyo, Japan

[21] Appl. No.: 556,718

[22] Filed: Jul. 26, 1990

[30] Foreign Application Priority Data

| Jul. 26, 1989 | [JP] | Japan | 1-194969 |
| Sep. 29, 1989 | [JP] | Japan | 1-254114 |
| Jul. 5, 1990 | [JP] | Japan | 1-178131 |

[51] Int. Cl.$^5$ .............................................. G06F 11/00
[52] U.S. Cl. ...................... 371/11.2; 371/8.2; 370/16; 370/16.1; 370/85.9; 340/825.01; 340/825.03; 340/827
[58] Field of Search ............... 371/11.2, 8.2; 370/16, 370/16.1, 85.9; 340/825.01, 825.03, 827

[56] References Cited

U.S. PATENT DOCUMENTS 4,974,224 11/1990 Boone .................... 370/16 X
5,040,170 8/1991 Upp ....................... 370/99 X

FOREIGN PATENT DOCUMENTS 3-58541 3/1991 Japan .

*Primary Examiner*—Robert W. Beausoliel, Jr.
*Assistant Examiner*—Ly V. Hua
*Attorney, Agent, or Firm*—Foley & Lardner

[57] ABSTRACT

In the event of a failure on a transmission line, a sender, or a terminal node of the failed line, broadcasts CONTROL packets to each of all adjacent tandem nodes, containing a hop count and node trace data. In response to a CONTROL packet, each tandem node increments the hop count of the packet, updates its node trace data, makes a record of all arriving CONTROL packets, and broadcasts copies of each arriving CONTROL packet to adjacent nodes if the hop count is smaller than a prescribed value. A chooser, which is the other terminal node of the failed line, responds to CONTROL packets from a given node for sending back to the given node as many RETURN packets as there are failed channels. Each tandem node makes a record of all arriving RETURN packets, checks the node trace data of each RETURN packet against that of the CONTROL packets in the record to detect if there is a spare channel to an adjacent node on a route to the sender with a least hop count, transmits each RETURN packet to it if a spare channel is detected, or causes retransmission of a RETURN packet from the chooser to another tandem node if no spare channel is detected. The sender responds to each RETURN packet by switching a link from a failed channel to a spare channel indicated by the packet. An END packet is sent back from the sender to each tandem node along which the RETURN packet travelled between the chooser to the sender. On reaching the chooser, the END packet is used to switch a link from a failed channel to a spare channel indicated by the received END packet.

52 Claims, 23 Drawing Sheets

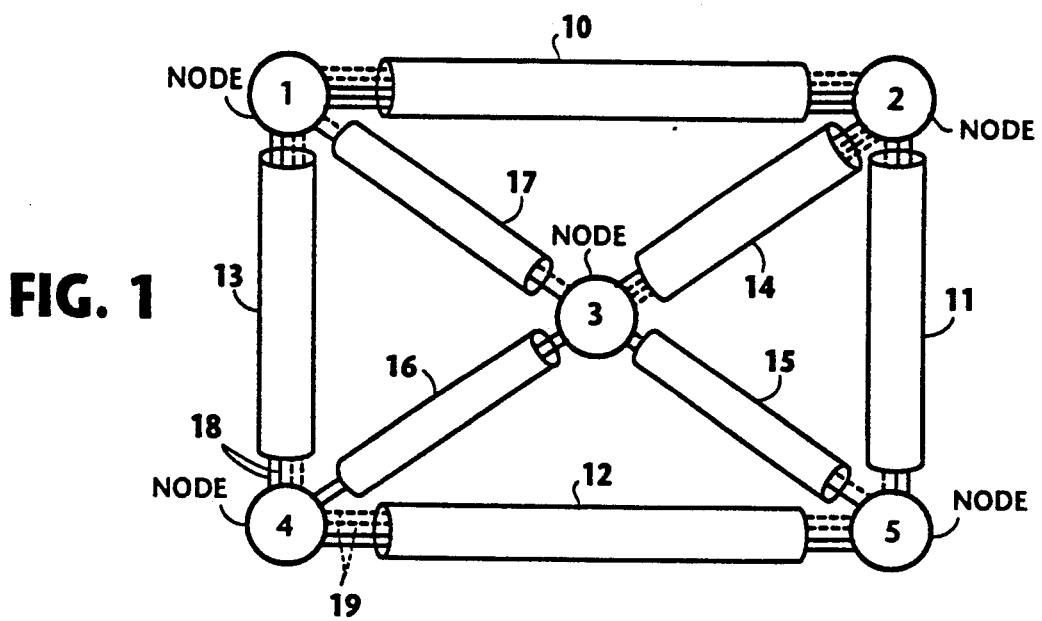

| CONTROL PACKET | PACKET TYPE | NODE TRACE | HOP COUNT | FAILED LINE ID | XMT LINE ID | PRIORITY | |
|---|---|---|---|---|---|---|---|
| RETURN PACKET | PACKET TYPE | SERIAL NO. | NODE TRACE | FAILED LINE ID | XMT LINE ID | RSRVD CHA. ID | PRIORITY |
| END PACKET | PACKET TYPE | RET-PACKET SERIAL NO. | FAILED LINE ID | XMT LINE ID | ASGND FAULTY CHA. ID | ASGND SPARE CHA. ID | |
| ACK/NAK PACKET | PACKET TYPE | RET-PACKET SERIAL NO. | NODE TRACE | FAILED LINE ID | XMT LINE ID | RSRVD CHA. ID | |

FIG. 3

CHANNEL TABLE

| | LC #1 | LC #2 | LC #3 | | LC #(N-1) | LC #N |
|---|---|---|---|---|---|---|
| SPARE | | | | | | |
| RESERVED | | | | | | |
| USED | | | | | | |
| FAILED | | | | | | |

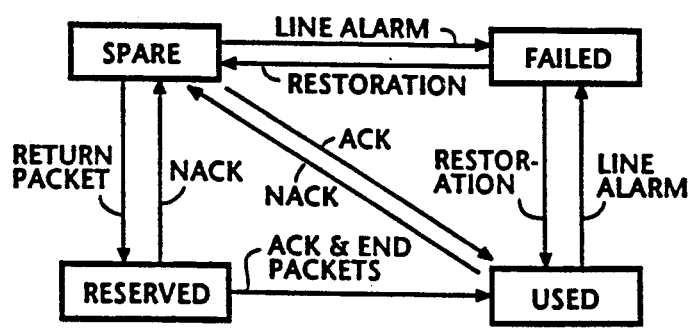

FIG. 4

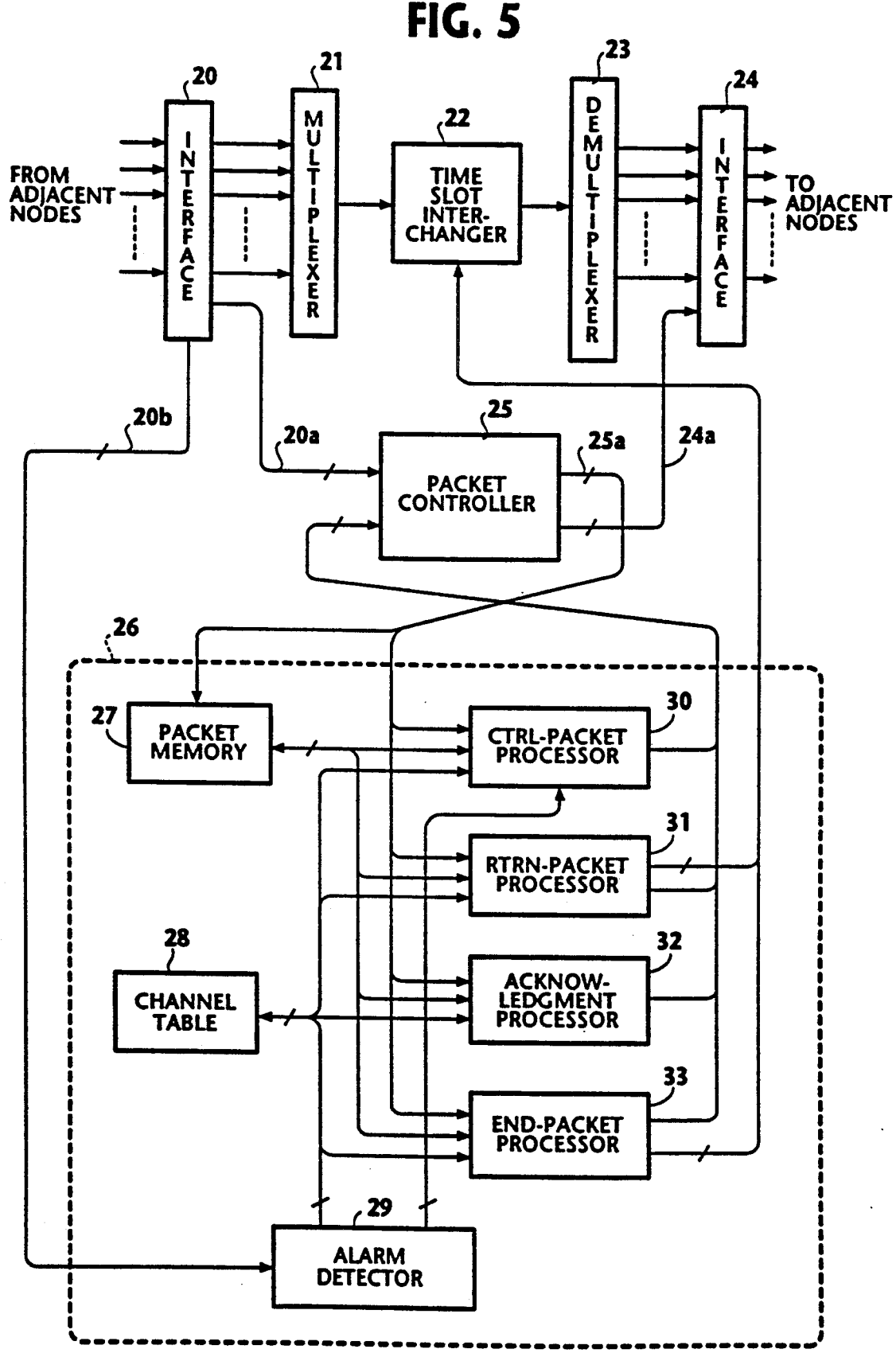

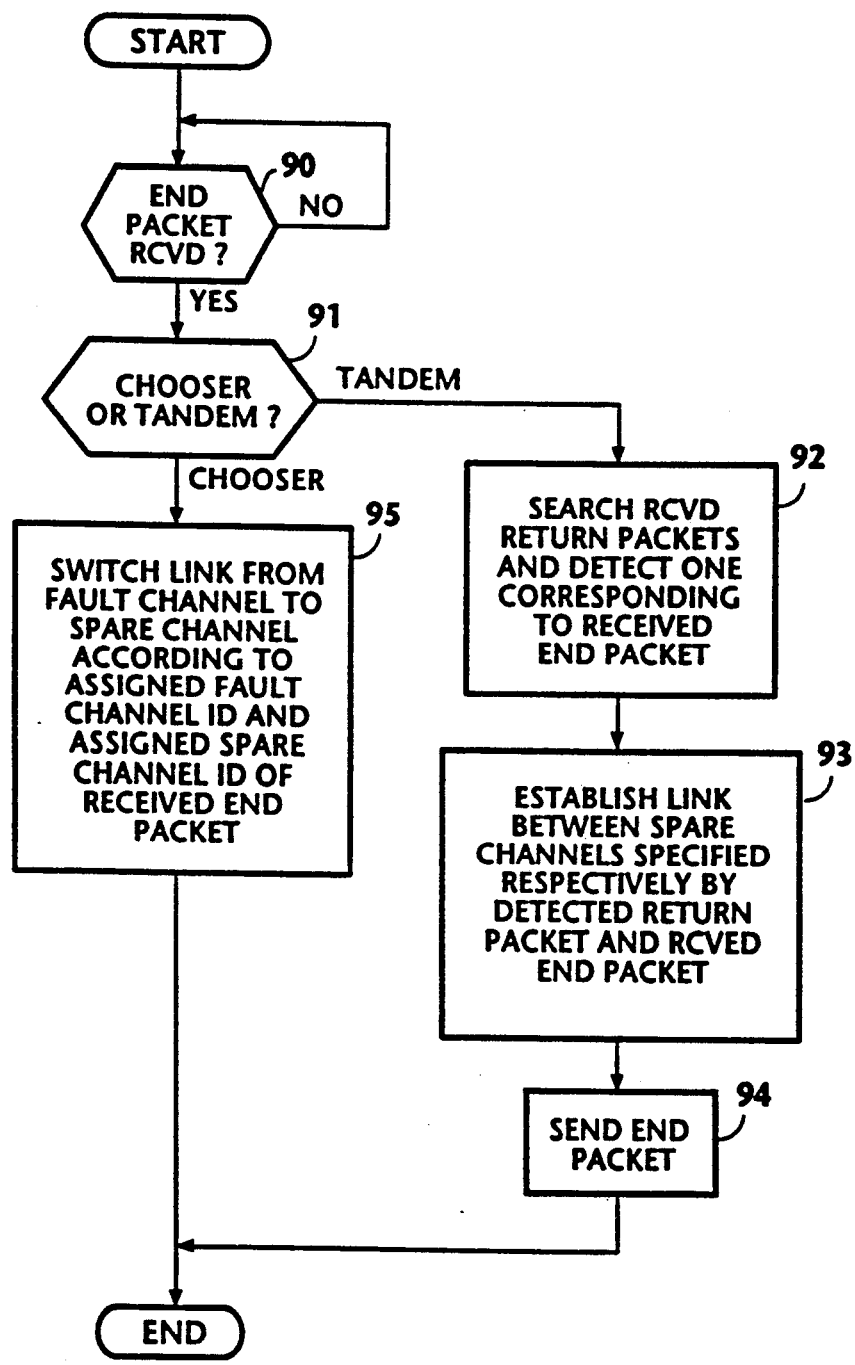

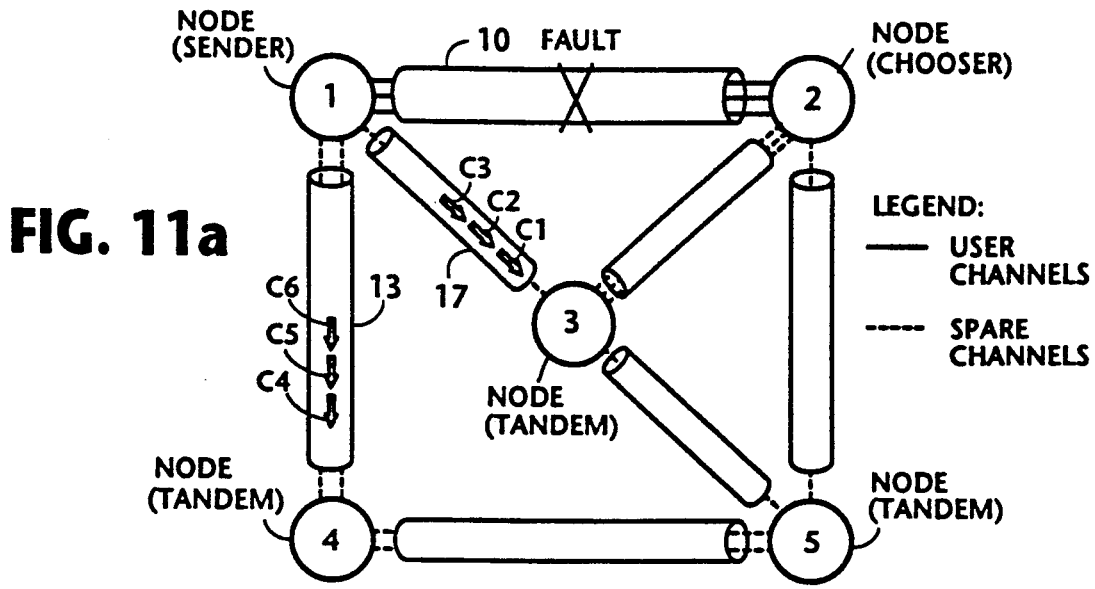
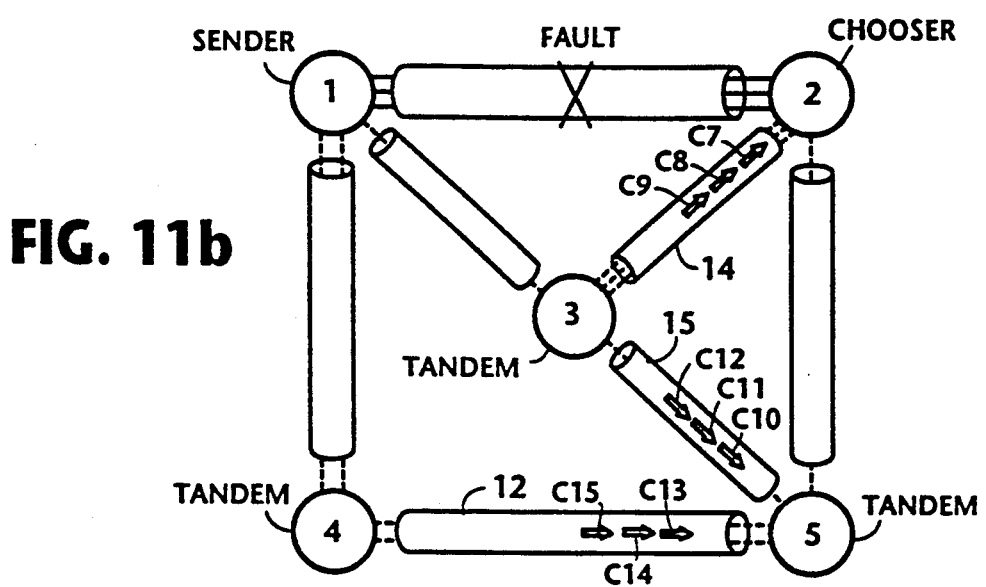
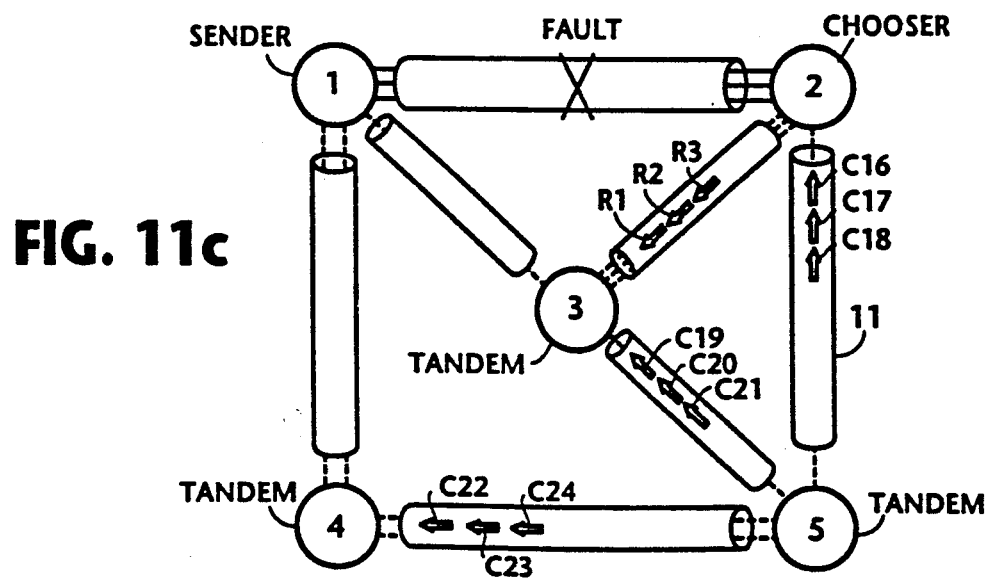

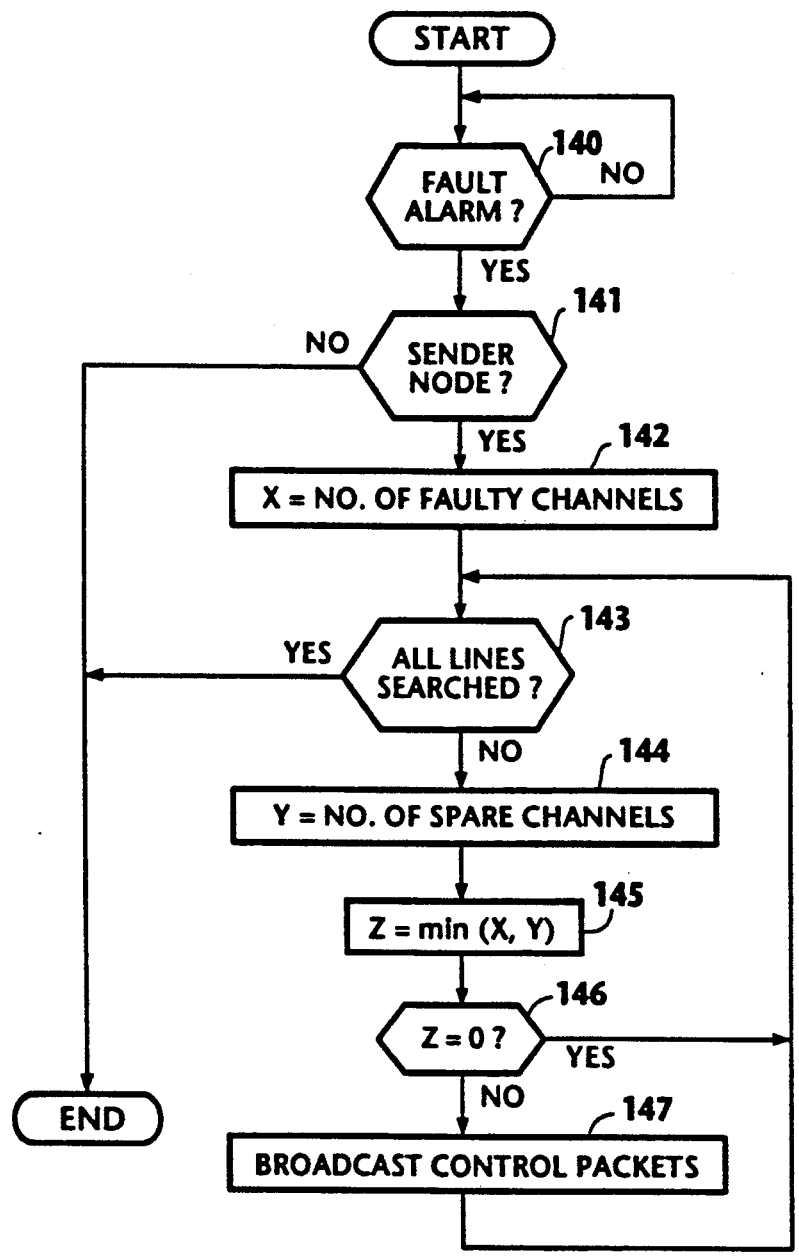

SELF-HEALING NETWORK WITH DISTRIBUTED FAILURE RESTORATION CAPABILITIES

BACKGROUND OF THE INVENTION

The present invention relates generally to communications systems, and more specifically to a failure restoration method and a self-healing communications network with distributed automatic rerouting capabilities upon occurrence of a failure.

Known self-healing techniques are divided broadly into two classes. One is a centralized control system that provides overall rerouting control from the central location of a network. In this approach, the rerouting algorithm and the establishing of alarm collection times become increasingly complex as the number of failed channels increases, and a substantial amount of time will be taken to collect alarm signals and to transfer rerouting information should a large number of channels of a multiplexed transmission system fail. The other is a distributed approach in which the rerouting functions are provided by distributed points of the network. The following papers on distributed rerouting approach have been published:

Document 1: W. D. Grover, "The Selfhealing Network", Proceedings of Grobecom '87, November 1987.

Document 2: H. C. Yang and S. Hasegawa, "Fitness: Failure Immunization Technology For Network Service Survivability", Proceedings of Globecom '88, December 1988.

Document 3: H. R. Amirazizi, "Controlling Synchronous Networks With Digital Cross-Connect Systems", Proceedings of Globecom '88, December 1988.

Document 1 is concerned with a restoration technique for failures in a single transmission system, and Document 2 relates to a "multiple-wave" approach in which route-finding packets are broadcast in multiple wave fashion in search of a maximum bandwidth until alternate routes having the necessary bandwidth are established. One shortcoming of this multiple wave approach is that it takes a long recovery time. Document 3 also relates to fault recovery for single transmission systems and has a disadvantage in that route-finding packets tend to form a loop and hence a delay is likely to be encountered.

SUMMARY OF THE INVENTION

It is therefore an object of the present invention to provide a self-healing communications network which can be recovered from a failure in a short period of time even if the failure has occurred in a multiplexed transmission line.

According to a broader aspect of the present invention, there is provided a failure restoration method for a communications network having first and second nodes and a plurality of third, intermediate nodes, where the first, second and third nodes are interconnected by lines having regular channels and spare channels. The third nodes are located between the first and second nodes. The regular and spare channels terminate at the first and second nodes. In response to a failure in regular channels terminating at the first node, the first node transmits as many CONTROL packets as there are failed regular channels to adjacent ones of the third nodes, and each third node receiving a CONTROL packet broadcasts copies of the received CONTROL packet to adjacent nodes. The second node is responsive to each copy of CONTROL packets arriving thereat for transmitting a RETURN packet to a given third node. In response, the given third node determines whether there is a spare channel to an adjacent node located on a route leading to the first node, and transmits a copy of the received RETURN packet to the adjacent node if a spare channel is detected, or returns a negative acknowledgment packet on a line through which the received RETURN packet was transmitted to cause retransmission of a RETURN packet to another third node if no spare channel is detected. The first node is responsive to receipt of each copy of RETURN packet for switching a link of the node from one of the failed channels to a spare channel extending to the given third node to thereby establish a switched channel, and transmits an END packet to the switched channel. The given third node is responsive to receipt of the END packet for establishing a new link through the switched channel and a spare channel to the second node, and transmits a copy of the received END packet to the second node through the new link. The second node responds to receipt of each copy of END packet by switching a link of the node from a failed channel to the new link.

According to a first specific aspect of the present invention, there is provided a self-healing communications network having a plurality of nodes interconnected by regular and spare channels. In the network, two of the nodes are terminal nodes which are respectively identified as a first, or "sender" node and a second, or "chooser" node when a line failure occurs between them, and the other nodes are identified as third, or "tandem" nodes to set up links between spare channels to establish alternate routes between the first and second nodes. Each node, when identified as the first node in response to a line fault, broadcasts as many route-finding packets, called CONTROL packets, to each of all adjacent nodes as there are failed regular channels, with each CONTROL packet containing a hop count indicating the number of nodes through which it has travelled and node trace data indicating identifications of nodes through which the packet has travelled. On receiving a CONTROL packet, each node identified as one of the third nodes, increments the hop count of the received packet, updates the node trace data thereof, makes a record of all arriving CONTROL packets, and broadcasts copies of each arriving CONTROL packet to adjacent nodes if the hop count of the arriving CONTROL packet is smaller than a prescribed value. Each node, if identified as the second node in response to the line fault, is responsive to copies of arriving CONTROL packets from a given adjacent node for transmitting as many route-choosing packets, called RETURN packets, to the given node as there are arriving CONTROL packets. Each RETURN packet contains a serial number, or route index number, node trace data indicating identifications of nodes through which it has travelled, and a spare channel identifier indicating a spare channel which leads to an adjacent node and forms part of an alternate route for one of the failed channels. When identified as one of the third nodes, each node makes a record of all arriving RETURN packets and checks the node trace data of each arriving RETURN packet against the node trace data of the received CONTROL packets stored in the record to detect whether there is a spare channel to an adjacent node which eventually leads to the first node with a least hop count and forms part of the alternate route, and transmits a copy of each received RETURN packet to the adjacent node if a spare channel is detected, or returns a negative acknowledgment packet to the second node to cause it to retransmit a RETURN packet to another third node if no spare channel is detected. Each copy of RETURN packet contains a copy of the route index number, an updated version of the node trace data and an updated version of the spare channel identifier indicating the detected spare channel. The first node is responsive to each copy of RETURN packet for switching a link from one of the failed channels to a spare channel indicated by the channel identifier of the received copy of RETURN packet, and transmitting a route-tracing packet, called an END packet in a direction parallel to the switched spare channel. The END packet contains a copy of the route index number, a failed channel identifier indicating the disconnected failed channel and a spare channel identifier indicating the switched spare channel. Each third node is responsive to the END packet for making a search through the RETURN packets in the record to detect one having a route index number identical to the route index number of the received END packet, establishing a link through two spare channels respectively indicated by the channel identifiers of the received END packet and the detected RETURN packet, and transmitting a copy of the received END packet on the established link to the second node. The copy of END packet contains the failed channel identifier and a copy of the spare channel identifier of the received END packet. On receiving the copy of END packet, the second node switches a link from one of the failed channels to a spare channel indicated respectively by the failed channel identifier and the spare channel identifier of the received copy of END packet.

According to a second specific aspect, the number of CONTROL packets propagating through a self-healing network is reduced by each CONTROL packet additionally containing a spare channel count indicating the number of available spare channels. The second node, on receiving such a CONTROL packet, sends back as many RETURN packets to a node from which it has received the CONTROL packet as there are spare channels indicated by the spare channel count of the received CONTROL packet.

Thus, in the event of a failure in a transmission line, CONTROL packets are broadcast from the sender to all neighboring tandem nodes and propagated through the network as long as their hop counts are smaller than the prescribed value. In this way, only those CONTROL packets that are useful for route searching purposes survive as they move through the network toward the chooser, while leaving a record of their traced nodes behind their track. As many RETURN packets are then transmitted from the chooser as there are failed channels. These packets choose an assigned spare channel as they move through the network toward the sender by checking their node trace data with those of the record of CONTROL packet, while leaving a record of their traced nodes behind their track. An END packet, which is transmitted back from the sender in response to a RETURN packet, travels along the network through the assigned channels to the chooser, while checking their route index number (serial number of RETURN packet) against those of the record of RETURN packets and establishing a link in each passing node.

According to a third specific aspect of this invention, a self-healing communications network has a plurality of nodes interconnected by regular and spare channels of different bandwidths, two of the nodes acting as first and second nodes when a failure occurs on a regular path interconnecting the first and second nodes, and the other nodes are identified as third nodes and are capable of linking spare channels for establishing an alternate route between the first and second nodes. Each of the nodes, if identified as the first node in response to the occurrence of a path failure, searches for a channel having a bandwidth equal to or greater than the bandwidth of one of the failed paths, and transmits a CONTROL packet to each adjacent node if a spare channel having the required bandwidth is detected. The CONTROL packet contains a hop count indicating the number of passing nodes, node trace data indicating identifications of the passing nodes, a bandwidth identifier indicating the required bandwidth, and a fault path identifier indicating one of the failed paths. On receiving a CONTROL packet, each third node searches through spare paths to adjacent nodes for a spare channel having a bandwidth equal to or greater than the bandwidth indicated by the bandwidth identifier of the arriving CONTROL packet, makes a record of all arriving CONTROL packets, increments the hop count and updates the node trace data of the arriving packet, makes a record of all arriving CONTROL packets, and retransmits a copy of each arriving CONTROL packet to adjacent nodes if a spare channel having the required bandwidth is detected and if the hop count of the arriving CONTROL packet is smaller than a prescribed value. In response to each copy of CONTROL packet received from a given third node, the second node transmits a RETURN packet to the given third node. The RETURN packet contains a spare channel identifier indicating a spare channel which leads to the given third node and forms part of an alternate route, an updated version of the node trace data, and a copy of the fault path identifier. In each third node, the node trace data of each arriving RETURN packet is checked against the node trace data of all CONTROL packets in the record to detect whether there is a spare channel to an adjacent node located on a route leading to the first node with a least hop count and forms part of the alternate route, updating the arriving RETURN packet in respect of the node trace data and spare channel identifier so that the spare channel identifier contains the detected spare channel and the fault path identifier thereof is copied, transmitting the updated packet as a copy of the received RETURN packet to the adjacent node if a spare channel is detected, or returning a negative acknowledgment packet to the second node if no spare channel is detected to cause retransmission of a RETURN packet from the second node to another third node. The first node responds to each copy of arriving RETURN packet by switching a link from one of the failed paths to a spare channel indicated by the spare channel identifier of the received copy of RETURN packet, and transmitting an END packet to the switched spare channel. The END packet contains a fault path identifier indicating the disconnected failed path and an updated version of the spare channel identifier indicating the switched spare channel. Each third node on a route between the first and second nodes responds to each arriving END packet by searching through the node trace data of all RETURN packets in the record to detect a RETURN packet whose fault path identifier is identical to the fault path identifier of the received END packet, establishing a link through spare channels respectively indicated by the spare channel identifiers of the detected RETURN packet and the received END packet, and transmitting a copy of the received END packet to an adjacent node on the established link toward the second node. The copy of END packet contains copies of the fault channel identifier and spare path identifier of the received END packet. The second node, on receiving the copy of END packet, switches a link from one of the failed paths indicated by the fault path identifier of the received copy of END packet to a spare channel indicated by the spare channel identifier contained therein.

According to a specific aspect of this invention, a self-healing communications network has a plurality of nodes interconnected by regular and spare path sections, nodes being divided into a plurality of subnetworks each comprising first and second terminal nodes and an intermediate node. The intermediate node provides a link between regular path sections to establish a regular path between the first and second terminal nodes. The nodes of each subnetwork act as third nodes of one or more of the other subnetworks for establishing a link between spare path sections to form an alternate route between the first and second terminal nodes of the other subnetworks, each of the path sections having a different bandwidth. Each of the nodes is responsive to occurrence of a failure on the regular path in one of the subnetworks for transmitting a RELEASE packet to the intermediate node to cause it to clear a link so that the other path section of the regular path is made available for use as a spare path section, detecting a spare path section to each adjacent node having a required bandwidth equal to or greater than the bandwidth of the failed regular path, transmitting a CONTROL packet to each adjacent node if a spare path section having the required bandwidth is detected. The CONTROL packet contains a hop count, node trace data, a bandwidth identifier indicating the required bandwidth, and a fault path identifier indicating the failed regular path. Each third node, on receiving each arriving CONTROL packet, makes a record of all arriving CONTROL packets, searches for a spare path section to each adjacent node having a bandwidth equal to or greater than the bandwidth indicated by the bandwidth identifier of the received CONTROL packet, and transmits a copy of each received CONTROL packet to each adjacent node if a spare path section having the bandwidth is detected and if the hop count of the received CONTROL packet is smaller than a prescribed value. Each transmitted copy of CONTROL packet contains updated versions of the hop count, node trace data, and copies of the required bandwidth and fault path identifier. In response to each copy of arriving CONTROL packet from a given third node, the second node transmits a RETURN packet to the given third node. The RETURN packet contains a spare path section identifier indicating a spare path section which leads to that given third node and forms part of an alternate route, an updated version of the node trace data, and a copy of the fault path identifier. The node trace data of each RETURN packet arriving at each third node is checked against the node trace data of the received CONTROL packets in the record to detect whether there is a spare path section to an adjacent node located on a route leading to the first terminal node with a least hop count and forms part of the alternate route, and a record is made of all arriving RETURN packets. A copy of each received RETURN packet is sent to an adjacent node to which a spare path section is detected, or a negative acknowledgment packet is returned to the second node if no spare path section is detected to cause retransmission of a RETURN packet from the second node to another third node. The copy of RETURN packet contains updated versions of the node trace data and spare path section identifier indicating the detected spare path section and a copy of the fault path identifier. In response to each copy of arriving RETURN packet, the first node switches a link from the failed regular path section to a spare path section indicated by the spare path section identifier of the received copy of RETURN packet, and transmits and END packet to the switched spare path section. The END packet contains a fault path identifier indicating the disconnected failed regular path and an updated version of the spare path section identifier indicating the switched spare path section. Each third node on a route toward the second node responds to each arriving END packet by a searching through the node trace data of all RETURN packets in the record for one whose fault path identifier is identical to the fault path identifier of the received END packet, establishing a link between spare path sections respectively indicated by the spare path section identifiers of the detected RETURN packet and the received END packet, and transmitting a copy of the received END packet to an adjacent node on the route toward the second node. The copy of END packet contains copies of the fault path section identifier and spare path identifier of the received END packet. The second node responds to the copy of arriving END packet by switching a link from a failed regular path indicated by the fault path identifier of the received copy of END packet to a spare path section indicated by the spare path section identifier contained therein.

BRIEF DESCRIPTION OF THE DRAWINGS

The present invention will be described in further detail with reference to the accompanying drawings, in which:

FIG. 1 is a schematic diagram of a communications network incorporating the distributed self-healing capabilities of this invention;

FIG. 2 is an illustration of the data structures of all packets used in first and second embodiments of this invention;

FIG. 3 is an illustration of a channel status table;

FIG. 4 is a state diagram showing the various states of channels during rerouting operation of this invention;

FIG. 5 is a block diagram of each node of the communications network of FIG. 1;

FIGS. 6 to 10 are flowcharts describing the operating functions of the rerouting controller of FIG. 5;

FIGS. 11a to 11j are diagrams associated with FIGS. 6 to 10, showing the flows of various packets through the network in the event of a single cable failure;

FIGS. 13 and 14 are flowcharts of the second embodiment of the present invention;

FIG. 15 is an illustration of the data structure of a packet used in the second embodiment;

DETAILED DESCRIPTION

Figure 6:
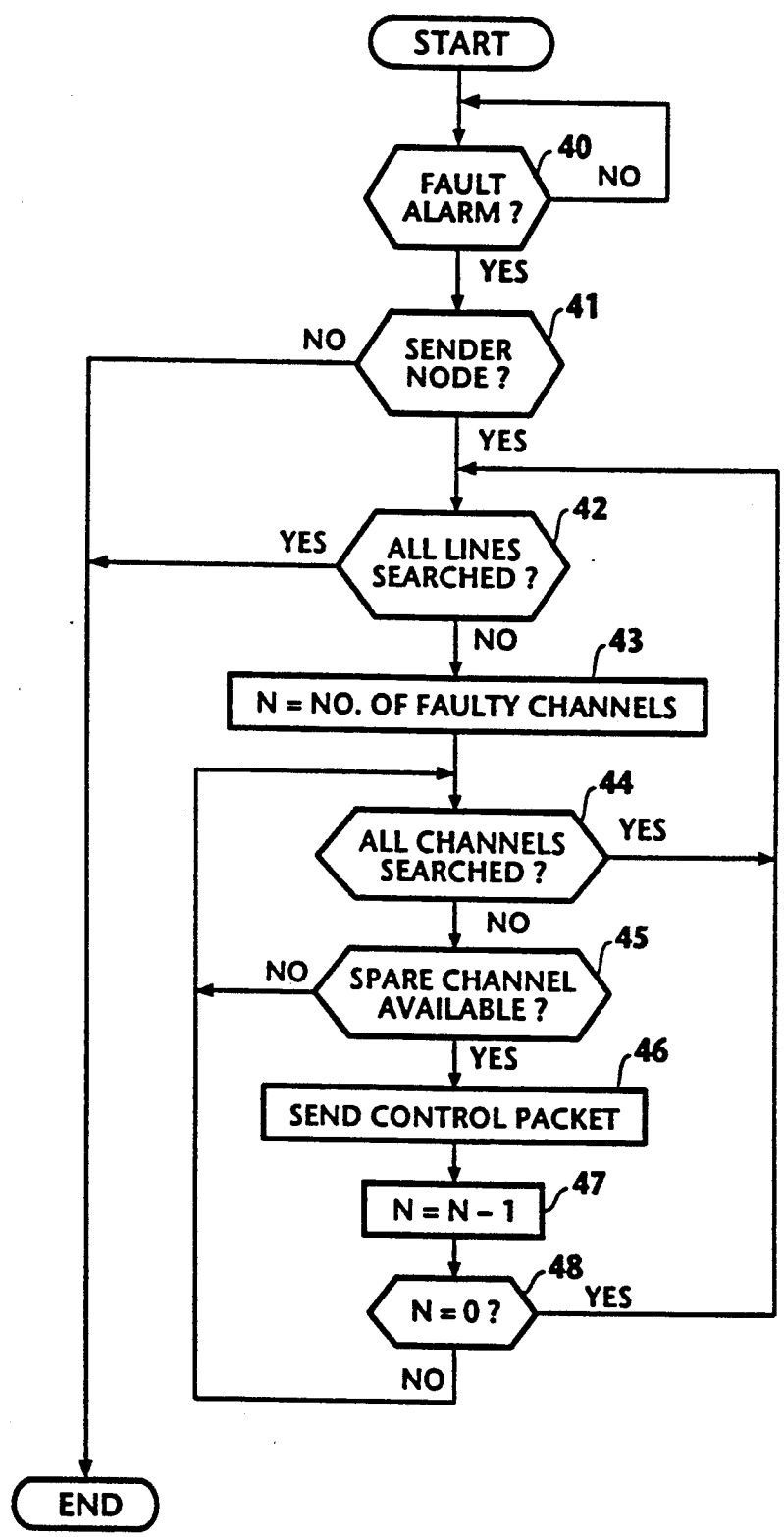

Referring now to FIG. 1, there is shown a simplified communications network having distributed restoration capabilities according to a first embodiment of this invention. The network is made up of several nodes, designated 1 through 5, each having a digital cross-connect system for interconnecting logical channels between neighboring nodes. All nodes 1 through 5 are interconnected by transmission lines or cables designated 10 through 17. Each transmission line includes one or more regular or user channels (solid lines) typically shown at 18 and spare channels (broken lines) typically shown at 19 for future use and failure restoration purposes. For example, transmission line 10 includes three user channels and two spare channels and line 11 includes two user channels and one spare channel, and so on. Nodes of any pair of the network are interconnected by one or more regular logical channels with an intermediate node establishing a link between such channels by its cross-connect system.

Each transmission line further includes a specially reserved channel, called a "control channel", for network rerouting purposes. During a failure restoration mode, each node uses this control channel to exchange special packets with an adjacent node wherever there is at least one spare channel in the transmission line leading to that adjacent node. Transmission line 16 contains no spare channels for illustration purposes and therefore it is not used in the restoration of a failure in the network. All nodes participate in the reconfiguration of the network using control channels of transmission lines except for line 16.

The types of packets employed in the rerouting operation of the invention are CONTROL packet, RETURN packet, END packet, ACK (positive acknowledgment) packet and NACK (negative acknowledgment) packet. The data structures of these packets are shown in FIG. 2. The CONTROL packet contains a packet type identifier, node trace data field, hop count field, faulty line identifier field, transmit line identifier field and priority field. The node trace data field contains a series of bits each being uniquely assigned to a node to indicate the record of a path which the packet has travelled. When a CONTROL packet is passed through a node, a "1" is set to the bit position of the node trace data which is assigned to that node. The hop count field indicates the record of nodes the packet has passed through. Each node increments the hop count field as it passes it on to the next node. This hop count is checked by each node to prevent unnecessary CONTROL packets from propagating through the network. The transmit line identifier indicates the transmission line on which the CONTROL packet is being transmitted. The priority field indicates the priority of a faulty channel.

One of two nodes between which a line fault has occurred is called a "sender" and the other a "chooser". Should a cable failure occur, CONTROL packets are initially broadcast from the sender to adjacent nodes, and are relayed along the network toward the chooser. On receiving such CONTROL packets, the chooser sends RETURN packets back to a tandem node by changing the status of a spare channel to "reserved" to reserve it as a candidate for a possible alternate route, the RETURN packets being relayed backward the sender through the route along which corresponding CONTROL packets have travelled. The RETURN packet contains a serial number following its packet type field. Each RETURN packet is given a serial number by the chooser, and this serial number remains unchanged as the packet propagates through the network. Similar to the CONTROL packet, the RETURN packet also includes fields for node trace data, failed line ID, transmit line ID and priority. When transmitting a RETURN packet, a spare channel is reserved. To this end, the RETURN packet contains a reserved channel identifier field to prevent the reserved channel from being accessed by other packets.

On receiving a RETURN packet, the sender switches a failed channel to the spare channel specified in the reserved channel identifier of the received packet and sends an END packet back to a tandem node. The status of the reserved channel is now changed to "used". The END packet is passed along the same route on which the received RETURN packet has travelled. The END packet contains a copy of the return-packet serial number and the failed and transmit line identifiers, and assigned faulty channel identifier and assigned spare channel identifier.

Acknowledgment packets are used to indicate whether a spare channel is reserved or not. When a positive acknowledgment packet is received, the status of an incoming spare is changed to "used", and if a negative acknowledgment packet is received, an attempt is made to search an alternate route and a RETURN packet is sent if it is found.

For purposes of routing the packets, each node is provided with a channel status table as shown in FIG. 3. As shown schematically in FIG. 4, the status of user (regular) channels is usually marked "used" in the associated entries of the table and the status of spare channels is indicated "spare" in the associated table entries. Should a cable failure occur in a transmission line, the status of user or spare channels of the line is updated to "failed". During transient periods of network reconfiguration mode, the status of spare channels of active lines is updated from "spare" to "reserved" when transmitting or receiving a RETURN packet in a manner as will be described in detail later. The "reserved" state will be changed to a "used" state when an END packet is transmitted or an ACK packet is received, or reset to the "spare" state in response to a NACK packet. When a cable failure is restored following a network reconfiguration, the failure indications of the restored user and spare channels will be updated to "spare" and "used", respectively.

As shown in FIG. 5, the digital cross-connect system of each node comprises an interface 20 to which incoming logical channels are terminated. A time-division multiplexer (TDM) 21 is coupled to the interface 20 for multiplexing its outputs into an inlet highway which serves as the input of a time slot interchanger (TSI) 22. In response to a control signal, TSI 22 switches the time slots of the TDM input to desired time slots of an outlet highway which leads to a time division demultiplexer 23, so that signals on the incoming logical channels may appear at desired outputs of demultiplexer 23 and are transmitted through an outgoing interface 24 to an adjacent node. Each node further includes a packet controller 25 and a rerouting controller 26. The incoming paths of control channels are provided from interface 20 to packet controller 25 through lines 20a and outgoing paths of the control channels lead from packet controller 25 to outgoing interface 24 through lines 24a. Rerouting controller 26 includes a packet memory 27 which is connected to packet controller 25 to receive incoming packets through lines 25a to make a record of packets that have been propagated through different routes of the network. For half- or full-duplex operation, a similar set of DCS (digital cross-connect system) components may be provided.

The packets received by controller 25 are also applied to a control-packet processor 30, a return-packet processor 31, an acknowledgment (ACK/NACK) processor 32, and an end-packet processor 33. Each of these processors has an access path to packet memory 27 to check the received packet against those stored in packet memory 27. The channel status table is shown at 28 to which all processors are accessible to update its contents whenever a packet is sent or received.

Incoming interface 20 is provided with failure detection circuitry, not shown, which applies a fault alarm signal through lines 20b to an alarm detector 29 if a failure occurs in the associated transmission line, identifying the failed line and logical channels. In response to the fault alarm, alarm detector 29 updates the status of the faulty channels to "failed" and enables the control-packet processor 30 to invoke a series of events that follow.

Figure 7:
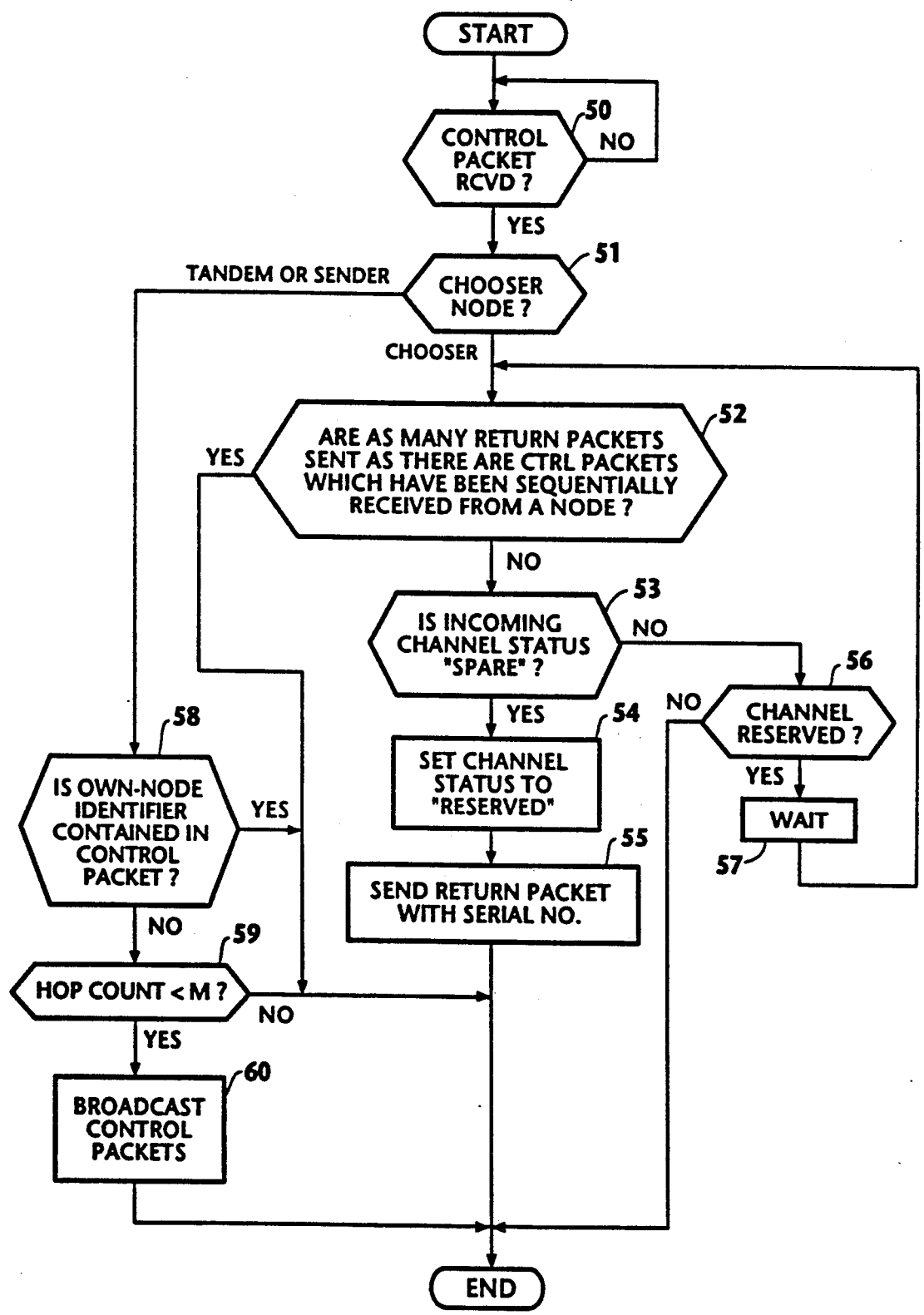
Figure 8:
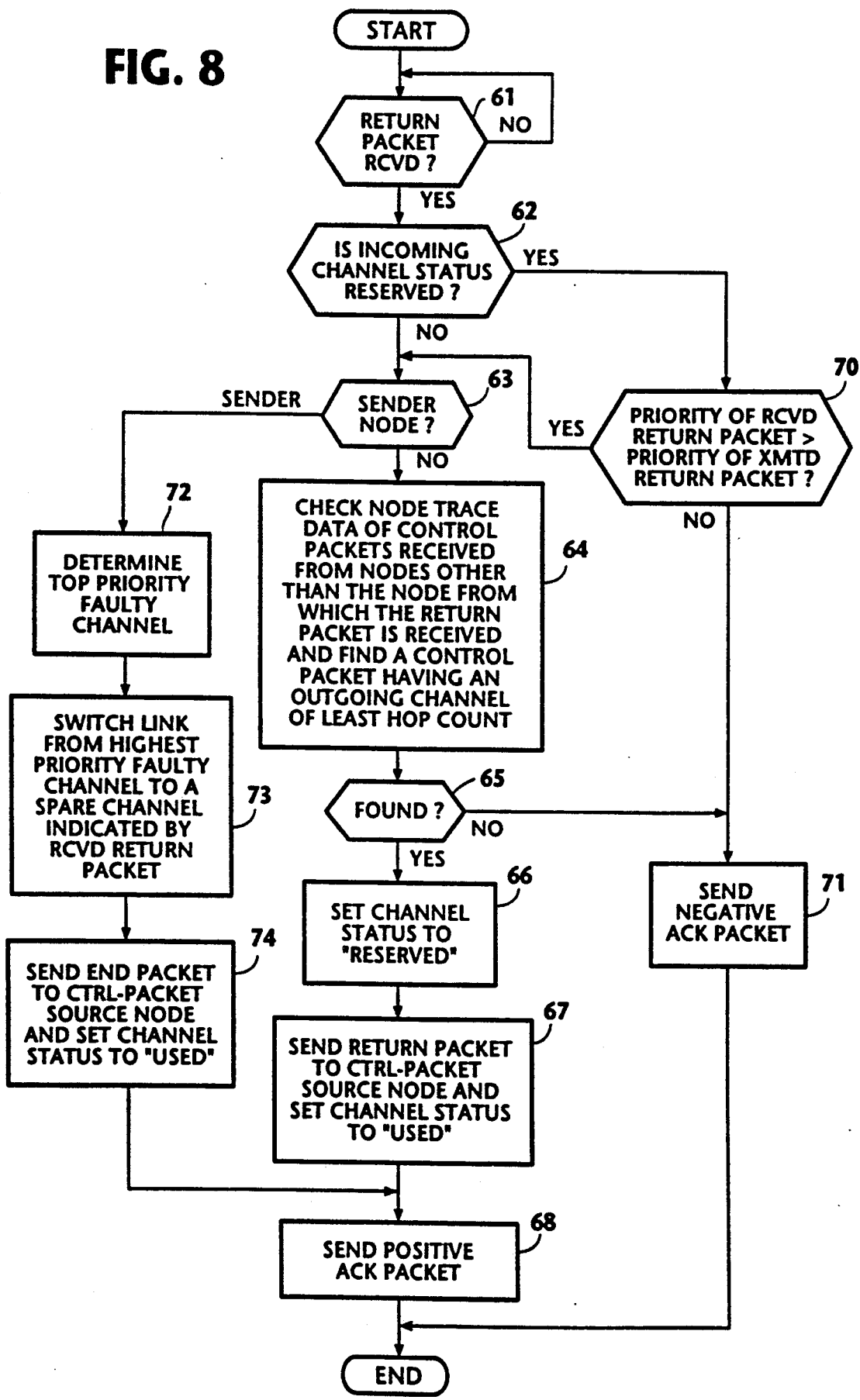
Figure 9:
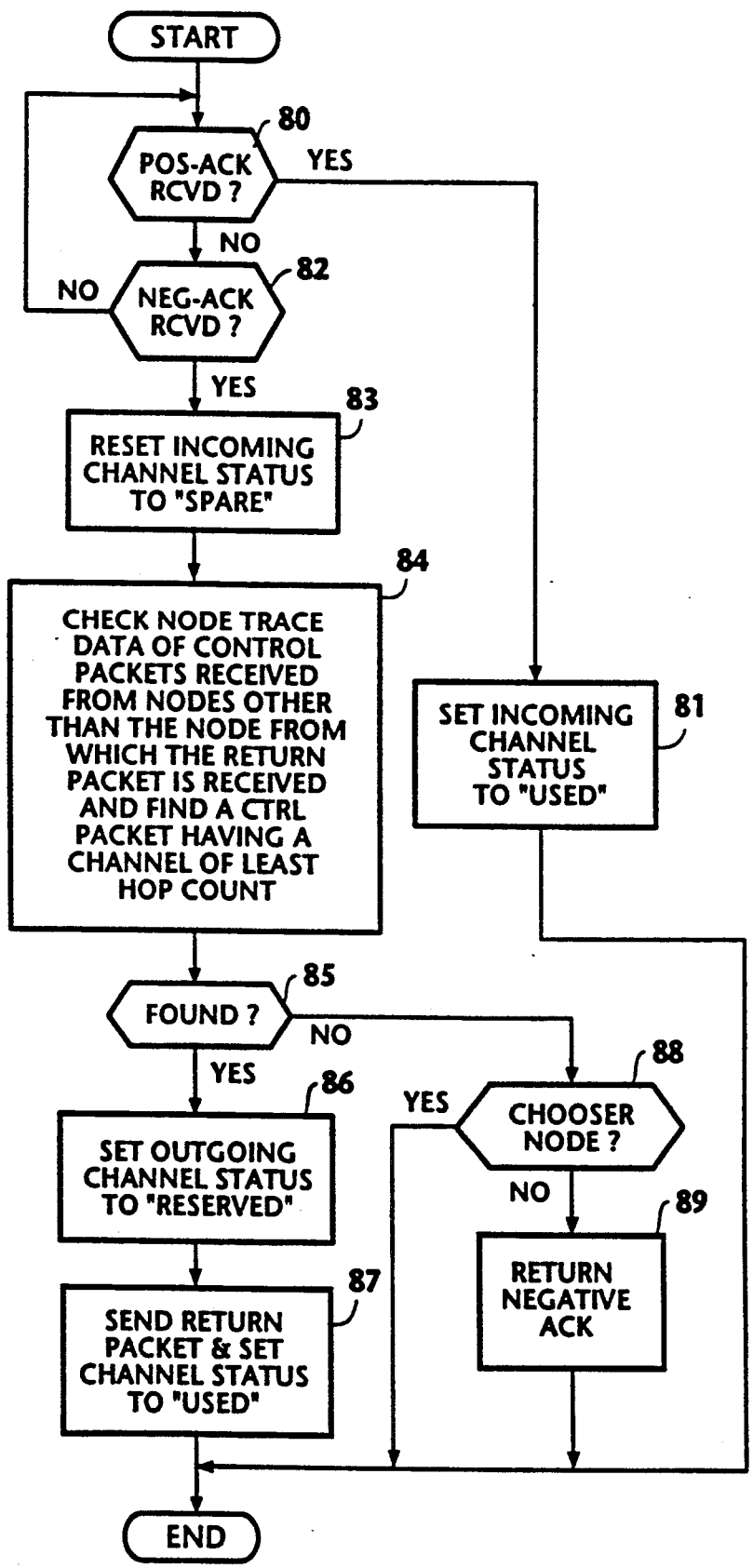

Details of processors 30 to 33 will be described by reference to FIGS. 6 to 10, with FIGS. 6 and 7 illustrating details of control-packet processor 30, while FIGS. 8, 9 and 10 showing details of return-packet processor 31, acknowledgment (ACK/NACK) processor 32 and end-packet processor 33, respectively.

In FIG. 6, the program execution of control-packet processor 30 starts in response to a fault alarm signal supplied from alarm detector 29 (step 40) indicating the number of faulty lines and logical channels. Control advances to step 41 to check to see if the own node is a sender or not. This is determined by relative values of the identifiers of the nodes between which the line fault has occurred.

In a typical example, one of the nodes having a smaller value of node identifier is selected to act as a sender, and the other node acts as a chooser. If the node receiving the fault alarm is a chooser, control moves ahead to the end of the routine, and if it is a sender, proceeds to decision step 42 to check to see if all faulty lines are searched. If negative decision is made (step 42), control moves ahead to operations step 43 to set a variable N to the number of faulty logical channels on each failed line. Control then proceeds to decision step 44 which tests whether all channels of a failed line have been searched. If the answer is negative, control goes to decision step 45 to access the channel status table 28 to determine whether a spare channel to an adjacent node is available. If there is a spare channel, control advances to step 46 to send a CONTROL packet containing various field items as indicated in FIG. 2 to that node through a control channel that runs parallel to the spare channel as if the packet were actually sent through it. The variable N is then decremented by one (step 47) and checked against zero in step 48.

If the answer in decision step 45 is negative, control returns to step 44 to repeat the search for a spare channel. If as many spare channels are available as there are failed channels in a given failed line, the decision in step 47 will be affirmative and control returns to step 42 to repeat the process on the other failed lines. If there are not sufficient spare channels for a failed line, the answer in decision step 44 is affirmative and control returns to step 42.

It is seen therefore that if there is a spare channel available for each failed channel, as many CONTROL packets as there are faulty logical channels are sent from a sender node to adjacent tandem nodes.

On receiving a CONTROL packet, the control-packet processor 30 of each receiving node starts a program execution described in FIG. 7 beginning with step 50. Control exits to step 51 to check to see if the present node is a chooser or not. If the node is tandem or sender, control advances to step 58 to check to see if the present node identifier bit is contained in the node trace data of the received CONTROL packet. If the answer is affirmative, control moves ahead to the end of routine to prevent a CONTROL packet from repeatedly propagating through the same route. If not, the control proceeds to step 59 to check to see if the hop count of the CONTROL packet is smaller or greater than a prescribed value M. If the hop count value is smaller than M, control moves to operations step 60 to update the node trace data of the received packet by inserting the own-node identifier bit and incrementing the hop count field, and copies of the updated packet are broadcast as outgoing CONTROL packets to adjacent nodes other than the node from which the incoming CONTROL packet was received.

If the control-packet receiving node is a chooser, control moves to decision step 52 to determine whether as many RETURN packets have been transmitted as there are CONTROL packets which have been received in sequence from a single node. If the answer is affirmative in step 52, control moves to the end of routine, and if negative, control proceeds to decision step 53 to access the channel entry of channel status table 28 according to the alternate LCID field of the received CONTROL packet to determine whether table 28 indicates it as "spare" or not. If the answer is negative, control proceeds to step 56 to check to see if it is indicated as "reserved", control exits to step 57 to wait for a certain period of time and return to step 52 if the answer is affirmative in step 56, or otherwise it moves to the end of routine. If a channel has been reserved by transmission of a RETURN packet before the CONTROL packet is received, chances are likely that they crossed with each other and control moves to decision step 56.

If the answer is affirmative in decision block 53, control exits to step 54 to update channel status table 28 by changing the corresponding entry of the channel from "spare" to "reserved", and proceeds to step 55 to send a RETURN packet to the node from which the incoming CONTROL packet was received. This RETURN packet contains a serial number and node trace data updated with the own-node identifier bit into the node trace data field and other data items including the failed LCID and the ID of the channel through which the incoming CONTROL packet was received.

In response to a RETURN packet, the return-packet processor 31 of each node executes a routine shown in FIG. 8 beginning with decision step 61. Exit then is to decision step 62 which checks the logical channel ID specified by the received RETURN packet against the corresponding entry of channel status table 28 to see if that channel has already been reserved by a previous RETURN packet transmitted from this node. If this is the case, the received RETURN packet has crossed with the transmitted RETURN packet and contention has occurred, and control moves to step 70 to determine whether the received RETURN packet has a priority higher than the priority of the transmitted RETURN packet. If the answer in step 70 is affirmative, control exits to step 63 to check to see if the present node is a sender or not. If the answer in step 70 is negative, control proceeds to step 71 to send a negative ACK packet to the node from which the incoming RETURN was received.

If the present node is a tandem or a chooser, control proceeds from step 63 to operations step 64 to check the node trace data field of all CONTROL packets which are stored in packet memory 27 and which have been received from nodes other than the node from which the incoming RETURN packet is received with the node trace data of the incoming RETURN packet to detect a CONTROL packet having a channel which passes through an adjacent node to the sender node with a least hop count. If there is none (step 65), step 71 is executed by returning a NACK packet, and if there is one, control exits to step 66 to locate a spare channel in the transmission line through which CONTROL packet found by steps 64, 65 was previously received, set the status of the spare channel from "spare" to "reserved". The status updating step is followed by step 67 in which a new RETURN packet is regenerated by containing in it the identifier of the channel just reserved by step 66 and transmitted back to a node indicated by the node trace data the CONTROL packet found by steps 64 and 65, and the status of the channel through which the RETURN packet was received is set to "used". Control exits to step 68 to send a positive ACK packet to the node from which the RETURN packet was received to allow this node to update the status of the corresponding channel.

If the own node is a sender, step 72 is executed to determine which one of the failed channels has the highest priority. Control exits to step 73 to control the time slot interchanger 22 by rewriting its time slot memory so that a link coupling a user terminal to the top-priority failed channel is switched therefrom to a spare channel which is specified by the reserved channel ID field of the received RETURN packet. In step 74, a copy of the RETURN packet is generated by containing in it the identifier of the switched (assigned) faulty channel and the identifier of the switched (assigned) spare channel and transmitted back to the source node of the RETURN packet as an END packet, and the status entry of the spare channel is set to "used". A positive acknowledgment packet then follows (step 68). In FIG.9, an acknowledgment routine is initiated in response to the receipt of either positive or negative acknowledgment packet. In response to a positive acknowledgment packet, control moves past step 80 to step 81 to set the status of the incoming channel of the positive ACK packet to "used". If a negative acknowledgment packet is received, control moves past steps 80, 82 to step 83 to reset the status of the incoming channel of the packet from "reserved" to "spare" and moves ahead to step 84 to search the node trace data field of all CONTROL packets which are stored in packet memory 27 and which have been received from nodes other than the node from which the incoming NACK packet is received and find a CONTROL packet having an outgoing channel with a least hop count to the sender node. If such a CONTROL packet is not found (step 84), step 88 is executed to determine whether the own node is a chooser, and if so control moves to the end of the routine, and if not, a NACK packet is sent back to the source node (step 89). If the answer is affirmative in decision step 85, control exits to step 86 to set the channel status entry of the least hop-count channel to "reserved", and proceeds to step 87 to generate a RETURN packet by containing in it the identifier of the just reserved spare channel as well as the failed path identifier copied from the NACK packet, the RETURN packet being sent to a node to which the reserved outgoing channel extends.

When an END packet is received, the end-packet processor 32 of each node is activated to execute a routine shown in FIG. 10 beginning with step 90. Control exits then to step 91 to check to see if the present node is a chooser or not. If the node is a tandem, control goes to step 92 to make a search through all RETURN packets it has received to find one corresponding to the received END packet. Control proceeds to step 93 to control the time slot interchanger 22 so as to establish a link between a failed channel specified by the failed channel ID field of the received END packet and a channel specified by the reserved channel ID field of the corresponding RETURN packet. Control goes to step 93 to send an END packet through the control channel of the transmission line which contains the linked channel. If the own node is a chooser, control exits to step 95 to control the time slot interchanger so that a link coupling a user terminal to a failed channel specified by the assigned faulty channel ID of the received END packet is switched from the failed channel to a spare channel specified by the assigned spare channel ID field of the same packet.

The operation of the network in the case of a line fault in a single transmission line will be described with reference to FIGS. 11a to 11j.

Assume that a line fault occurs in transmission line 10 between nodes 1 and 2 as shown in FIG. 11a, three user logical channels fail, and node 1 acts as a sender and transmits a series of CONTROL packets C1, C2 and C3 to tandem node 3 through the control channel of line 17 and C4, C5 and C6 to tandem node 4 through the control channel of line 13. Node 2 acts as a chooser waiting for the arrival of relayed CONTROL packets.

In response to CONTROL packets C1, C2, C3, tandem node 3 generates copies of the received packets with updated node trace data and broadcasts them as CONTROL packets C7, C8 and C9 to chooser 2 through the control channel of line 14 and CONTROL packets C10, C11, C12 to adjacent node 5 through the control channel of line 15 as shown in FIG. 11b and tandem node 4 transmits CONTROL packets C13, C12 and C14 to node 5 through the control channel of line 12.

As shown in FIG. 11c, tandem node 5 receives CONTROL packets C10~C12 from node 3 and generates their copies with updated node trace data and broadcasts them as CONTROL packets C16~C18 to node 2 and as CONTROL packets C22~C24 to node 4. Node 5 further receives CONTROL packets C13~C15 from node 4, generates their copies with updated node trace data and transmits them as CONTROL packets C19~C21 to node 3.

On receiving a series of CONTROL packets C7~C9, the control-packet processor 30 of chooser 2 executes the routine of FIG. 7 including steps 52 to 55 and copies of these CONTROL packets are generated such that each contains a return-packet serial number and transmitted as RETURN packets R1~R3 back to the source node of the received CONTROL packets C7~C9, i.e., node 3, asking it whether a spare channel is available for each RETURN packet (see FIG. 11c).

In response to RETURN packet R1, tandem node 3 begins executing the routine of FIG. 8 including steps 64 to 68. In step 64, node 3 accesses the packet memory 27 and searches the node trace data (node 1, node 3) of CONTROL packets C7~C9 and the node trace data (node 1, node 4, node 5) of CONTROL packets C19~C21 and determines that a spare channel to sender 1 is the least hop count route (step 65), sets the status of this channel in table 28 to "reserved" (step 66) and sends a copy of this RETURN packet as a RETURN packet R4 through line 17 to sender 1 (step 67) and returns a positive acknowledgment packet ACK1 to chooser 2 (step 68), informing it that a first spare channel is available (see FIG. 11d).

In response to RETURN packet R2, node 3 searches CONTROL packets C19~C21 and determines that a spare channel to node 5 is the next least hop-count route to sender 1. Node 3 generates a copy of CONTROL packet C19 containing a return-packet serial number, and transmits it as a RETURN packet R5 to node 5 through line 15 and returns a positive acknowledgment packet ACK2 to chooser 2, informing it that a second spare channel is available.

Since only two spare channels are available from node 3 to sender 1 as alternative routes, the decision in step 65 upon receipt of RETURN packet R3 is negative, and hence, a negative acknowledgment packet NAK1 is returned from node 3 to node 2, informing it that the attempt has failed to find a third alternate route.

When chooser 2 receives packet NAK1 from node 3, it executes the routine of FIG. 9 including steps 84 and 85. Namely, it searches the node trace data of all CONTROL packets it has received and determines that a logical channel 11a on line 17 which has carried the CONTROL packets C16~C18 with node trace data (node 1, node 4, node 5) is the only least hop count route to sender 1. The status of logical channel 11a in channel status memory 28 set to "reserved" (step 86) and a copy of CONTROL packet C16 containing a return-packet serial number is generated and transmitted to node 5 as a RETURN packet R6. On the other hand, the control-packet processor 30 of chooser 2 ignores CONTROL packets C16 and C18 as it has transmitted the same number of RETURN packets as it has received CONTROL packets C1~C3 from node 3 (step 52, FIG. 7).

CONTROL packets C25~C27 transmitted to sender 1, on the other hand, cause it to check their hop counts against the prescribed value (step 58, FIG. 7). If each hop count exceeds the prescribed value, these packets are ignored.

RETURN packet R4 causes sender 1 to execute step 72 (FIG. 8) and determines which one of the failed channels has the highest priority. Control exits to step 73 to control the time slot interchanger 22 so that the top-priority failed channel 10a is switched to channel 17a (indicated by a solid line, FIG. 11e) which is specified by the alternate LCID field of RETURN packet R4. In step 74, an END packet E1 is sent from sender 1 to tandem 3 and the channel status entry of spare channel 17a is set to "used". A positive acknowledgment packet ACK3 is sent from sender 1 to node 3 as step 68 is executed by node 1.

Figure 11D:
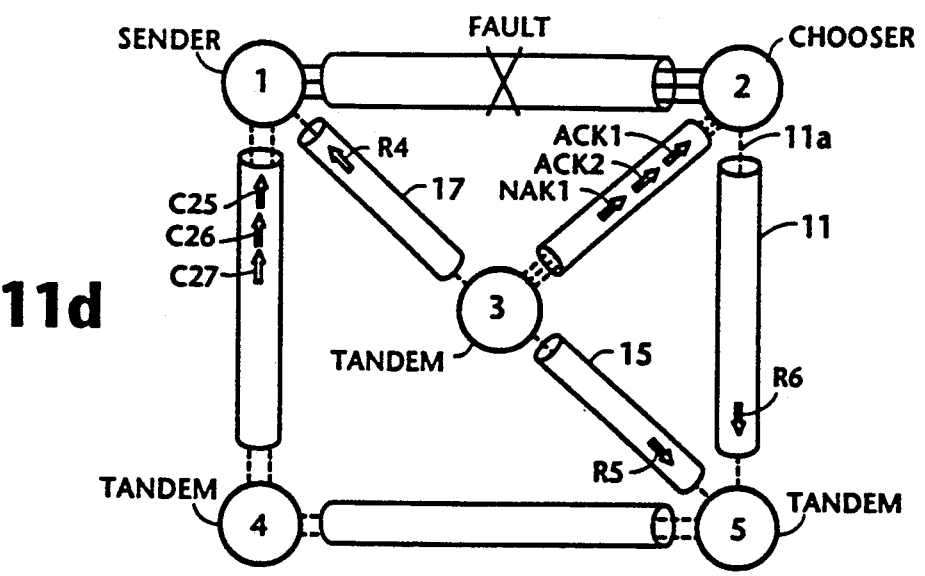
Figure 11E:
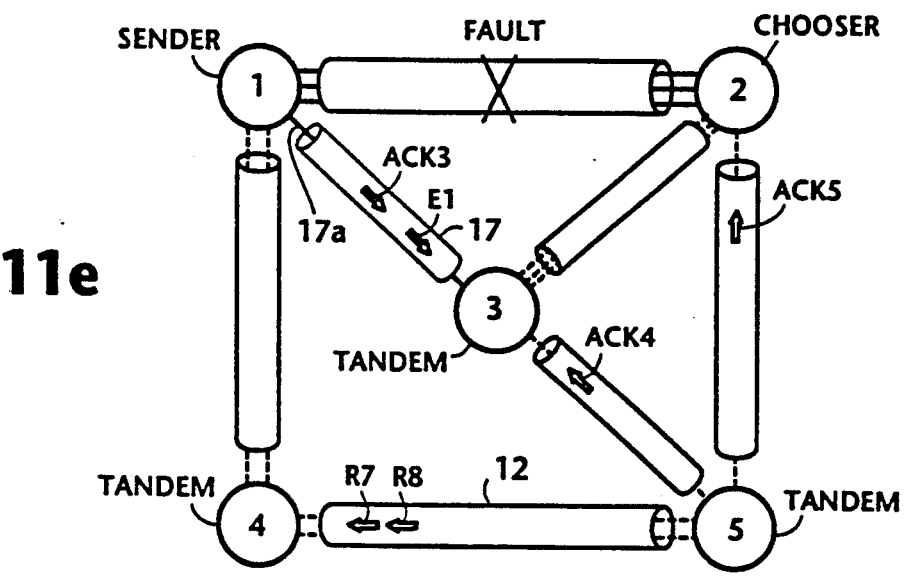

Similar to the manner in which tandem node 3 responded to RETURN packets R1 and R2, tandem node 5 successively responds to RETURN packets R5 and R6 from nodes 3 and 2 by searching CONTROL packets stored in packet memory 27 to find that line 12 is the least hop-count route to sender 1 (step 64) and successively transmitting RETURN packets R7 and R8 to node 4 and returning positive acknowledgment packets ACK4 and ACK5 to nodes 3 and 2, respectively (FIG. 11e).

Figure 11F:
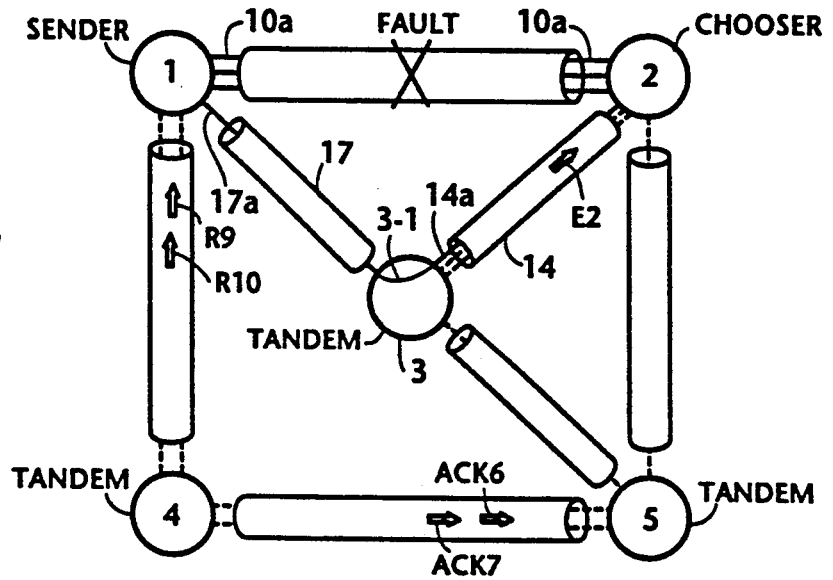

It is seen that, on receiving END packet E1, tandem node 3 establishes a link 3-1 as shown in FIG. 11f between spare channel 17a and spare channel 14a as an alternate route for the top priority failed channel, and transmits an END packet E2 to chooser 2, whereupon it switches the second end of the failed channel 10a to channel 14a. Receipt of RETURN packets R7 and R8 by tandem node 4 results in the transmission to sender 1 of further RETURN packets R9 and R10 as it executes step 67 (FIG. 8) and result in the transmission to node 5 of acknowledgment packets ACK6 and ACK7 as it executes step 68.

Figure 11G:
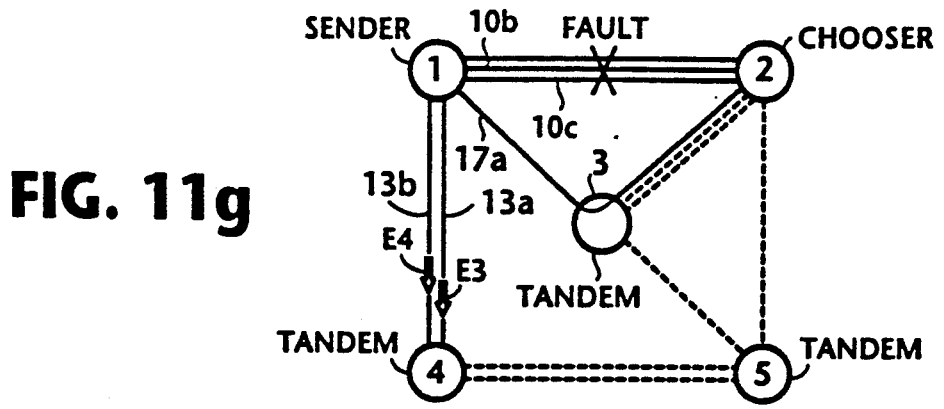
Figure 11H:
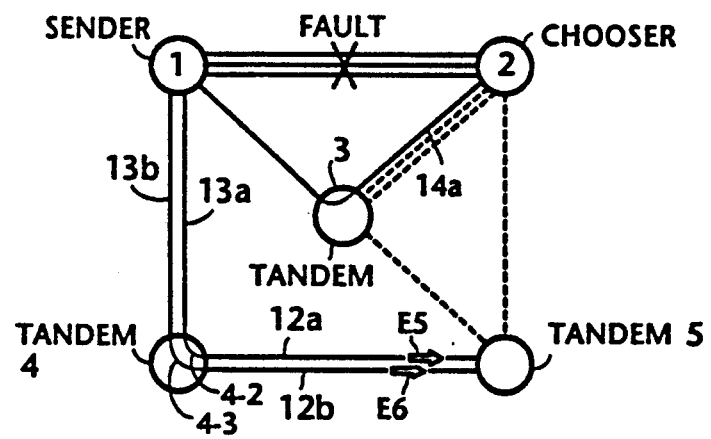
Figure 11I:
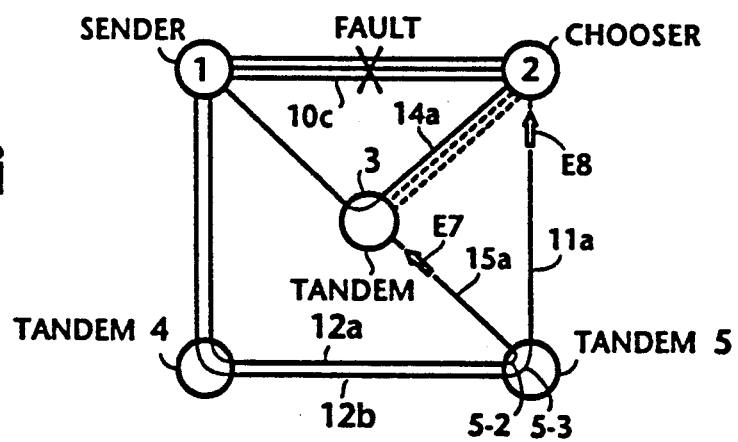
Figure 11J:
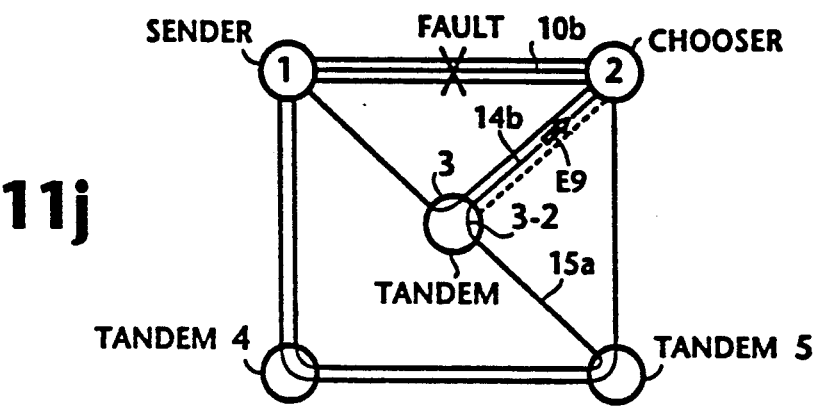

In FIG. 11g, sender 1 successively responds to RETURN packets R9 and R10 by successively switching the failed channels 10b and 10c to spare channels 13a, 13b and returning END packets E3 and E4 to tandem node 4 according to steps 72, 73 and 74 (FIG. 8). Node 4 executes the routine of FIG. 9 by successively establishing links 4-2 and 4-3 between spare channels 13a, 13b and spare channels 12a, 12b according to step 81 as alternate routes for the second and third priority failed channels, and successively returning END packets E5 and E6 to node 5 according to step 83 (FIG. 11h). Likewise, tandem node successively responds to END packets E5 and E6 by establishing links 5-2 and 5-3 between spare channels 12a, 12b and spare channels 15a and 11a as alternate routes for the second and third priority failed channels (FIG. 11i) and transmitting END packets E7 and E8 to nodes 3 and 2, respectively. Chooser 2 switches the failed channel 10c to spare channel 11a. Node 3 establishes a link 3-2 to connect channel 15a to channel 14b, while sending a final END packet E9 to chooser 2 to cause it to switch the second end of the failed channel 10b to channel 14b (FIG. 11j). In this way, three alternate channels are established between node 1 and node 2.

The operation of the network in the case of two simultaneous line failures will be described with reference to FIGS. 12a to 12f.

Assume that two cable failures occur simultaneously as shown at A on regular logical channels 10a, 10b, 10c and at B on regular logical channel 15b. Node 1 acting as a sender (A) responds to a fault alarm signal generated by cable fault A by sending CONTROL packets C1(A)~C3(A) to node 3 and CONTROL packets C4(A)~C6(A) to node 4 (steps 42 to 48, FIG. 6). Node 3, which acts as a tandem for fault A, acts as a sender (B) for failure B and sends a CONTROL packet C1(B) to node 1 (which acts as a tandem for failure B) and a CONTROL packet C2(B) to node 2 (steps 42 to 48, FIG. 6).

Figure 12A:
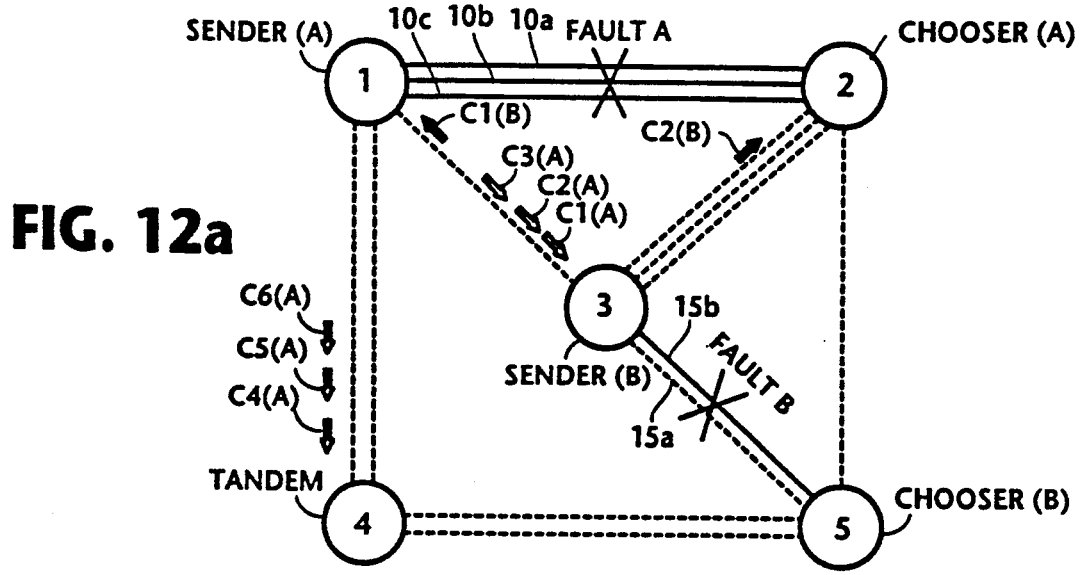
FIGS. 12a to 12f are diagrams associated with FIGS. 6 to 10, showing the flows of various packets through the network in the event of two simultaneous cable failures.
Figure 12B:
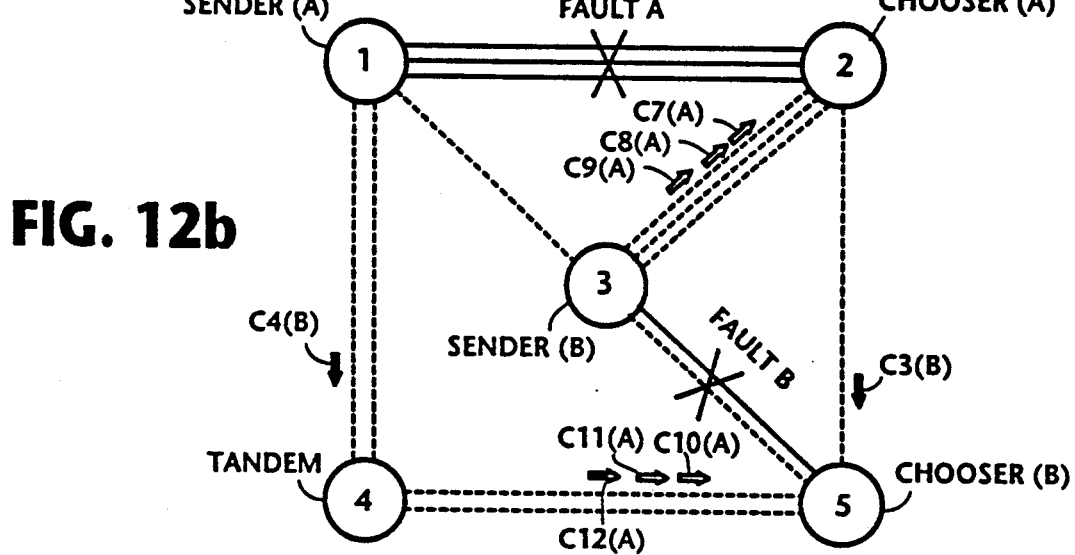
Figure 12C:
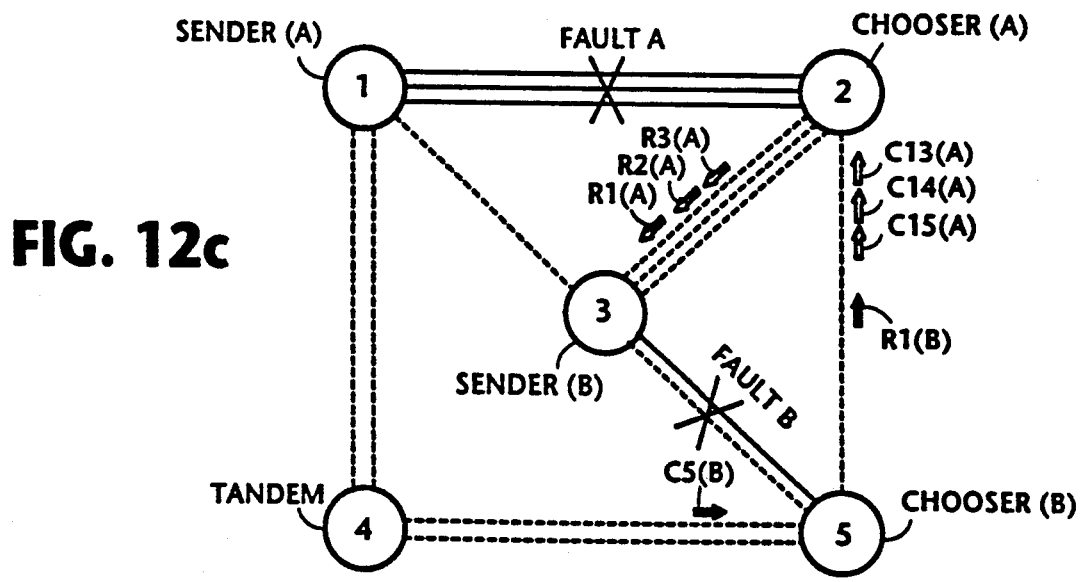

CONTROL packets C1(A)~C3(A) are received by node 3 (FIG. 12a) and sent as CONTROL packets C7(A)~C9(A) to chooser 2 as it performs steps 58 to 60 of the FIG. 7 routine (FIG. 12b). Chooser 2 sends back a series of RETURN packets R1(A)~R3(A) to node 3 in response to these CONTROL packets (FIG. 12c). Copies of CONTROL packets C4(A)~C6(A) are generated by tandem node 4 and sent to node 5 as CONTROL packets C10(A)~C12(A), which result in the transmission of CONTROL packets C13(A)~C15(A) from node 5 to chooser 2.

On the other hand, CONTROL packet C2(B) is relayed by node 2 and travels as a CONTROL packet C3(B) to node 5 acting as a chooser (B). Chooser 5 responds to this packet by sending back a RETURN packet R1(B) to node 2, while CONTROL packet C1(B) is relayed by nodes 1 and 4 and travels as CONTROL packets C4(B) and C5(B) to chooser 5 (FIGS. 12a, 12b, 12c). Since there is only one faulty channel for failure B and since RETURN packet R1(B) has been transmitted at the instant CONTROL packet C5(B) arrives at chooser 5, packet C5(B) is ignored.

Figure 12D:
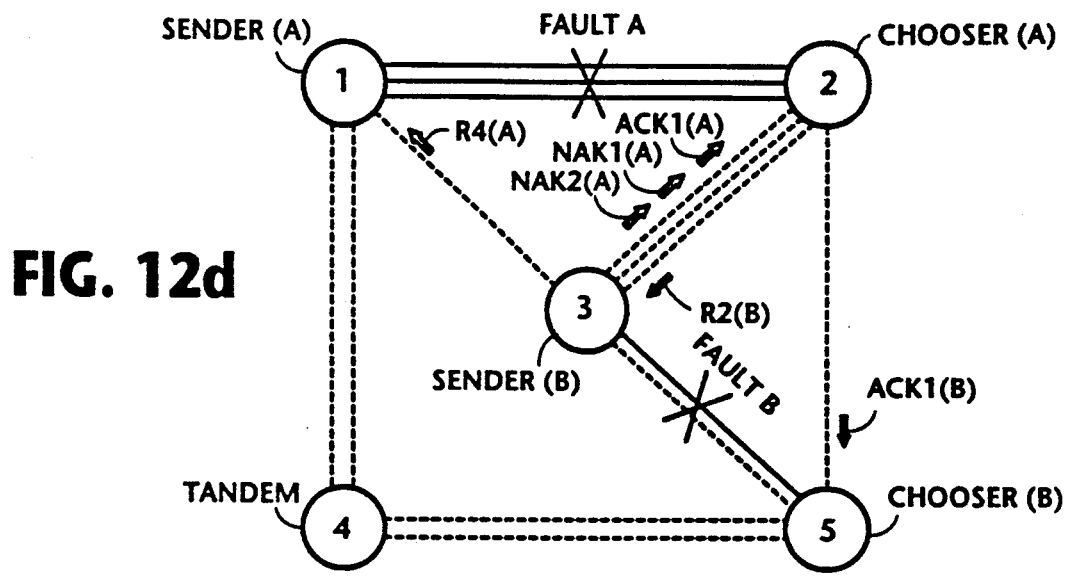

In FIG. 12d, node 3 responds to RETURN packets R1(A)~R3(A) from chooser 2 by sending a RETURN packet R4(A) to sender 1 and returning to chooser 2 a positive acknowledgment packet ACK1(A) corresponding to the packet R3(A) and negative acknowledgment packets NAK1(A) and NAK2(A) since there is only one alternate route to sender 1. RETURN packet R1(B) is relayed by node 2 and received by the fault-B sender 3 as packet R2(B), while its acknowledgment is sent as a packet ACK1(B) to chooser 5.

Figure 12E:
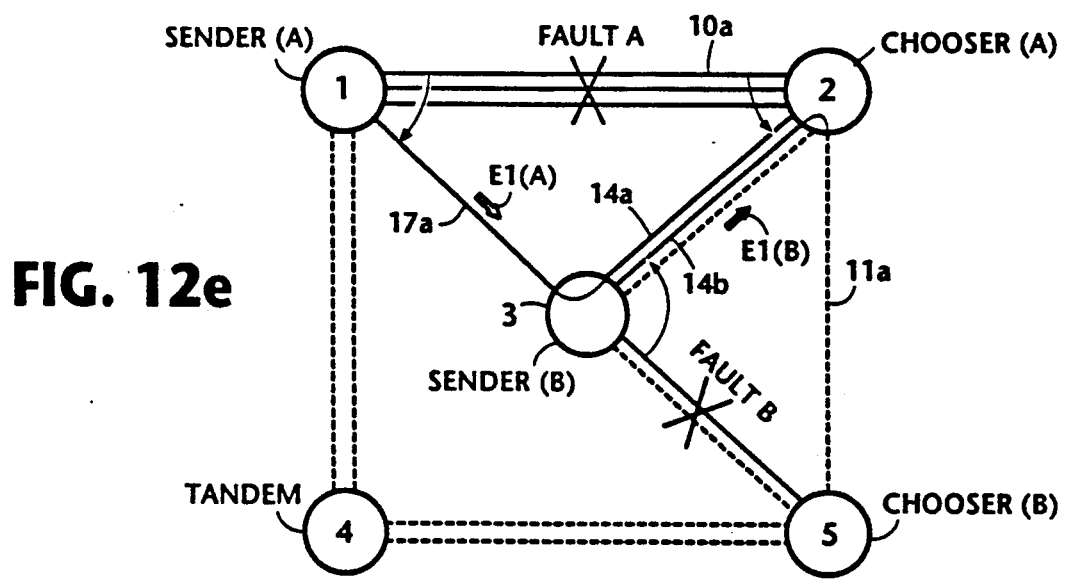
Figure 12F:
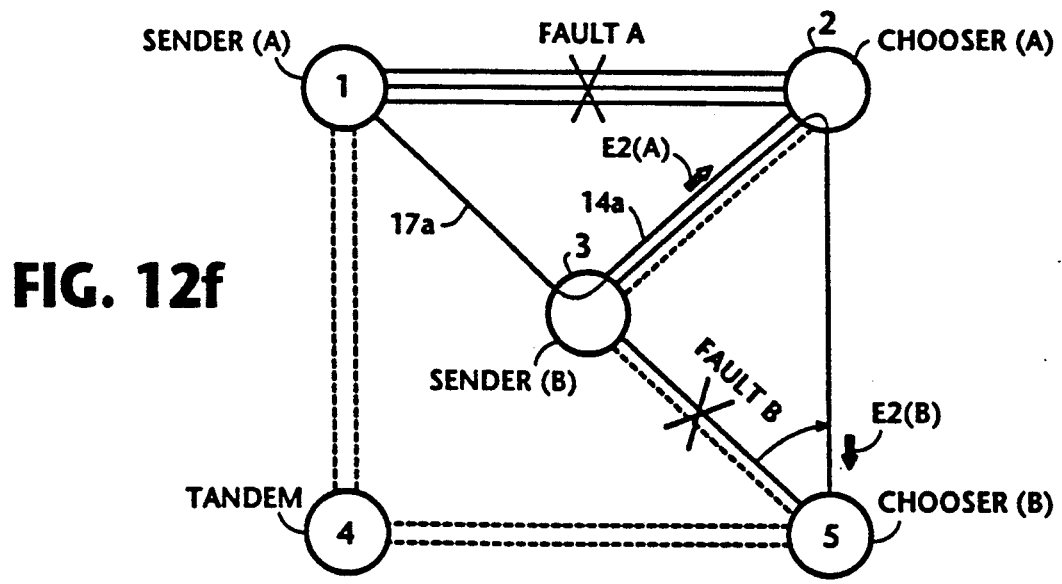

In FIG. 12e, the reception of packet R4(A) by sender 1 results in the switching of the highest priority faulty channel 10a to spare channel 17a and the sending back of an END packet E1(A) to node 3. On receiving packet E1(A), node 3 establishes a link between channel 17a and channel 14a and sends an END packet E2(A) to chooser 2 (FIG. 12f). At the same time, the reception of packet R2(B) by sender 3 causes it to switch faulty channel 15b to spare channel 14b and send back an END packet E1(B) to node 2. Node 2 responds to this END packet E1(B) by establishing a link between channel 14b and channel 11a and sending an END packet E2(B) to chooser 5 to cause it to switch the faulty channel 15b to channel 11a (FIG. 12f). On the other hand, END packet E2(A) is passed through chooser 2 to switch the faulty channel 10a to channel 14a.

Figure 14:
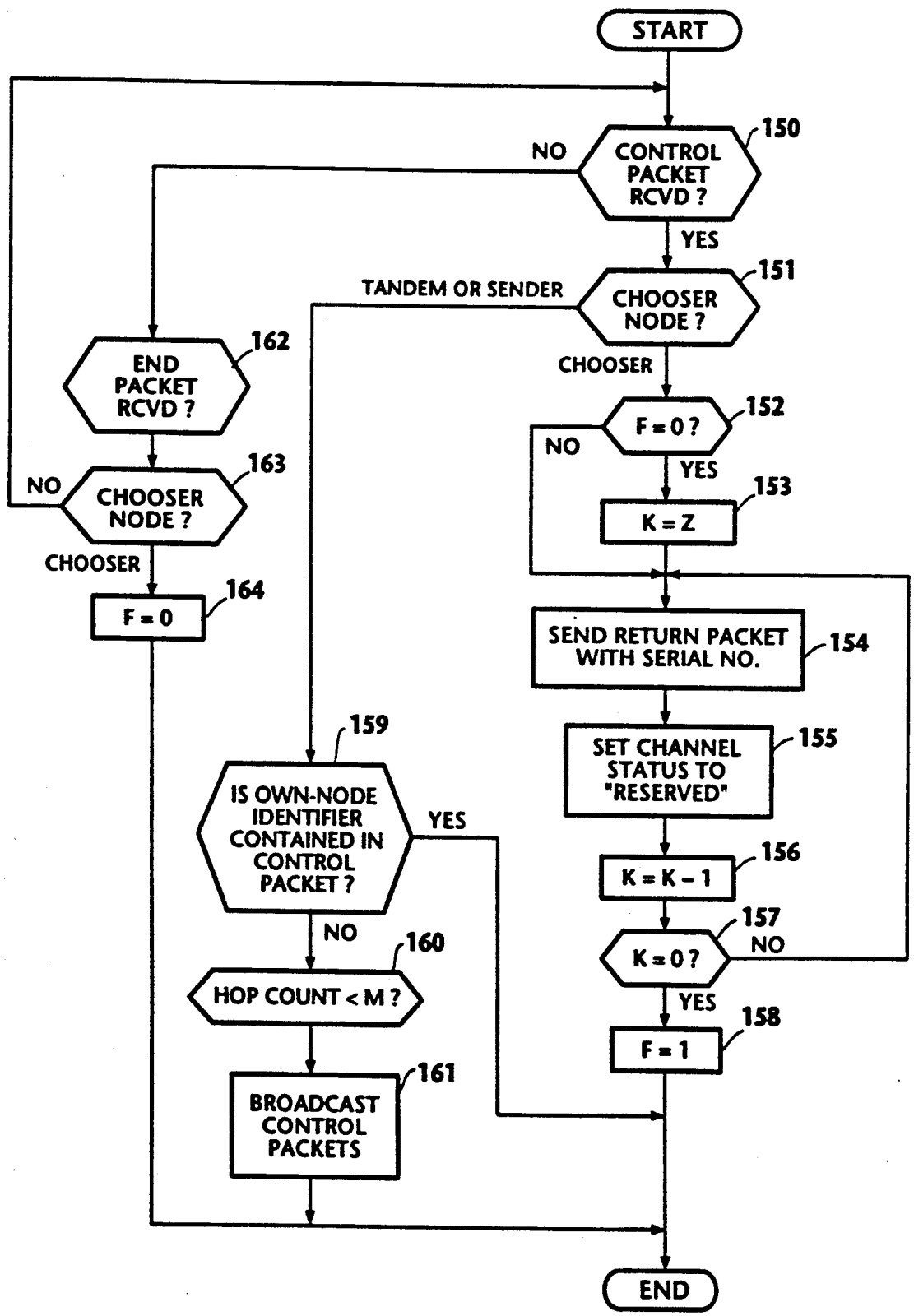

A modified embodiment of the present invention is shown in FIGS. 13 to 15. In this embodiment, the control-packet processor 30 is modified so that the sender node transmits a CONTROL packet which contains the minimum number of spare channels required, so that only one CONTROL packet is necessary for each line failure.

In FIG. 13, a control packet transmit routine begins with the reception of a line fault alarm from alarm detector 29 (step 140). Control then proceeds to step 141 to determine if the own node is a sender or not. If it is a sender, control advances to step 142 to set a variable X to the number of failed logical channels. Control then exits to decision step 143 which checks to see if all failed lines are searched. If not, control goes to step 144 to set a variable Y to the number of spare channels available. Step 144 is then executed to determine the minimum of the two variables X and Y and represents this minimum value as a variable Z. Control proceeds to step 146 to check to see if Z is zero or not. If the answer is negative, control moves ahead to step 147 to broadcast CONTROL packets to adjacent nodes, with each packet including the Z value as well as the logical channel ID of a spare channel to an adjacent node in the alternate LCID field, as shown in FIG. 15. Following step 147 or the affirmative decision of step 146, control returns to step 143 to repeat the process for other faulty lines if such lines exist.

In FIG. 14, a control packet receive routine begins with the reception of a CONTROL packet of the format of FIG. 15 from an adjacent node. (step 150). Control proceeds to step 151 to determine if the own node is a chooser or not. If it is a chooser, control advances to step 152 to check to see if flag F is 0. If the answer is affirmative, control exits to step 153 to set a variable K to the Z-value contained in the received CONTROL packet. If the answer is negative in step 152, control goes to step 154 skipping step 153 to send back a RETURN packet by copying the received CONTROL packet excluding the Z-field data, but including a return-packet serial number as in the previous embodiment. Control then exits to step 155 to set the status of the spare channel specified in the alternate LCID field of the received CONTROL packet to "reserved". The K-value is decremented (step 156) and is checked against zero (step 157). If K is not equal to zero, control returns to step 154 to repeat the process so that RETURN packets are sent back in number corresponding to the number of received CONTROL packets. When K=0, the flag F is set equal to 1 (step 158) and control moves to the end of routine.

If the own node is a tandem or sender, steps 159 to 161 are sequentially executed to broadcast CONTROL packets to neighboring nodes in a manner identical to that described in connection with steps 58 to 60 of FIG. 7.

When an END packet is transmitted in a manner as described in the previous embodiment and received by the control-packet processor 30 (step 162), control proceeds to step 163 to check to see if the own node is a chooser or not. If the answer is affirmative, control moves to step 164 to reset the flag F to zero.

Figure 16A:
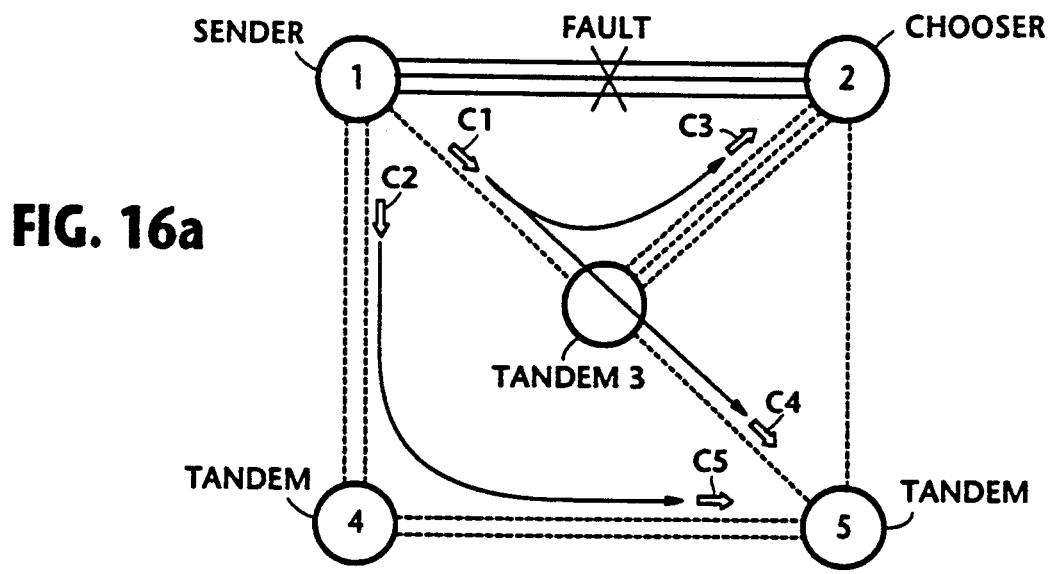
FIGS. 16a to 16c are diagrams associated with the second embodiment, showing the flows of various packets through the network in the event of a single cable failure.
Figure 16B:
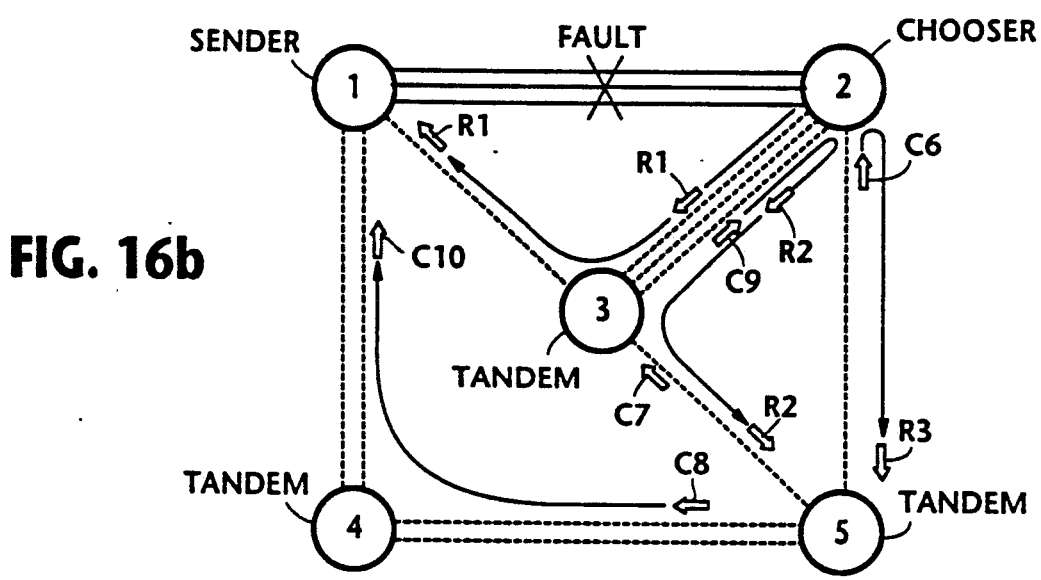

The operation of the modified embodiment will be described with reference to FIGS. 16a to 16d. As shown in FIG. 16a, the cable fault on transmission line 10 causes node 1 to broadcast CONTROL packets C1 and C2 to nodes 3 and 4, respectively as shown in FIG. 16a. CONTROL packet C1 is broadcast by node 3 as CONTROL packets C3 and C4 to nodes 2 and 5, respectively. CONTROL packet C2 is transmitted by node 4 as packet C5 to node 5. Packet C3 directed to chooser 2 causes it to send back a RETURN packet R1 as shown in FIG. 16b. RETURN packet R1 is passed through node 3 to sender 1.

In FIG. 16b, CONTROL packets C4 and C5 directed to node 5 cause it to broadcast CONTROL packets C6, C7 and C8 to nodes 2, 3 and 4, respectively. Chooser 2 responds to CONTROL packet C6 by returning a RETURN packet R3 to tandem node 5 and responds to CONTROL packet C9 by returning RETURN packet R2 to tandem node 3, which in turn passes it to tandem node 5.

Figure 16C:
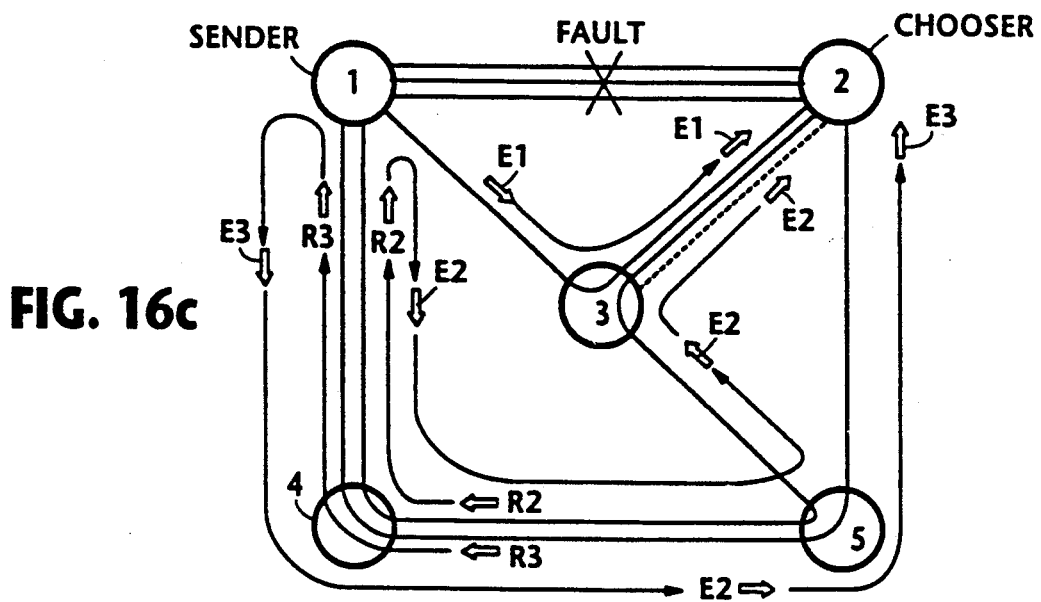

In FIG. 16c, RETURN packet R1 directed to sender 1 causes it to send back an END packet E1 to node 3 which establishes a connection between nodes 1 and 2 and relays this packet to chooser 2 to provide channel switching according to the logical channel identifiers contained in END packet E1. RETURN packets R2 and R3 directed to node 5 are passed through node 4 to sender 1. Sender 1 responds to RETURN packets R2 and R3 by switching failed channels according to the channel identifiers contained in packets R2 and R3 and returns END packets E2 and E3. Packet E2 passes through nodes 5 and 3 to node 2, while packet E3 passes through node 5 to chooser 2.

In the previous embodiments, transmission lines consist of channels of predetermined bandwidth. The present invention is modified to adapt itself to a network in which each transmission line consists of paths of different bandwidth to meet various operating speed requirements.

Figure 17:
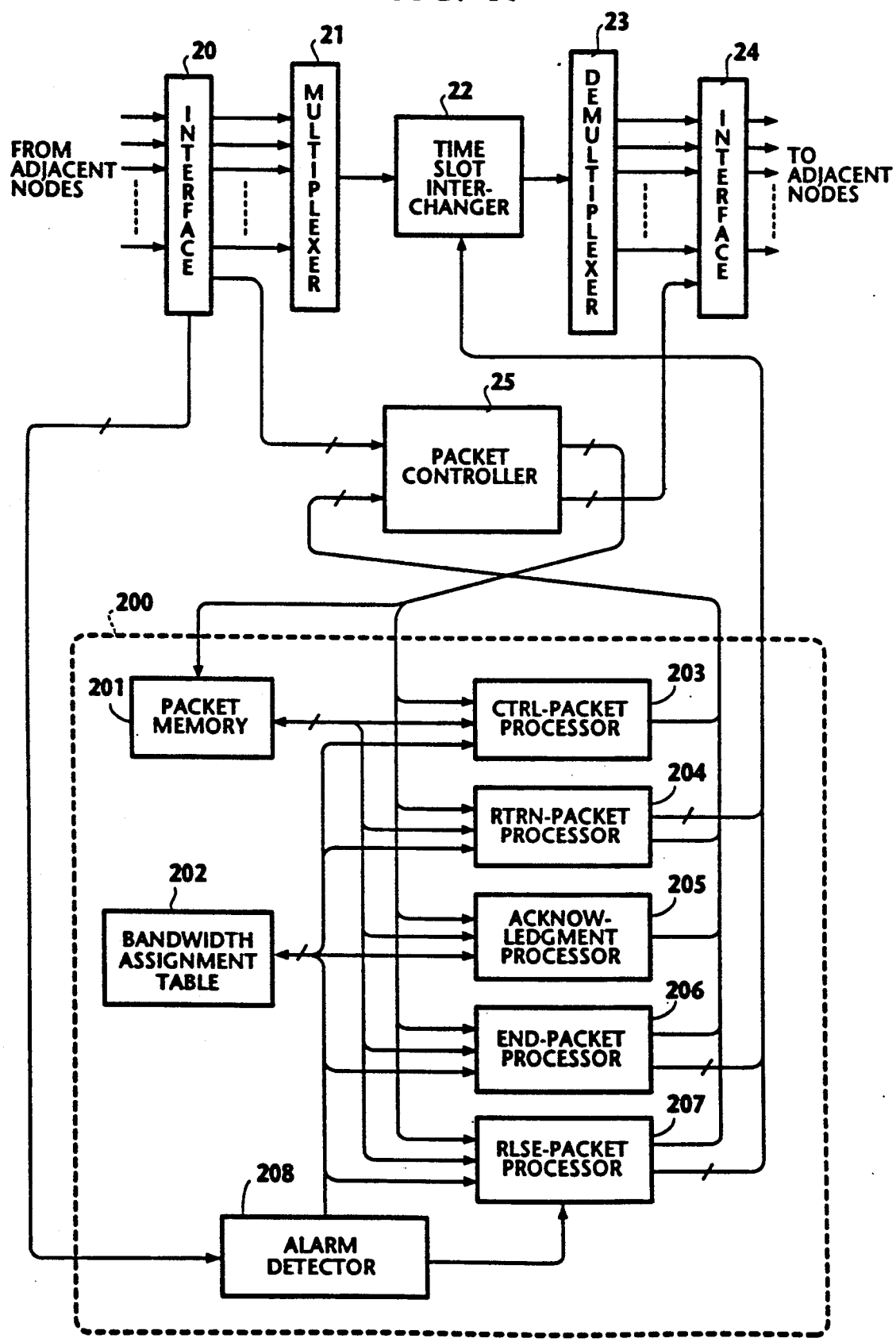
FIG. 17 is a block diagram of each node according to a third embodiment of the present invention.
Figures 18, 19, 24:
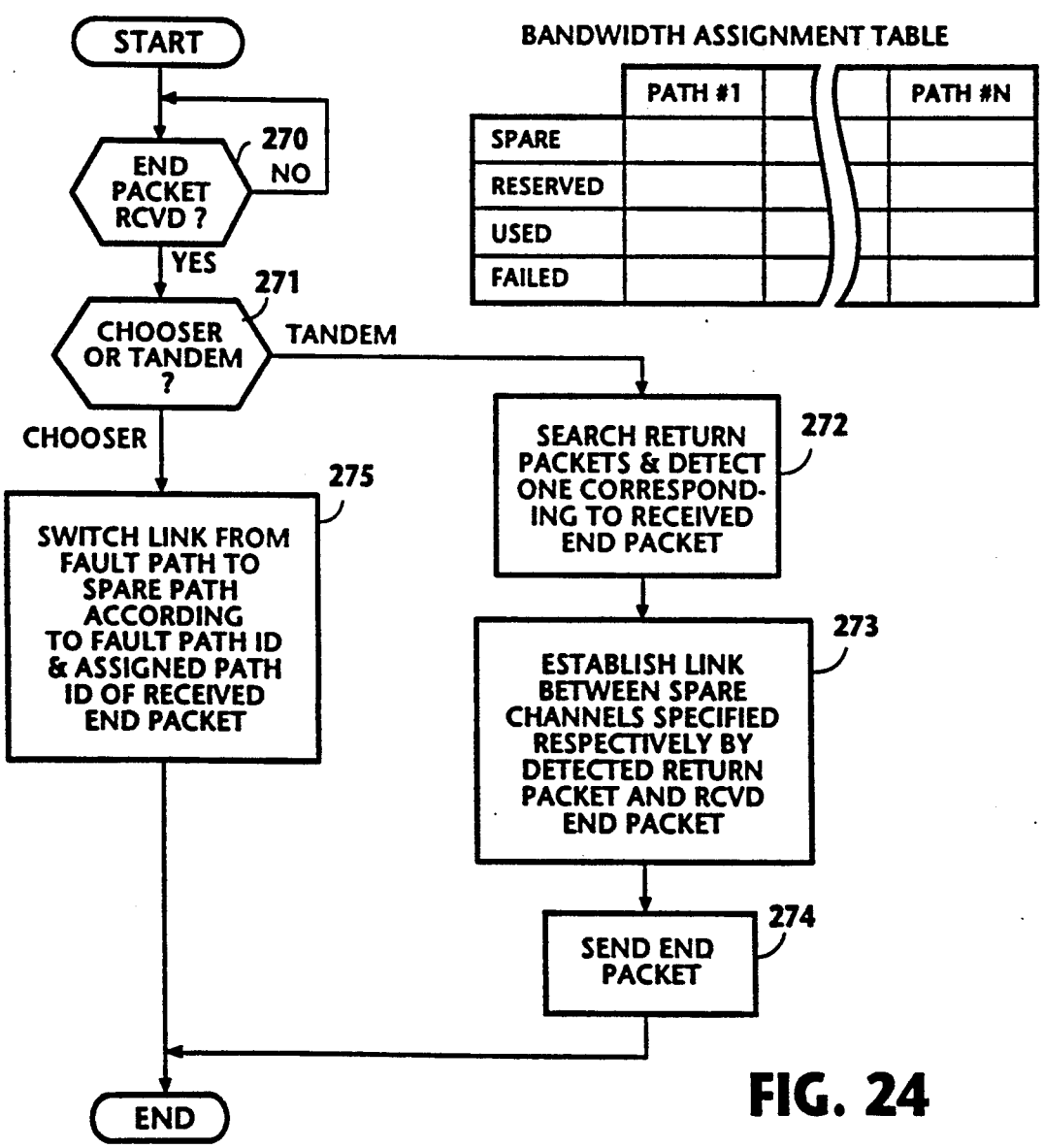
FIG. 18 is an illustration of the data formats of packets used in the third embodiment.
FIG. 19 is a schematic illustration of a bandwidth assignment table.
FIGS. 20 to 24 are flowcharts describing the operating functions of the rerouting controller of FIG. 17.

An embodiment shown in FIGS. 17 to 24 is to meet such different bandwidth requirements. In FIG. 17, rerouting controller 200 is provided which includes a packet memory 200 which is connected to packet controller 25 as in the previous embodiments to receive incoming packets through lines 25a to make a record of packets that have been propagated through different routes of the network. The packets received by controller 25 are also applied to a control-packet processor 203, a return-packet processor 204, an acknowledgment (ACK/NACK) processor 205, an end-packet processor 206, and a release-packet processor 207. Each of these processors has an access path to packet memory 201 to check the received packet against those stored in packet memory 201. A bandwidth assignment table 202 is provided instead of the channel status table 28 of FIG. 5. All processors are accessible to bandwidth assignment table 202 to update its contents whenever a packet is sent or received. An alarm detector 208 is responsive to the fault alarm signal from interface 20 to update the status of paths in the bandwidth assignment table 202 the detail of which is shown in FIG. 19. This table is similar to the channel status table of FIG. 3 except that logical channel entries are replaced with path entries. As shown in FIG. 18, CONTROL packet used in this embodiment differs from that of FIG. 15 in that it replaces the Z-field with a required bandwidth field.

In this embodiment, a packet called RELEASE packet (FIG. 18) is used to disconnect links that interconnect paths to provide long distance services if a cable failure occurs in such paths before the network proceeds with the failure-recovery rerouting operation.

Figure 20:
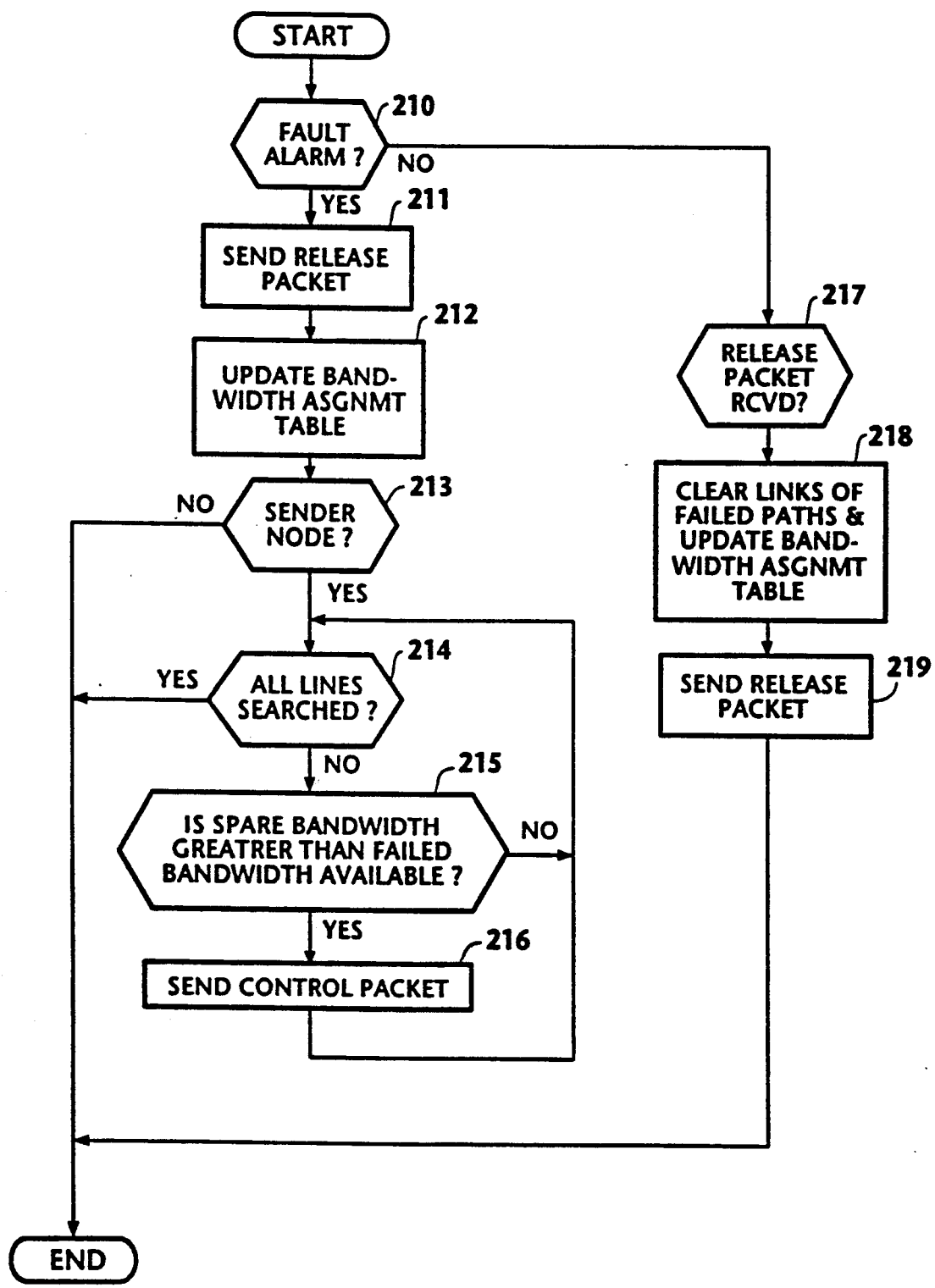
Figure 21:
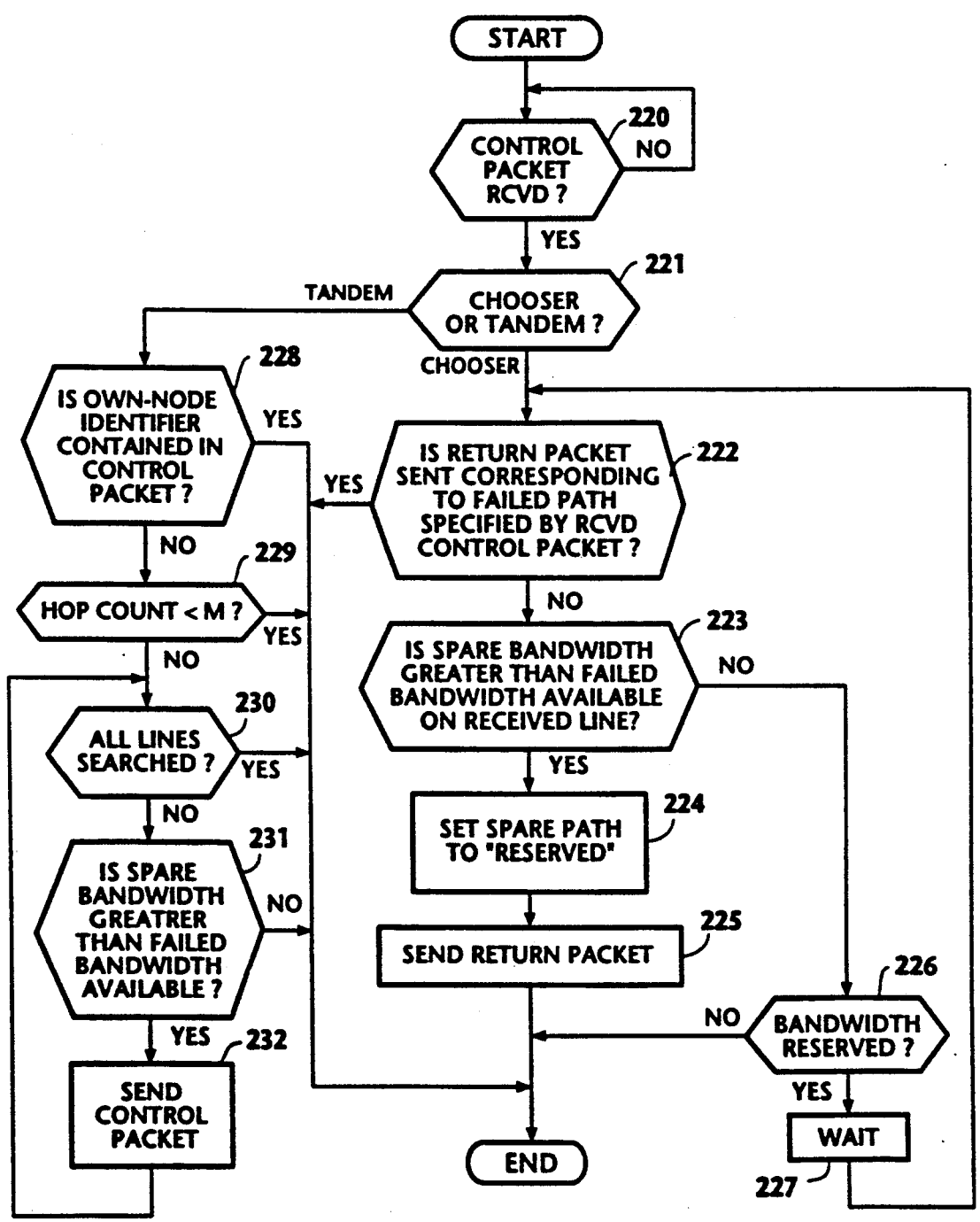
Figure 22:
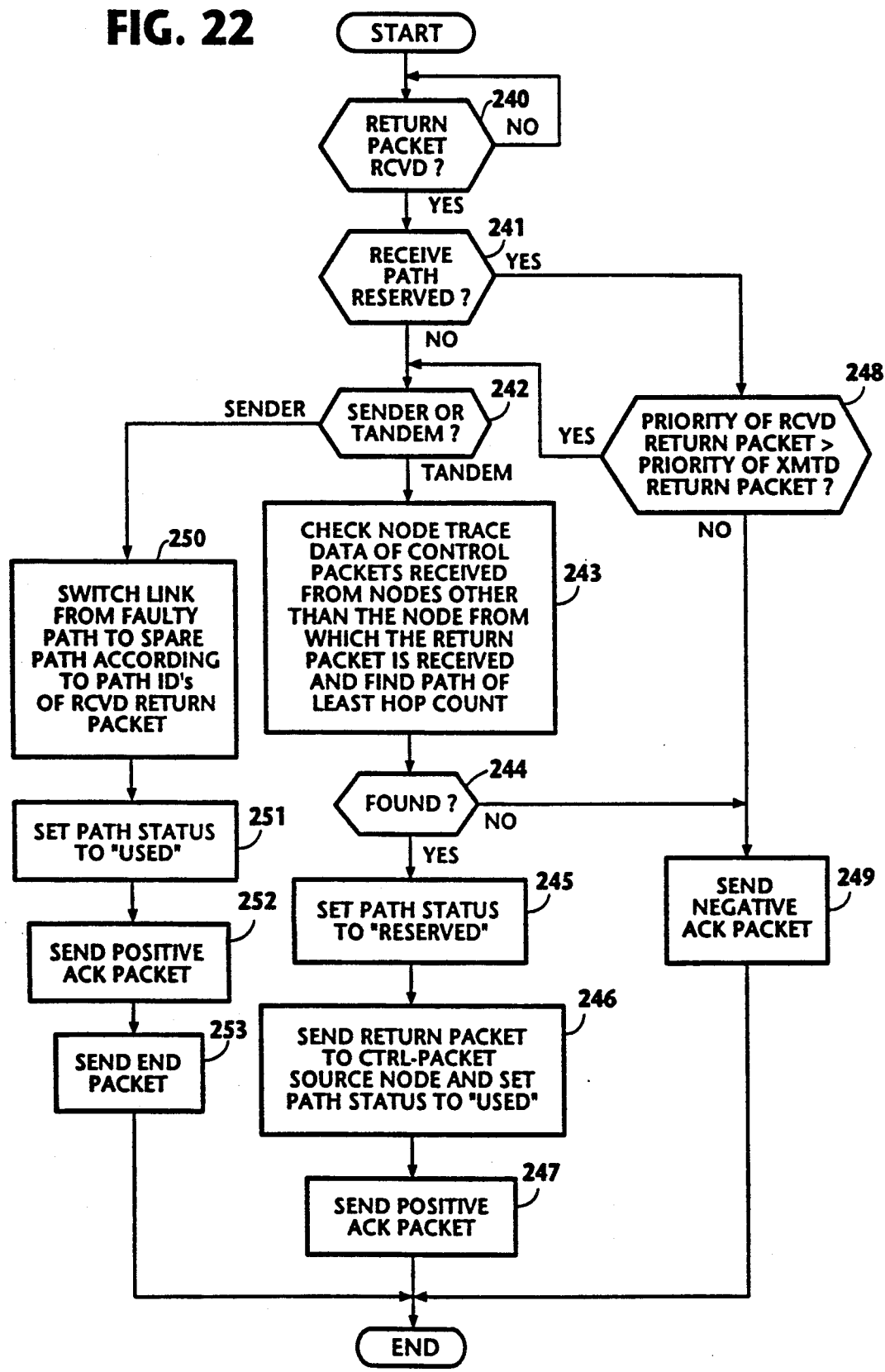
Figure 23:
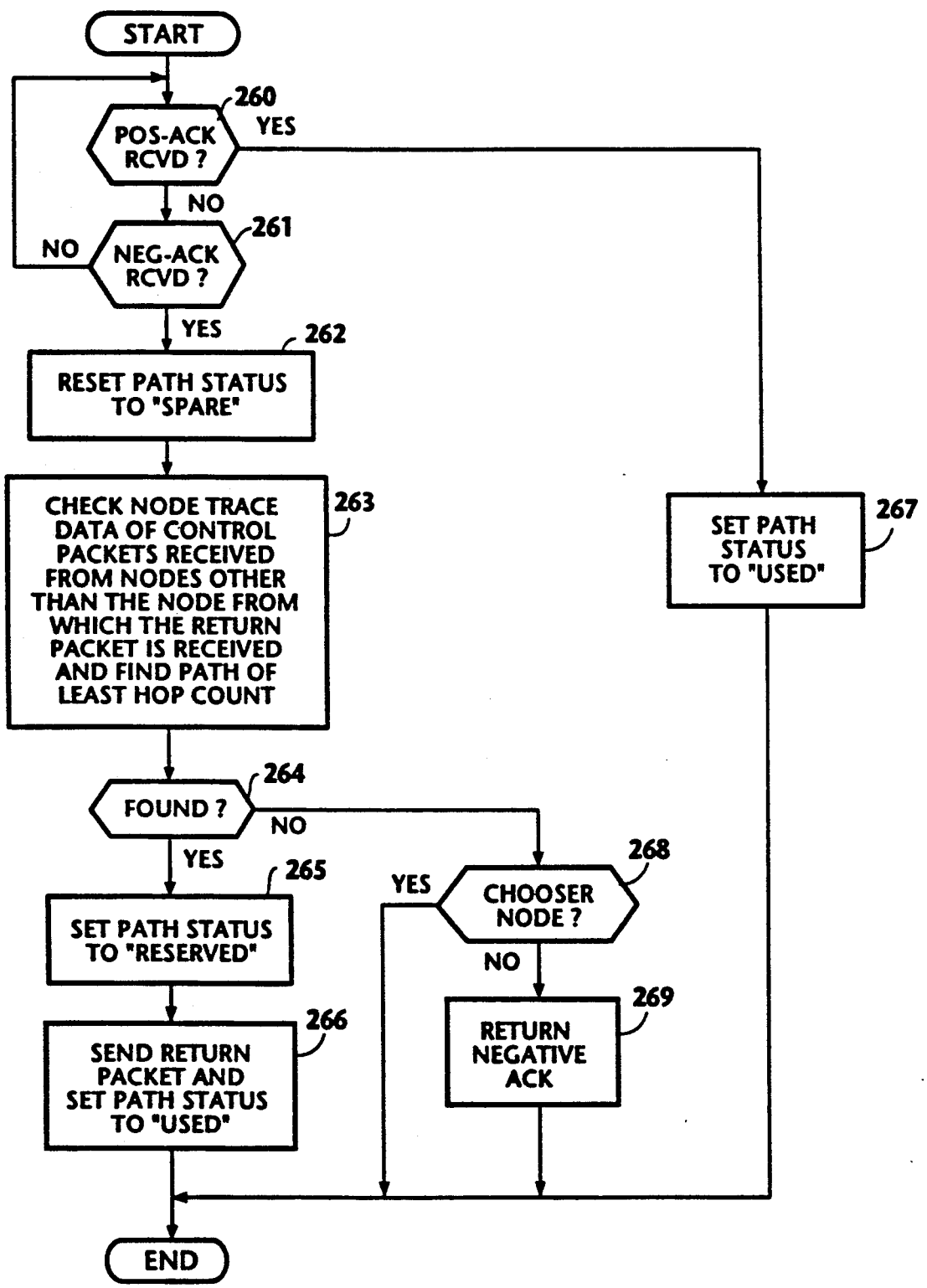

Details of processors 203 to 207 will be described by reference to FIGS. 20 to 24, with FIGS. 21 illustrating details of release-packet processor 207, FIG. 21 showing details of control-packet processor 203, while FIGS. 22, 23 and 24 showing details of return-packet processor 204, acknowledgment (ACK/NACK) processor 205 and end-packet processor 206, respectively.

In FIG. 20, the program execution of release-packet processor 203 starts in response to a fault alarm signal supplied from alarm detector 208 (step 210) indicating the bandwidth of faulty lines. Control advances to step 211 to send a RELEASE packet containing the failed path identifier to a node associated with the failed line. Control goes to step 212 to update the bandwidth assignment table 202 by setting the status of the entry for fault-free sections of failed paths from "used" to "spare" to make them available for use in establishing an alternate route. Exit then is to step 213 check to see if the present node is a sender or not in a manner identical to the previous embodiments. If the node receiving the fault alarm is a chooser, control moves ahead to the end of the routine. If it is a sender, control moves to decision step 214 to check to see if all faulty lines are searched.

If the answer is negative in step 214, control moves ahead to decision step 215 to access the bandwidth assignment table 202 to determine the availability of sufficient spare bandwidth in a transmission line to an adjacent node. If the spare bandwidth is greater than the bandwidth of a failed path, the answer is affirmative, and control exits to step 216 to generate a CONTROL packet containing various field items including the required bandwidth as indicated in FIG. 18 and send it to that adjacent node through a control channel that runs parallel to the spare bandwidth as if the packet were actually sent through it. Steps 214 and 215 will be repeated to search for the next line if required bandwidth is not available in a searched transmission line.

The transmitted RELEASE packet is received by an adjacent node which serves as an intermediate node establishing links for the failed paths. On receiving a RELEASE packet (step 217), control advances to step 218 to clear the links specified by the failed path identifier contained in the received RELEASE packet and update the bandwidth assignment table 202 by setting the status of the entry for fault-free sections of failed paths from "used" to "spare". Control then moves to step 219 to send a further RELEASE packet to a node which may be a further point of interconnection for the failed paths. Therefore, if spare bandwidths equal to or greater than the bandwidth of the failed paths are not available, no CONTROL packet is transmitted.

On receiving a CONTROL packet, the control-packet processor 203 of each receiving node starts executing a program described in FIG. 21 beginning with step 220. Control exits to step 221 to check to see if the present node is a chooser or not. If the node is tandem or sender, control advances to step 228. Similar to the previous embodiments, the node trace data is checked for the present node identifier bit. If the answer is affirmative, control moves ahead to the end of routine to prevent a CONTROL packet from repeatedly propagating through the same route. If the answer is negative, control moves to step 229 to check to see if the hop count of the CONTROL packet is smaller or greater than a prescribed value M. If the hop count value is smaller than M, control moves to operations step 229 to update the node trace data of the received packet by inserting the own-node identifier bit and incrementing the hop count field. If the hop count value is greater than M, control moves to step 230 to check to see if all lines are searched. If not, control proceeds to step 231 to determine whether there is a sufficient spare bandwidth in a transmission line to an adjacent node. If the answer is affirmative, control exits to step 232 to generate a copy of the received CONTROL packet by updating the node trace data and hop count fields and transmit it to a line containing the available bandwidth. Control now returns to step 230 to repeat the process so that copies of CONTROL packets are broadcast toward the chooser.

If the control-packet receiving node is a chooser, control moves to step 222 to check to see if a RETURN path has already been sent in respect of the failed path which is indicated by the failed path identifier field of the received CONTROL packet. If the answer is affirmative, control moves ahead to the end of routine. Otherwise, control moves to step 223 to determine whether there is a spare bandwidth greater than the required bandwidth on the received end of the line by consulting with the bandwidth assignment table 202. If the answer is negative in step 223, control moves to step 226 to determine if there is a reserved bandwidth. If there is none, control moves to the end of routine, and if there is one, exit is to step 227 to wait for a certain period of time and control returns to step 222. If the decision in step 223 is affirmative, control advances to step 224 to reserve the right to use the spare bandwidth as an alternate route for the specified faulty path, and the path status in the bandwidth assignment table 202 is set to "reserved". Control then exits to step 225 which directs the transmission of a RETURN packet with necessary data contained in it to the node from which the CONTROL packet was received.

In response to a RETURN packet, the return-packet processor 204 of each node executes a routine shown in FIG. 22 beginning with decision step 240. Control then exits to decision step 241 which checks to see if the bandwidth specified by the received RETURN packet is already reserved by consulting the corresponding entry of bandwidth assignment table 202. If this is the case, the received RETURN packet has crossed with a transmitted RETURN packet and contention has occurred, and control moves to step 248 to determine whether the received RETURN packet has a priority higher than the priority of the transmitted RETURN packet. If the outcome of decision in step 248 is affirmative, control exits to step 242 to check to see if the present node is a sender or a tandem. If the answer in step 248 is negative, control proceeds to step 249 to send a negative ACK packet to the node from which the incoming RETURN was received.

If the present node is a tandem or a chooser, exit from step 242 is operations step 243 to search the node trace data field of all CONTROL packets which are stored in packet memory 201 and which have been received from nodes other than the node from which the incoming RETURN packet is received and find a CONTROL packet having a path with a least hop count to the sender. If there is none (step 244), step 249 is executed by returning a NACK packet, and if there is one, control exits to step 245 to locate a spare bandwidth in the transmission line through which the CONTROL packet found by steps 243 and 244 was previously received, and set the status of the located spare bandwidth from "spare" to "reserved". The path status updating step is followed by step 246 in which a new RETURN packet is regenerated by containing in it the identifier of the path just reserved by step 245 and transmitted back to a node indicated by the node trace data of the CONTROL packet found in the steps 243, 244, and the status of the path through which the RETURN packet was received is set to "used". Control now exits to step 247 to send a positive ACK packet to the node from which the RETURN packet was received to allow it to update the status of the corresponding path.

If the present node is a sender, step 250 is executed to control the time slot interchanger 22 by rewriting its time slot memory so that a link coupling a user terminal to a failed path identified by the just-received RETURN packet is switched from the failed path to a spare path which is also specified by the same packet. In step 251, the status of the now assigned spare path is set to "used". Control exits to step 252 to return a positive acknowledgment packet. A copy of the RETURN packet is generated by containing in it the identifier of the switched (assigned) faulty path and the identifier of the switched (assigned) spare path and transmitted back to the source node of the RETURN packet as an END packet (step 253).

In FIG. 23, an acknowledgment routine is initiated in response to the receipt of either positive or negative acknowledgment packet. In response to a positive acknowledgment packet, control moves past step 260 to step 267 to set the status of the incoming channel of the positive packet to "used". If a negative acknowledgment packet is received, control moves past steps 260, 261 to step 262 to reset the status of the incoming channel of the packet from "reserved" to "spare" and moves ahead to step 263 to search the node trace data field of all CONTROL packets which are stored in packet memory 201 and which have been received from nodes other than the node from which the incoming NACK packet is received and find a CONTROL packet having an outgoing channel with a least hop count to the sender. If there is none (step 264), step 268 is executed to determine whether the present node is a chooser, and if so, control moves to the end of the routine; if not, a NACK packet is sent back to the source node (step 269). If the answer is affirmative in decision step 264, control exits to step 265 to set the status of the least hop-count path to "reserved", and proceeds to step 266 to generate a RETURN packet by containing in it the identifier of the reserved spare path as well as the identifier of the failed path copied from the received NACK packet, the RETURN packet being sent to a node to, which the reserved outgoing path extends. Following the transmission of the RETURN packet, the status of the entry for the now-switched path is changed from "reserved" to "used".

When an END packet is received, the end-packet processor 206 of each node executes a routine shown in FIG. 24 beginning with step 270. If the present node is a tandem, control passes through step 271 to step 272 to search all RETURN paths it has received and find one corresponding to the received END packet. Control goes to step 273 to control the time slot interchanger 22 so that a link is established between a spare path specified by the assigned path field of the END packet and the reserved path field of the corresponding RETURN packet. Control goes to step 274 to copy the received END packet and transmit it to the node to which the path reserved by the corresponding RETURN packet extends. If the present node is a chooser, control exits to step 275 to control the time slot interchanger so that a link coupling a user terminal to a failed path is switched from the failed path to a spare path according to data contained in the fault path ID and the assigned path ID of the received END packet.

Figure 25A:
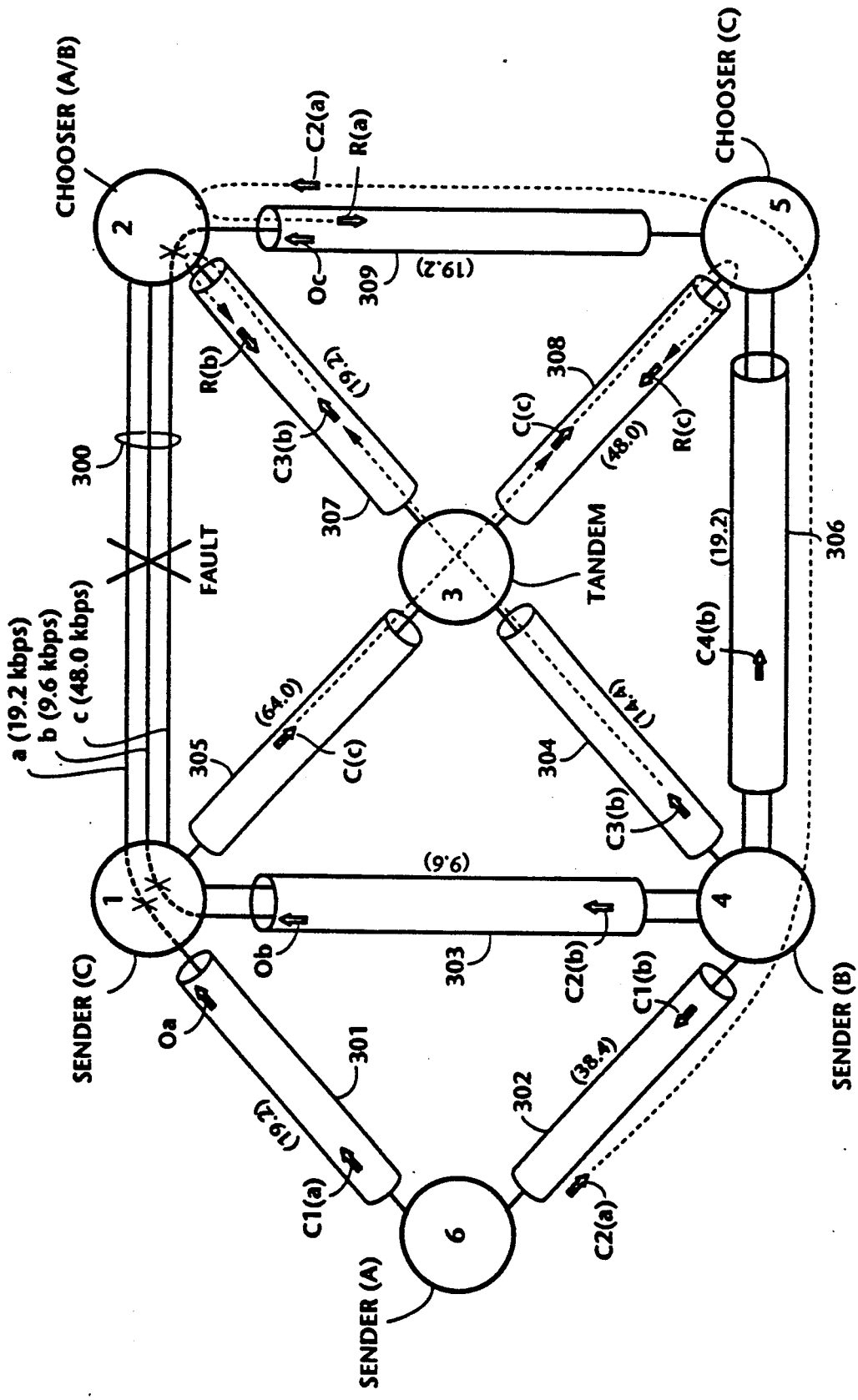
FIGS. 25a and 25b are diagrams associated with the third embodiment, showing the flows of various packets through a communications network.
Figure 25B:
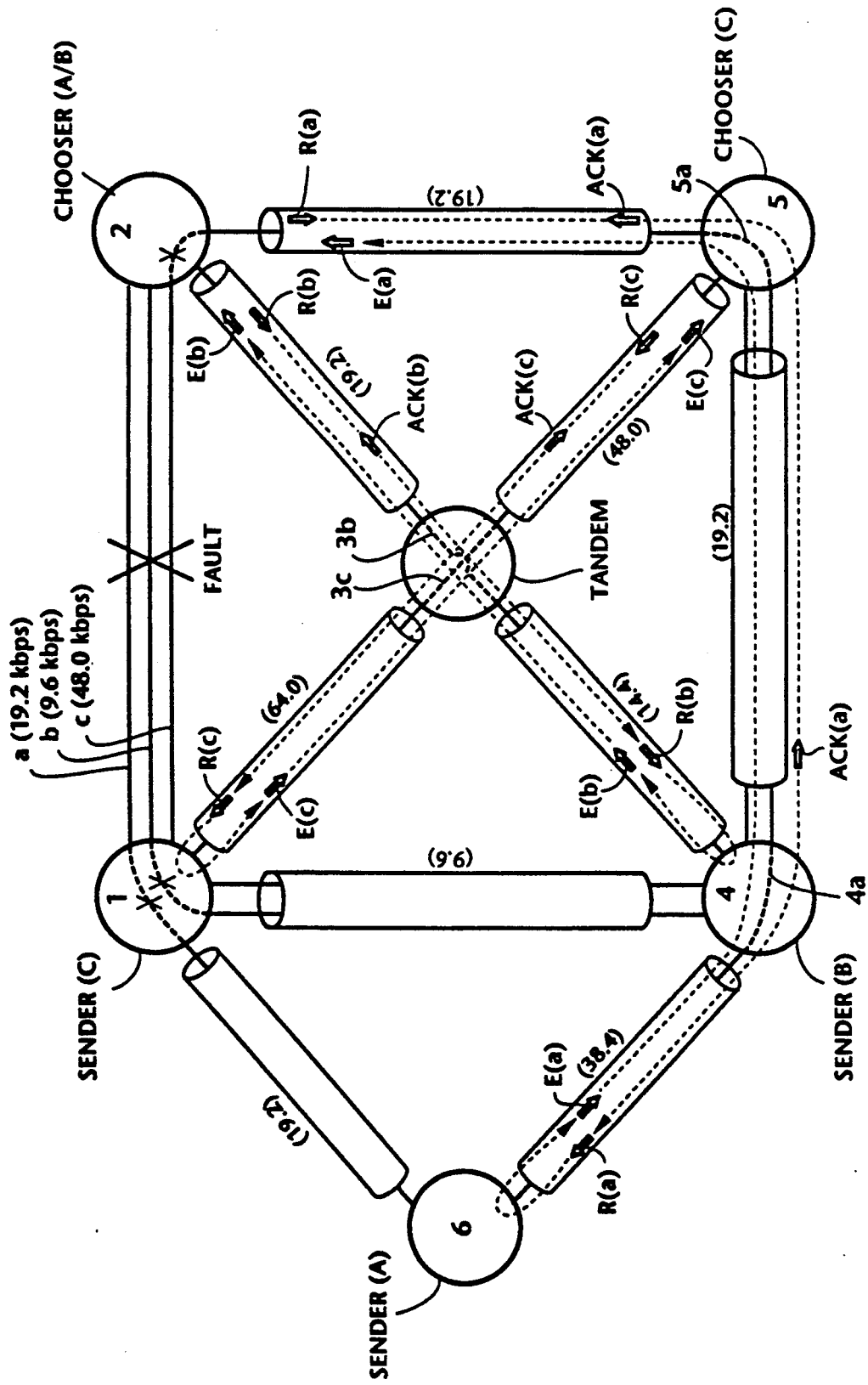

The operation of the embodiment of FIG. 17 will be best understood with the following description given with reference to FIGS. 25a to 25b.

Consider a network having six nodes 1 through 6 as illustrated in FIG. 25a. In this network, nodes 2 and 6 are interconnected by a path "a" having a bandwidth, or transmission speed of 19.2 kbps, with node 1 acting as an intermediate node establishing a link to form the path "a". Nodes 2 and 3 are interconnected by a path "b" with an transmission speed of 9.6 kbps, with node 1 establishing a link between them. Nodes 1 and 5 are interconnected by a path "c" with a transmission speed of 48.0 kbps, with node 2 establishing a link between them. The network has the following spare bandwidths available between nodes:
19.2 kbps for line 301 between nodes 6 and 1:
38.4 kbps for line 302 between nodes 6 and 4:
9.6 kbps for line 303 between nodes 4 and 1:
14.4 kbps for line 304 between nodes 4 and 3:

64.0 kbps for line 305 between nodes 1 and 3:
19.2 kbps for line 306 between nodes 4 and 5:
19.2 kbps for line 307 between nodes 3 and 2:
48.0 kbps for line 308 between nodes 3 and 5:
19.2 kbps for line 309 between nodes 5 and 2:

Assume that a line fault occurs in transmission line 300 between nodes 1 and 2, and nodes 6 and 2 act as sender and chooser, respectively; for line "a", nodes 4 and 2 as sender and chooser, respectively; for line "b", and nodes 1 and 5 as sender and chooser, respectively, for line "c".

In response to the occurrence of the line fault, the terminating nodes 6, 4, 1, 2 and 5 of the failed paths are alerted and transmit RELEASE packets onto the line containing one or more failed paths (step 211, FIG. 20). Thus, RELEASE packets Oa, Ob and Oc are forwarded from nodes 6, 4 and 5 toward nodes 1 and 2. On receiving these packets, nodes 1 and 2 clear the links associated with the failed paths as marked "x" in FIG. 25a (step 216). While nodes 1 and 2 may transmit further RELEASE packets to the failed line as they execute step 218, these packets have no useful effects since no further intermediate nodes exist between nodes 1 and 2.

Each of the sender nodes 6, 4 and 1 for paths "a", "b" and "c" then goes through step 214 to check to see if the spare paths on transmission lines to adjacent nodes have a greater bandwidth than that of the failed path. Since lines 301 and 302 have sufficient spare bandwidths as alternate routes, node 6, acting as a sender for path "a", transmits CONTROL packets C1(a) and C2(a) respectively onto lines 301 and 302 (step 215). Likewise, node 4, acting as a sender for path "b" sends CONTROL packets C1(b), C2(b), C3(b) and C4(b) onto lines 302, 303, 304 and 306, respectively. Node 1, acting as a sender for path "c", transmits only one CONTROL packet C(c) onto line 305.

Node 1 treats CONTROL packet C1(a) as a tandem node (steps 230 and 231) and passes it on to node 3, but cannot find available spare bandwidth on line 303. CONTROL packet C2(a), on the other hand, cannot find its way towards node 1 or node 3, but finds its way through nodes 4 and 5 to chooser 2, whereupon it sends back a RETURN packet R(a) onto line 309 (steps 222 to 225). Among the CONTROL packets broadcast from sender 4, packet C3(b) finds its way through node 3 to chooser 2 and causes it to transmit a RETURN packet R(b) onto line 307, while the other packets will be eventually lost as they propagate through the network. Packet C(c) from node 1 is passed through node 3 to chooser 5 and causes it to send back a RETURN packet R(c) onto line 308.

RETURN packet R(a) issued from chooser 2 is passed through nodes 5 and 4 to sender 6 (see FIG. 25b) while acknowledging the reservation of spare paths with packets ACK(a) returned to nodes 2 and 5 and setting the status of the reserved paths to "used" (steps 243 to 247 of FIG. 22). On receiving RETURN packet R(a), node 6 acts as a sender and switches the failed path "a" to a path specified in the reserved path field of RETURN packet R(a) and returns an END packet E(a) (steps 250 to 253) to node 4. On receiving this END packet, node 4 executes steps 272 to 274 of FIG. 24 and establishes a link 4a between nodes 6 and 5 (steps 275, FIG. 24) according to the data contained in the reserved path field of the corresponding RETURN packet, i.e. packet R(a), and the assigned path field of END packet E(a). Similar events take place in node 5 so that a link 5a is established between node 4 and 2 as an alternate route for path "a". In response to END packet E(a), node 2 acts as a chooser and prosecutes step 275 of FIG. 24 to switch the failed path "a" to the path now established from node 6 through nodes 4 and 5 according to data contained in the fault path ID field and the assigned path ID of END packet E(a).

Likewise, RETURN packet R(b) from chooser 2 is passed through node 3 to node 4 which acts as a sender. Thus, node 4 switches the failed path "b" to the path specified in the reserved path field of RETURN packet R(b) and sends back an END packet E(b), which causes node 3 to establish a link 3b between nodes 4 and 2. On receiving END packet E(b), chooser 2 switches the failed path "b" to the path now established from node 4 through node 3 according to data contained in END packet E(b). Finally, RETURN packet R(c) from sender 5 causes node 3 to relay its copy to sender 1 which responds to it by switching the failed path "c" to the path identified by RETURN packet R(c) and sending back an END packet E(c) to node 3. Node 3 establishes a link 3c in response to packet E(c) and passes it to chooser 5, whereupon it switches the failed path "c" to the path identified by END packet E(c).

The foregoing description shows only preferred embodiments of the present invention. Various modifications are apparent to those skilled in the art without departing from the scope of the present invention which is only limited by the appended claims.

What is claimed is:

1. A failure restoration method for a communications network having first and second nodes and a plurality of third nodes, said first, second and third nodes being interconnected by lines having regular and spare channels, wherein said plurality of third nodes are interconnected by spare channels and capable of linking the spare channels for establishing an alternate route between said first and second nodes, comprising the steps of:

a) transmitting, in response to a failure in regular channels terminating at said first node, as many CONTROL packets as there are failed regular channels from said first node to all adjacent ones of said third nodes, each of said CONTROL packets containing a hop count indicating the number of nodes through which the CONTROL packet has travelled and node trace data indicating identifications of nodes through which the CONTROL packet has travelled;

b) making a record of all CONTROL packets arriving at each of said third nodes, and broadcasting copies of a received CONTROL packet from each third node to adjacent nodes located along routes toward said second node if the hop count of the received packet is smaller than a prescribed value, each copy of CONTROL packets containing an incremented hop count and an updated version of the node trace data;

c) responsive to copies of CONTROL packets arriving at said second node, transmitting as many RETURN packets from the second node to a given third node as there are CONTROL packets received from said given third node, each of said RETURN packets containing a route index number, node trace data indicating identifications of nodes through which the RETURN packet has travelled and a spare channel identifier indicating a spare channel which leads to said given third node and forms part of an alternate route for one of said failed channels;

d) making a record of all RETURN packets arriving at said given third node, checking the node trace data of each of the received RETURN packets against the node trace data of the received CONTROL packets in said record to detect whether there is a spare channel to an adjacent node located on a route leading to said first node with a least hop count and forms part of said alternate route, transmitting a copy of each received RETURN packet to said adjacent node if a spare channel is detected, and returning a negative acknowledgement packet on a line through which the received RETURN packet was transmitted to cause retransmission of a RETURN packet to another third node if no spare channel is detected, each copy of RETURN packet containing a copy of the route index number, an updated version of the node trace data and an updated version of the spare channel identifier indicating said detected spare channel;

e) responsive to receipt of each copy of RETURN packet, switching a link of said first node from one of said failed channels to a spare channel indicated by the spare channel identifier of the received copy of RETURN packet, and transmitting therefrom an END packet to said indicated spare channel, said END packet containing a copy of said route index number, a failed channel identifier indicating the failed channel of said link and a copy of said spare channel identifier;

f) responsive to receipt of said END packet, making a search through the RETURN packets in said record to detect a RETURN packet having a route index number identical to the route index number of said END packet, establishing a new link through spare channels respectively indicated by the spare channel identifiers of the received END packet and the detected RETURN packet, and transmitting a copy of the received END packet through the new link to said second node, said copy of END packet containing said failed channel identifier and a copy of the spare channel identifier of the received END packet; and g) responsive to receipt of each copy of END packet, switching a link of said second node from a failed channel to a spare channel indicated respectively by the failed channel identifier and the spare channel identifier of the received copy of END packet.

2. A failure restoration method for a communications network having first and second nodes and a plurality of third nodes, said first, second and third nodes being interconnected by lines having regular and spare channels, wherein said plurality of third nodes are interconnected by spare channels and capable of linking the spare channels for establishing an alternate route between said first and second nodes, comprising the steps of:

a) transmitting, in response to the occurrence of said line failure, a CONTROL packet from said first node to all adjacent ones of said third nodes, said CONTROL packet containing a hop count indicating the number of nodes through which the CONTROL packet has travelled, node trace data indicating identifications of nodes through which the CONTROL packet has travelled, and an available spare channel count indicating the number of spare channels available at said first node;

b) making a record of all CONTROL packets arriving at each of said third nodes, and broadcasting as many copies of a received CONTROL packet from each third node to adjacent nodes located along routes toward said second node as there are spare channels indicated by the received CONTROL packet if the hop count of the received CONTROL packet is smaller than a prescribed value, each copy of CONTROL packets containing an incremented hop count, an available spare channel count indicating the number of available spare channels, and an updated version of the node trace data;

c) responsive to copies of CONTROL packets arriving at said second node from a given one of said third nodes, transmitting as many RETURN packets from the second node to said given third node as there are spare channels indicated by the available spare channel count of the received copy of CONTROL packet, each of said RETURN packets containing a route index number, node trace data indicating identifications of nodes through which the RETURN packet has travelled and a spare channel identifier indicating a spare channel which leads to said given third node and forms part of an alternate route for one of said failed channels;

d) making a record of all RETURN packets arriving at said given third node, checking the node trace data of each of the received RETURN packets against the node trace data of the received CONTROL packets in said record to detect whether there is a spare channel to an adjacent node located on a route leading to said first node with a least hop count and forms part of said alternate route, transmitting a copy of each received RETURN packet to said adjacent node if a spare channel is detected, and returning a negative acknowledgement packet on a line through which the received RETURN packet was transmitted if no spare channel is detected to cause retransmission of a RETURN packet to another third node, each copy of RETURN packet containing a copy of the route index number, an updated version of the node trace data and an updated version of the spare channel identifier indicating said detected spare channel;

e) responsive to receipt of each copy of RETURN packet, switching a link of said first node from one of said failed channels to a spare channel indicated by the spare channel identifier of the received copy of RETURN packet, and transmitting therefrom an END packet on the indicated spare channel, said END packet containing a copy of said route index number, a failed channel identifier indicating the failed channel of said link and a copy of said spare channel identifier;

f) responsive to receipt of said END packet, searching through the RETURN packets in said record to detect a RETURN packet having a route index number identical to the route index number of said END packet, establishing a new link through spare channels respectively indicated by the spare channel identifiers of the received END packet and the detected RETURN packet, and transmitting a copy of the received END packet through the new link which leads to said second node, said copy of END packet containing said failed channel identifier and a copy of the spare channel identifier of the received END packet; and g) responsive to receipt of each copy of END packet, switching a link of said second node from a failed channel to a spare channel indicated respectively by the failed channel identifier and the spare channel identifier of the received copy of END packet.

3. A failure restoration method as claimed in claim 1 or 2, wherein said failed regular channels are assigned different levels of priority, and the step (e) switches the link from said failed channel to said spare channel according to the priority assigned to the failed regular lines.

4. A failure restoration method as claimed in claim 1 or 2, wherein each of said CONTROL packets transmitted from said first node further contains a fault location identifier indicating the location of said line failure in said network for allowing each of said third nodes to discriminate between received packets according to the fault location identifiers of line failures which occur simultaneously at different locations of the network.

5. A failure restoration method as claimed in claim 1 or 2, wherein each of said CONTROL packets transmitted from said first node further contains a priority identifier indicating priority given to each one of said failed regular channels, and each of said RETURN packets transmitted from said second node includes a copy of said priority identifier, wherein each of said third nodes examines the priority identifier contained in a received RETURN packet if a spare channel indicated by the spare channel identifier of the received RETURN packet is already reserved by a transmitted RETURN packet and returns a negative acknowledgment packet to the node from which the RETURN packet was received to cause retransmission of a RETURN packet to another third node if the priority of said received RETURN packet is lower than the priority of said transmitted RETURN packet.

6. A failure restoration method as claimed in claim 1 or 2, wherein said second node makes a record of all CONTROL packets received from said third nodes, makes a search through the node trace data of all CONTROL packets in said record in response to said negative acknowledgment packet to detect whether there is a spare channel to an adjacent node located on a route leading to said first node with a least hop count, and transmits a RETURN packet to said adjacent node containing a spare channel identifier indicating the detected spare channel.

7. A failure restoration method for a communications network having first and second nodes, and a plurality of third nodes interconnected by regular and spare channels and capable of establishing links through the spare channels for establishing an alternate route between said first and second nodes, said third nodes being located between said first and second nodes, a series of said channels between said first and second nodes forming a path, each of said channels having a different bandwidth, comprising the steps of:

a) detecting, in response to a failure in a path, a spare channel from said first node to each of adjacent ones of said third nodes having a required bandwidth equal to or greater than the bandwidth of the failed path, and transmitting a CONTROL packet from said first node to each of adjacent third nodes if a spare channel having said required bandwidth is detected, said CONTROL packet containing a hop count indicating the number of nodes through which the CONTROL packet has travelled, node trace data indicating identifications of nodes through which the CONTROL packet has travelled, a bandwidth identifier indicating said required bandwidth, and a fault path identifier indicating one of said failed paths;

b) responsive to receipt of each of said CONTROL packets,
  (i) making a record of CONTROL packets arriving at each of said third nodes,
  (ii) detecting a spare channel from each of said third nodes to each adjacent node having a bandwidth equal to or greater than the bandwidth indicated by the bandwidth identifier of the received CONTROL packet, and
  (iii) transmitting a copy of each received CONTROL packet to each adjacent node if a spare channel having said bandwidth is detected and if the hop count of the received CONTROL packet is smaller than a prescribed value, each transmitted copy of CONTROL packet containing updated versions of the hop count, node trace data, and copies of the required bandwidth and fault path identifier;

c) responsive to each copy of CONTROL packet arriving at said second node from a given one of said third nodes, transmitting a RETURN packet from said second node to said given third node, said RETURN packet containing a spare channel identifier indicating a spare channel which leads to said given third node and forms part of an alternate route, an updated version of the node trace data, and a copy of the fault path identifier;

d) at said given third node, responsive to receipt of RETURN packet,
  (i) making a record of all RETURN packets arriving at said given third node,
  (ii) checking the node trace data of each arriving RETURN packets against the node trace data of the received CONTROL packets to detect whether there is a spare channel to an adjacent node located on a route leading to said first node with a least hop count and forms part of the alternate route,
  (iii) transmitting a copy of each received RETURN packet from said given third node to said adjacent node if a spare channel is detected, and
  (iv) returning a negative acknowledgment packet to said second node if no spare channel is detected to cause retransmission of a RETURN packet from the second node to another third node, said copy of RETURN packet containing updated versions of the node trace data and spare channel identifier indicating the detected spare channel and a copy of said fault path identifier;

e) at said first node, responsive to receipt of each copy of RETURN packet,
  (i) switching a link of said first node from one of said failed paths to a spare channel indicated by the spare channel identifier of the received copy of RETURN packet, and
  (ii) transmitting therefrom an END packet on the indicated switched spare channel, said END packet containing a fault path identifier indicating the failed path of said link and a copy of the spare channel identifier;

f) responsive to receipt of each END packet arriving at each of said third nodes located along a route toward said second node, (i) making a search through the node trace data of all RETURN packets in said record, (ii) detecting a RETURN packet whose fault path identifier is identical to the fault path identifier of the received END packet, (iii) establishing a new link through spare paths respectively indicated by the spare path identifiers of the detected RETURN packet and the received END packet, and (iv) transmitting a copy of the received END packet to an adjacent node through the new link to said second node, said copy of END packet containing copies of the fault path identifier and spare path identifier of the received END packet; and g) at said second node, responsive to receipt of the copy of END packet, switching a link of said second node from one of said failed paths indicated by the fault path identifier of the received copy of END packet to a spare channel indicated by the spare channel identifier contained therein.

8. A failure restoration method as claimed in claim 7, wherein each of said CONTROL packets transmitted from said first node further contains a priority identifier indicating priority given to each one of said failed regular paths, and each of said RETURN packets transmitted from said second node includes a copy of said priority identifier, wherein each of said third nodes examines the priority identifier contained in a received RETURN packet if a spare path indicated by the spare path identifier of the received RETURN packet is already reserved by a transmitted RETURN packet and returns a negative acknowledgment packet to the node from which the RETURN packet was received to cause retransmission of a RETURN packet to another third node if the priority of said received RETURN packet is lower than the priority of said transmitted RETURN packet.

9. A failure restoration method as claimed in claim 7, wherein said second node makes a record of all CONTROL packets received from said third nodes, makes a search through the node trace data of all CONTROL packets in said record in response to said negative acknowledgment packet to detect whether there is a spare path to an adjacent node located on a route leading to said first node with a least hop count, and transmits a RETURN packet to said adjacent node containing a spare path identifier indicating the detected spare path.

10. A failure restoration method for a communications network having a plurality of nodes interconnected by regular and spare path sections, there being a plurality of subnetworks each comprising first and second terminal nodes and an intermediate node, the intermediate node providing a link between regular path sections to establish a regular path between said first and second terminal nodes, the nodes of each subnetwork functioning as third nodes of one or more of other subnetworks for establishing a link between spare path sections to form an alternate route between the first and second terminal nodes of said other subnetworks, each of said path sections having a different bandwidth, comprising the steps of:

a) responsive to occurrence of a line failure on one of the regular path sections of said regular path in one of said subnetworks, (i) transmitting a RELEASE packet from one of said terminal nodes of said subnetwork to the intermediate node thereof to clear a link so that another path section of said regular path is made available for use as a spare path section, (ii) detecting a spare path section from said first terminal node of said subnetwork to each of adjacent ones of said third nodes having a required bandwidth equal to or greater than the bandwidth of said failed regular path, and (iii) transmitting a CONTROL packet from said first node to each of adjacent third nodes if a spare path section having said required bandwidth is detected, said CONTROL packet containing a hop count indicating the number of nodes through which the CONTROL packet has travelled, node trace data indicating identifications of nodes through which the CONTROL packet has travelled, a bandwidth identifier indicating said required bandwidth, and a fault path identifier indicating said failed regular path;

b) responsive to receipt of each of said CONTROL packets, making a record of all CONTROL packets arriving at each of said third nodes, detecting a spare path section from each of said third nodes to each adjacent node having a bandwidth equal to or greater than the bandwidth indicated by the bandwidth identifier of the received CONTROL packet, and transmitting a copy of each received CONTROL packet to each adjacent node if a spare path section having said bandwidth is detected and if the hop count of the received CONTROL packet is smaller than a prescribed value, each transmitted copy of CONTROL packet containing updated versions of the hop count, node trace data, and copies of the required bandwidth and fault path identifier;

c) responsive to each copy of CONTROL packet arriving at said second node from a given one of said third nodes, transmitting a RETURN packet from said second node to said given third node, said RETURN packet containing a spare path identifier indicating a spare path section located on a route leading to said given third node and forms part of an alternate route, an updated version of the node trace data, and a copy of the fault path identifier;

d) at said given third node, (i) making a record of all RETURN packets arriving at said given third node, (ii) checking the node trace data of each arriving RETURN packets against the node trace data of the received CONTROL packets to detect whether there is a spare path section to an adjacent node located on a route leading to said first terminal node of said subnetwork with a least hop count and forms part of the alternate route, (iii) transmitting a copy of each received RETURN packet from said given third node to said adjacent node if a spare path section is detected, and (iv) or returning a negative acknowledgment packet to said second node if no spare path section is detected, to cause retransmission of a RETURN packet from the second node to another third node, said copy of RETURN packet containing updated versions of the node trace data and spare path section identifier indicating the detected spare path section and a copy of said fault path identifier;

e) at the first terminal node of said subnetwork, responsive to receipt of each copy RETURN packet,
  (i) switching a link of said first terminal node of said subnetwork from said failed regular path to a spare path section indicated by the spare path section identifier of the received copy of RETURN packet, and
  (ii) transmitting therefrom an END packet to said switched spare path section, said END packet containing a fault path identifier indicating the failed regular path of said link and an updated version of the spare path section identifier indicating said switched spare path section;

f) responsive to receipt of each END packet arriving at each of said third nodes located along a route toward said second terminal node of said subnetwork,
  (i) searching through the node trace data of all RETURN packets in said record and detecting a RETURN packet whose fault path identifier is identical to the fault path identifier of the received END packet,
  (ii) establishing a new link through spare path sections respectively indicated by the spare path section identifiers of the detected RETURN packet and the received END packet, and
  (iii) transmitting a copy of the received END packet to an adjacent node on said new link to said second node, said copy of END packet containing copies of the fault path identifier and spare path identifier of the received END packet; and g) at the second terminal node of said subnetwork, responsive to receipt of the copy of END packet, switching a link of said second terminal node of said subnetwork from said failed regular path indicated by the fault path identifier of the received copy of END packet to a spare path section indicated by the spare path section identifier contained therein.

11. A self-healing communications network having a plurality of nodes interconnected by lines having regular and spare channels, two of said nodes functioning as first and second nodes when a line failure occurs on a regular channel interconnecting said first and second nodes, and the other nodes functioning as third nodes and capable of linking spare channels for establishing an alternate route between said first and second nodes, each of said nodes comprising:

means, responsive to the occurrence of said line failure, for transmitting as many CONTROL packets to all adjacent nodes as there are failed regular channels when functioning as said first node, each of said CONTROL packets containing a hop count indicating the number of nodes through which the CONTROL packet has travelled and node trace data indicating identifications of nodes through which the CONTROL packet has travelled, including,
  means for incrementing the hop count of an arriving CONTROL packet,
  means for updating the node trace data of the arriving CONTROL packet,
  means for making a record of all arriving CONTROL packets, and
  means for broadcasting copies of each arriving CONTROL packet to adjacent nodes if the hop count of each arriving CONTROL packet is smaller than a prescribed value;

means, responsive to copies of arriving CONTROL packets from a given adjacent node, for transmitting as many RETURN packets to said given node as there are said arriving CONTROL packets when functioning as said second node, each of said RETURN packets containing a route index number, node trace data indicating identifications of nodes through which the RETURN packet has travelled and a spare channel identifier indicating a spare channel leading to an adjacent node and forms part of an alternate route for one of said failed channels;

means for making a record of all arriving RETURN packets when functioning as one of said third nodes, checking the node trace data of each of the arriving RETURN packets against the node trace data of the received CONTROL packets in said record to detect whether there is a spare channel to an adjacent node located on a route leading to said first node with a least hop count and forms part of said alternate route, transmitting a copy of each received RETURN packet to said adjacent node if a spare channel is detected, and returning a negative acknowledgment packet on a line through which the received RETURN packet was transmitted to cause retransmission of a RETURN packet to another third node if no spare channel is detected, each copy of RETURN packet containing a copy of the route index number, an updated version of the node trace data and an updated version of the spare channel identifier indicating said detected spare channel;

means, responsive to receipt of each copy of RETURN packet when functioning as said first node, for switching a link from one of said failed channels to a spare channel indicated by the channel identifier of the received copy of RETURN packet, and transmitting an END packet in a direction parallel to said switched spare channel, said END packet containing a copy of said route index number, a failed channel identifier indicating the failed channel of said link and a spare channel identifier indicating the switched spare channel;

means, responsive to receipt of said END packet when functioning as one of said third nodes, for making a search through the RETURN packets in said record to detect a RETURN packet having a route index number identical to the route index number of said END packet, establishing a new link through spare channels respectively indicated by the channel identifiers of the received END packet and the detected RETURN packet, and transmitting a copy of the received END packet on the new link to said second node, said copy of END packet containing said failed channel identifier and a copy of the spare channel identifier of the received END packet; and means responsive to receipt of each copy of END packet when functioning as said second node for switching a link from one of the failed channels to a spare channel indicated respectively by the failed channel identifier and the spare channel identifier of the received copy of END packet.

12. A self-healing communications network having a plurality of nodes interconnected by regular and spare channels, two of said nodes acting as first and second nodes when a line failure occurs on a regular channel interconnecting said first and second nodes, and other nodes functioning as third nodes capable of linking spare channels for establishing an alternate route between said first and second nodes, each of said nodes comprising:

means, responsive to the occurrence of said line failure, for transmitting a CONTROL packet to all adjacent nodes when functioning as said first node, said CONTROL packet containing a hop count indicating the number of nodes through which the CONTROL packet has travelled and node trace data indicating identifications of nodes through which the CONTROL packet has travelled, and a spare channel count indicating the number of available spare channels, including;

means for incrementing the hop count of an arriving CONTROL packet, means for updating the node trace data of the arriving CONTROL packet, means for making a record of all arriving CONTROL packets, and means for broadcasting copies of each arriving CONTROL packet to adjacent nodes if the hop count of each arriving CONTROL packet is smaller than a prescribed value;

means, responsive to receipt of said CONTROL packet, when functioning as a third node, for broadcasting as many copies of the received CONTROL packet as there are spare channels indicated by the received CONTROL packet, said copy of said CONTROL packet containing a spare channel count;

means, responsive to each copy of arriving CONTROL packet from a given adjacent node, for transmitting as many RETURN packets to said given node as there are spare channels indicated by the spare channel count of said arriving CONTROL packet when functioning as said second node, each of said RETURN packets containing a route index number, node trace data indicating identifications of nodes through which the RETURN packet has travelled and a spare channel identifier indicating a spare channel which leads to a given third node and forms part of an alternate route for one of said failed channels;

means for making a record of all arriving RETURN packets when functioning as one of said third nodes and checking the node trace data of each of the arriving RETURN packets against the node trace data of the received CONTROL packets in said record to detect whether there is a spare channel to an adjacent node located on a route leading to said first node with a least hop count and forms part of said alternate route, transmitting a copy of each received RETURN packet to said adjacent node if a spare channel is detected, and returning a negative acknowledgment packet on a channel through which the received RETURN packet was transmitted to cause retransmission of a RETURN packet to another third node if no spare channel is detected, each copy of RETURN packet containing a copy of the route index number, an updated version of the node trace data and an updated version of the spare channel identifier indicating said detected spare channel;

means, responsive to receipt of each copy of RETURN packet when functioning as said first node, for switching a link from one of said failed channels to a spare channel indicated by the channel identifier of the received copy of RETURN packet, and transmitting an END packet to said switched spare channel, said END packet containing a copy of said route index number, a failed channel identifier indicating the failed channel of said link and a spare channel identifier indicating the switched spare channel;

means, responsive to receipt of said END packet when functioning as one of said third nodes, for making a search through the RETURN packets in said record to detect a RETURN packet having a route index number identical to the route index number of said END packet, establishing a link between spare channels respectively indicated by the channel identifiers of the received END packet and the detected RETURN packet, and transmitting a copy of the received END packet on said new link to said second node, said copy of END packet containing said failed channel identifier and a copy of the spare channel identifier of the received END packet; and means responsive to receipt of each copy of END packet when functioning as said second node for switching a link from one of the failed channels to a spare channel indicated respectively by the failed channel identifier and the spare channel identifier of the received copy of END packet.

13. A self-healing communications network as claimed in claim 11 or 12, wherein said failed regular channels are assigned different levels of priority, and wherein each of said nodes, when functioning as said first node, switches the link from said failed channel to said spare channel according to the priority assigned to the failed regular channels.

14. A self-healing communications network as claimed in claim 11 or 12, wherein each of said CONTROL packets transmitted from each node when functioning as said first node further contains a fault location identifier indicating the location of said failure in said network for allowing each of said third nodes to discriminate between received packets according to the fault location identifiers of failures which occur simultaneously at different locations of the network.

15. A self-healing communications network as claimed in claim 11 or 12, wherein each of said CONTROL packets transmitted from a node functioning as said first node further contains a priority identifier indicating priority given to each one of said failed regular channels, and each of said RETURN packets transmitted from a node functioning as said second node includes a copy of said priority identifier, wherein each of said nodes when functioning as one of said third nodes, includes means for examining the priority identifier contained in a received RETURN packet if a spare channel indicated by the spare channel identifier of the received RETURN packet is already reserved by a transmitted RETURN packet and returns a negative acknowledgment packet to the node from which the RETURN packet was received to cause retransmission of a RETURN packet to another third node if the priority of said received RETURN packet is lower than the priority of said transmitted RETURN packet.

16. A self-healing communications network as claimed in claim 15, wherein each node, when functioning as said second node, includes means for making a record of all arriving CONTROL packets, making a search through the node trace data of all CONTROL packets in said record in response to said negative acknowledgment packet to detect whether there is a spare channel to an adjacent node located on a route leading to said first node with a least hop count, and transmitting a RETURN packet to said adjacent node containing a spare channel identifier indicating the detected spare channel.

17. A self-healing communications network having a plurality of nodes interconnected by regular and spare paths, two of said nodes functioning as first and second nodes when a line failure occurs on a regular path interconnecting said first and second nodes, and the other nodes functioning as third nodes capable of linking spare paths for establishing an alternate route between said first and second nodes, each of said paths being formed by a series of channels having a different bandwidth, each of said nodes comprising:

means, responsive to occurrence of said line failure, for detecting a spare channel to each adjacent node having a required bandwidth equal to or greater than the bandwidth of one of failed paths when functioning as said first node, and transmitting a CONTROL packet to each adjacent node if a spare channel having said required bandwidth is detected, said CONTROL packet containing a hop count indicating the number of nodes through which the CONTROL packet has travelled, node trace data indicating identifications of nodes through which the CONTROL packet has travelled, a bandwidth identifier indicating said required bandwidth, and a fault path identifier indicating one of said failed path;

means, responsive to receipt of each arriving CONTROL packet when functioning as one of said third nodes, for detecting a spare channel to each adjacent node having a bandwidth equal to or greater than the bandwidth indicated by the bandwidth identifier of the arriving CONTROL packet, including
means for making a record of all arriving CONTROL packets,
means for incrementing the hop count of the arriving CONTROL packet,
means for updating the node trace data of the arriving CONTROL packet,
means for making a record of all arriving CONTROL packets, and
means for retransmitting a copy of each arriving CONTROL packet to adjacent nodes if a spare channel having said required bandwidth is detected and if the hop count of the arriving CONTROL packet is smaller than a prescribed value;

means, responsive to each copy of CONTROL packet arriving at said second node from a given third node when functioning as said second node, for transmitting a RETURN packet to said given third node, said RETURN packet containing a spare channel identifier indicating a spare path which leads to said given third node and forms part of an alternate route, an updated version of the node trace data, and a copy of the fault path identifier;

means for checking the node trace data of each arriving RETURN packets against the node trace data of the arriving CONTROL packets, when functioning as one of said third nodes, to detect whether there is a spare channel to an adjacent node located on a route leading to said first node with a least hop count and forms part of the alternate route, updating the arriving RETURN packet in respect to the node trace data and spare channel identifier so that the spare channel identifier contains the detected spare channel and the fault path identifier thereof is copied, for making a record of all arriving RETURN packets, transmitting the updated packet as a copy of the received RETURN packet to said adjacent node if a spare channel is detected, and returning a negative acknowledgment packet to said second node if no spare channel is detected to cause retransmission of a RETURN packet from the second node to another third node;

means, responsive to receipt of each copy of arriving RETURN packet when functioning as said first node for switching a link from one of said failed paths to a spare channel indicated by the spare channel identifier of the received copy of RETURN packet, and transmitting an END packet to said switched spare path, said END packet containing a fault path identifier indicating the failed path of said link and an updated version of the spare path identifier indicating said switched spare path;

means, responsive to receipt of each arriving END packet when functioning as one of said third nodes located along a route toward said second node, for making a search through the node trace data of all RETURN packets in said record and detecting a RETURN packet whose fault path identifier is identical to the fault path identifier of the received END packet, establishing a new link through spare channels respectively indicated by the spare path identifiers of the detected RETURN packet and the received END packet, and transmitting a copy of the received END packet to an adjacent node on said new link to said second node, said copy of END packet containing copies of the fault path identifier and spare path identifier of the received END packet; and means, responsive to receipt of the copy of END packet when functioning as said second node, for switching a link from one of said failed paths indicated by the fault path identifier of the received copy of END packet to a spare channel indicated by the spare channel identifier contained therein.

18. A self-healing communications network having a plurality of nodes interconnected by lines having regular and spare path sections, there being a plurality of subnetworks each comprising first and second terminal nodes and an intermediate node, the intermediate node providing a link between regular path sections to establish a regular path between said first and second terminal nodes, the nodes of each subnetwork function as third nodes of one or more of the other subnetworks for establishing a link between spare path sections to form an alternate route between the first and second terminal nodes of said other subnetworks, each of said path sections having a different bandwidth, each of said nodes comprising:

means, responsive to occurrence of a line failure on one of the regular path sections of said regular path in one of said subnetworks, for transmitting a RELEASE packet to said intermediate node to cause said intermediate node to clear a link so that another path sections of said regular path is made available for use as a spare path section, detecting a spare path section to each adjacent node having a required bandwidth equal to or greater than the bandwidth of said failed regular path, transmitting a CONTROL packet to each adjacent node if a spare path section having said required bandwidth is detected, said CONTROL packet containing a hop count indicating the number of nodes through which the CONTROL packet has travelled, node trace data indicating identifications of nodes through which the CONTROL packet has travelled, a bandwidth identifier indicating said required bandwidth, and a fault path identifier indicating said failed regular path;

means, responsive to receipt of each arriving CONTROL packet when functioning as one of said third nodes, for making a record of all arriving CONTROL packets, detecting a spare path section to each adjacent node having a bandwidth equal to or greater than the bandwidth indicated by the bandwidth identifier of the arriving CONTROL packet, and transmitting a copy of each received CONTROL packet to each adjacent node if a spare path section having said bandwidth is detected and if the hop count of the received CONTROL packet is smaller than a prescribed value, each transmitted copy of CONTROL packet containing updated versions of the hop count, node trace data, and copies of the required bandwidth and fault path identifier;

means, responsive to each copy of arriving CONTROL packet from a given third node when functioning as said second node, for transmitting a RETURN packet to said given third node, said RETURN packet containing a spare path section identifier indicating a spare path section which leads to said given third node and forms part of an alternate route, an updated version of the node trace data, and a copy of the fault path identifier;

means for checking the node trace data of each arriving RETURN packets against the node trace data of the received CONTROL packets, when functioning as one of said third nodes, to detect whether there is a spare path section to an adjacent node located on a route leading to said first terminal node with a least hop count and forms part of the alternate route, making a record of all arriving RETURN packets, transmitting a copy of each received RETURN packet from said given third node to said adjacent node if a spare path section is detected, and returning a negative acknowledgment packet to a line through which the received RETURN packet was transmitted if no spare path section is detected to cause retransmission of a RETURN packet to another third node, said copy of RETURN packet containing updated versions of the node trace data and spare path section identifier indicating the detected spare path section and a copy of said fault path identifier;

means, responsive to receipt of each copy of arriving RETURN packet when functioning as said first node, for switching a link from said failed regular path to a spare path section indicated by the spare path identifier of the received copy of RETURN packet, and transmitting therefrom an END packet in a direction parallel to said switched spare path section, said END packet containing a fault path identifier indicating the failed regular path of said link and an updated version of the spare path identifier section indicating said switched spare path section;

means, responsive to receipt of each arriving END packet when functioning as one of said third nodes located along a route toward said second terminal node, for making a search through the node trace data of all RETURN packets in said record and detecting a RETURN packet whose fault path identifier is identical to the fault path identifier of the received END packet, establishing a new link through spare path sections respectively indicated by the spare path identifiers section of the detected RETURN packet and the received END packet, and transmitting a copy of the received END packet to an adjacent node on said new link to said second node, said copy of END packet containing copies of the fault path identifier and spare path identifier of the received END packet; and means, responsive to receipt of the copy of arriving END packet when functioning as second node, for switching a link from said failed regular path indicated by the fault path identifier of the received copy of END packet to a spare path section indicated by the spare path identifier section contained therein.

19. A self-healing communication network as claimed in claim 17 or 18, wherein each of said CONTROL packets transmitted from said first node further contains a priority identifier indicating priority given to each one of said failed regular paths, and each of said RETURN packets transmitted from said second node includes a copy of said priority identifier, wherein each of said third nodes includes means for examining the priority identifier contained in a received RETURN packet if a spare path indicated by the spare path identifier of the received RETURN packet is already reserved by a transmitted RETURN packet and returning a negative acknowledgment packet to the node from which the RETURN packet was received to cause retransmission of a RETURN packet to another third node if the priority of said received RETURN packet is lower than the priority of said transmitted RETURN packet.

20. A self-healing communications network as claimed in claim 17 or 18, wherein said second node includes means for making a record of all CONTROL packets received from said third nodes, making a search through the node trace data of all CONTROL packets in said record in response to said negative acknowledgment packet to detect whether there is a spare path to an adjacent node located on a route leading to said first node with a least hop count, and transmitting a RETURN packet to said adjacent node containing a spare path identifier indicating the detected spare path.

21. A self-healing communications network as claimed in claim 19, wherein each of said nodes includes means for transmitting said packets of any type according to the priority identifier of a packet to be transmitted.

22. A failure restoration method for a communications network having first and second nodes and a plurality of third nodes, said first, second and third nodes being interconnected by lines having regular channels and spare channels, said third nodes being located between said first and second nodes, said regular and spare channels terminating at said first and second nodes, the method comprising the steps of:

a) responsive to a failure in regular channels terminating at said first node, transmitting from the first node as many CONTROL packets as there are failed regular channels to adjacent ones of said third nodes;
b) broadcasting copies of a received CONTROL packet from each third node to adjacent nodes;
c) at said second node, responsive to each copy of CONTROL packets arriving thereat, transmitting a RETURN packet therefrom to a given third node;
d) at said given third node, responsive to said RETURN packet,
 (i) determining whether there is a spare channel to an adjacent node located on a route leading to said first node,
 (ii) transmitting a copy of the received RETURN packet to said adjacent node if a spare channel is detected, and
 (iii) returning a negative acknowledgement packet on a line through which said received RETURN packet was transmitted to cause retransmission of a RETURN packet to another third node if no spare channel is detected;
e) at said first node, responsive to receipt of each copy of RETURN packet,
 (i) switching a link of the first node from one of said failed channels to a spare channel extending to said given third node thereby establish a switched channel, and
 (ii) transmitting an END packet to the switched channel;
f) at said given third node, responsive to receipt of said END packet,
 (i) establishing a new link through the switched channel and a spare channel to the second node, and
 (ii) transmitting a copy of the received END packet to said second node through the spare channel of the new link; and
g) at said second node, responsive to receipt of each copy of END packet, switching a link of the second node from a failed channel to the new link.

23. A failure restoration method for a communications network having first and second nodes and a plurality of third nodes, said first, second and third nodes being interconnected by lines having regular channels and spare channels, said third nodes being located between said first and second nodes, said regular and spare channels terminating at said first and second nodes, the method comprising the steps of:
a) transmitting, in response to a failure in regular channels terminating at said first node, a CONTROL packet from said first node to adjacent ones of said third nodes, said CONTROL packet indicating the number of available spare channels;
b) broadcasting copies of a received CONTROL packet from the third node to adjacent nodes each copy of CONTROL packet indicating the number of available spare channels;
c) at said second node, responsive to each copy of CONTROL packet arriving thereat from a given one of said third nodes, transmitting as many RETURN packets from the second node to said given third node as there are available spare channels indicated by the received copy of CONTROL packet;
d) at said given third node,
 (i) determining whether there is a spare channel to an adjacent node located on a route leading to said first node,
 (ii) transmitting a copy of each received RETURN packet to said adjacent node if a spare channel is detected, and
 (iii) returning a negative acknowledgment packet on a line through which said received RETURN packet was transmitted if no spare channel is detected to cause retransmission of a RETURN packet to another third node;
e) at said first node, responsive to receipt of each copy of RETURN packet,
 (i) switching a link from one of said failed channels to a spare channel extending to said given third node to thereby establish a switched channel, and
 (iii) transmitting an END packet to the switched channel;
f) at said given third node, responsive to receipt of said END packet,
 (i) establishing a new link through the switched channel and a spare channel to said second node, and
 (ii) transmitting a copy of the received END packet to the second node through the new link; and
g) at said second node, responsive to receipt of each copy of END packet, switching a link of the second node from a failed channel to the new link.

24. A failure restoration method for a communications network having first and second nodes and a plurality of third nodes, said first, second and third nodes being interconnected by lines having regular channels and spare channels, said third nodes being located between said first and second nodes, said regular and spare channels terminating at said first and second nodes, the method comprising the steps of:
a) transmitting, in response to a failure in regular channels terminating at said first node, as many CONTROL packets as there are failed regular channels from said first node to each adjacent one of said third nodes;
b) at each of said adjacent third nodes, broadcasting copies of a received CONTROL packet therefrom to adjacent nodes;
c) at said second node, responsive to each copy of CONTROL packet arriving thereat, transmitting a RETURN packet therefrom to a given third node, each of said RETURN packets containing a route index number and a spare channel identifier indicating a spare channel which leads to said given third node and forms part of an alternate route to one of said failed channels;
d) at said given third node,
 (i) making a record of all RETURN packets arriving thereat,
 (ii) determining whether there is a spare channel to an adjacent node located on a route leading to said first node,
 (iii) transmitting a copy of each received RETURN packet to said adjacent node if a spare channel is detected, and
 (iv) returning a negative acknowledgment packet on a line through which received RETURN packet was received to cause retransmission of a RETURN packet to another third node if no spare channel is detected, each copy of RE- TURN packet containing a copy of the route index, and a spare channel identifier indicating said detected spare channel;
e) at said first node, responsive to receipt of each copy of RETURN packet,
   (i) switching a link of the first node from one of said failed channels to a spare channel indicated by the channel identifier of the received copy of RETURN packet, and
   (ii) transmitting therefrom an END packet on the indicated spare channel, said END packet containing a copy of said route index number, and a copy of said spare channel identifier;
f) at said given third node, responsive to receipt of said END packet,
   (i) making a search through said record to detect a RETURN packet having a route index number identical to the route index number of said END packet,
   (ii) establishing a new link through spare channels respectively indicated by the spare channel identifiers of the received END packet and the detected RETURN packet, and
   (iii) transmitting a copy of the received END packet through the new link to said second node, said copy of END packet containing a copy of the spare channel identifier of the received END packet; and
g) at said second node, responsive to receipt of each copy of END packet, switching a link of the second node from a failed channel to a spare channel indicated by the spare channel identifier of the received copy of END packet.

25. A failure restoration method for a communications network having first and second nodes and a plurality of third nodes, said first, second and third nodes being interconnected by lines having regular channels and spare channels, said third nodes being located between said first and second nodes, said regular and spare channels terminating at said first and second nodes, the method comprising the steps of:
a) transmitting, in response to a failure in regular channels terminating at said first node, a CONTROL packet therefrom to all adjacent ones of said third nodes, said CONTROL packet indicating the number of available spare channels;
b) at each of said adjacent third nodes, responsive to receipt of a CONTROL packet from the first node, broadcasting copies of the received CONTROL packet therefrom the adjacent nodes, each copy of CONTROL packets indicating the number of available spare channels;
c) at said second node, responsive to receipt of copies of CONTROL packet arriving thereat from a given one of said third nodes, transmitting as many RETURN packets therefrom to said given third node as there are available spare channels indicated by each of the received copies of CONTROL packet, each of said RETURN packets containing a route index number and a spare channel identifier indicating a spare channel which leads to said given third node and forms part of an alternate route for one of said failed channels;
d) at said given third node,
   (i) making a record of all RETURN packets arriving thereat,
   (ii) determining whether there is a spare channel to an adjacent node located on a route leading to said first node,
   (iii) transmitting a copy of each received RETURN packet to said adjacent node if a spare channel is detected, and
   (iv) returning a negative acknowledgement packet on a line through which the received RETURN packet was transmitted if no spare channel is detected to cause retransmission of a RETURN packet to another third node, each copy of RETURN packet containing a copy of the route index number and an updated version of the spare channel identifier indicating said detected spare channel;
e) at said first node, responsive to receipt of each copy of RETURN packet;
   (i) switching a link of the first node from one of said failed channels to a spare channel which is indicated by the spare channel identifier of the received copy of RETURN packet, and
   (ii) transmitting therefrom an END packet on the indicated spare channel, said END packet containing a copy of said route index number and a copy said spare channel identifier of the received RETURN packet;
f) at said given third node, responsive to receipt of said END packet;
   (i) searching through the RETURN packets in said record to detect a RETURN packet having a route index number identical to the route index number of said END packet;
   (ii) establishing a new link through spare channels respectively indicated by the spare channel identifiers of the received END packet and the detected RETURN packet, and
   (iii) transmitting a copy of the received END packet through the new link to said second node, said copy of END packet containing a copy of the spare channel identifier of the received END packet; and
g) at said second node, responsive to receipt of each copy of END packet, switching a link of the second node from a failed channel to a spare channel indicated by the spare channel identifier of the received copy of END packet.

26. A failure restoration method as claimed in claim 22, 23, 24 or 25, wherein said failed regular channels are assigned different levels of priority, and the step (e) includes providing the switching (e) (i) of said link in an order specified by the assigned priority of the failed regular channels.

27. A failure restoration method as claimed in claim 22, 23, 24 or 25, further comprising, at said first node, the steps of inserting into each of said CONTROL packets transmitted therefrom a fault location identifier indicating the location of said failure in said network for allowing each of said third nodes to discriminate between received packets according to different locations of failures which occur simultaneously in the network.

28. A failure restoration method as claimed in claim 22, 23, 24 or 25, further comprising the steps of:
at said first node, inserting, into each of said CONTROL packets transmitted therefrom a priority identifier indicating priority given to each one of said failed regular channels;

at said second node, inserting into each of said RETURN packets transmitted therefrom a copy of said priority identifier; and at each of said third nodes, examining the priority identifier contained in a received RETURN packet if a spare channel indicated by the spare channel identifier of the received RETURN packet is already reserved by a transmitted RETURN packet and returning a negative acknowledgement packet to the node from which the RETURN packet was received to cause retransmission of a RETURN packet to another third node if the priority of said received RETURN packet is lower than the priority of said transmitted RETURN packet.

29. A failure restoration method as claimed in claim 22, 23, 24 or 25, further comprising, at said second node, the steps of:

recording all CONTROL packets received from said third nodes;

searching through the CONTROL packets in said record in response to said negative acknowledgement packet to detect whether there is a spare channel to an adjacent node located on a route leading to said first node with a least hop count; and transmitting a RETURN packet to said adjacent node containing a spare channel identifier indicating the detected spare channel.

30. A failure restoration method for a communications network having first and second nodes and a plurality of third nodes, said first, second and third nodes being interconnected by lines having regular and spare channels, said third nodes being located between said first and second nodes, a series of said channels extending between said first and second node forming a path, the method comprising the steps of:

a) responsive to a failure in said path terminating at said first node;
  (i) detecting a spare channel from said first node to each of adjacent ones of said third nodes having a required bandwidth equal to or greater than the bandwidth of the failed path, and
  (ii) transmitting a CONTROL packet from said first node to each of adjacent third nodes if a spare channel having said required bandwidth is detected, said CONTROL packet containing a bandwidth identifier indicating said required bandwidth and a fault path identifier indicating said failed path;

b) at each of said third nodes, responsive to receipt of each of said CONTROL packets,
  (i) making a record of CONTROL packets,
  (ii) detecting a spare channel extending from each of said third nodes to each adjacent node having a bandwidth equal to or greater than the bandwidth indicated by the bandwidth identifier of the received CONTROL packet, and
  (iii) transmitting a copy of each received CONTROL packet to each adjacent node if a spare channel having said bandwidth is detected, each transmitted copy of CONTROL packet containing copies of the required bandwidth and fault path identifier;

c) at said second node, responsive to each copy of CONTROL packet arriving thereat from a given one of said third nodes, transmitting a RETURN packet from said second node to said given third node, said RETURN packet containing a copy of the fault path identifier;

d) at said given third node, responsive to said RETURN packet,
  (i) determining whether there is a spare channel to an adjacent node located on a route leading to said first node,
  (ii) transmitting a copy of the received RETURN packet from said given third node to said adjacent node if a spare channel is detected, and
  (iii) returning a negative acknowledgement packet on a line through which the received RETURN packet was transmitted if no spare channel is detected to cause retransmission of a RETURN packet to another third node, said copy of RETURN packet containing a copy of said fault path identifier;

e) at said first node, responsive to receipt of each copy of RETURN packet,
  (i) switching a link of the first node from said failed path to a spare channel extending to a third node to thereby establish a switched channel, and
  (ii) transmitting therefrom an END packet to the second node through the switched channel, said END packet containing a fault path identifier indicating the switched channel;

f) at each of said third nodes, responsive to receipt of each END packet arriving thereat,
  (i) establishing a new link through the switched channel and a spare channel to said second node, and
  (ii) transmitting a copy of the received END packet to an adjacent node through said new link to said second node, said copy of END packet containing copies of the fault path identifier; and g) at said second node, responsive to receipt of the copy of END packet, switching a link of the second node from one of said failed paths indicated by the fault path identifier of the received copy of END packet to said new link.

31. A failure restoration method for a communications network having first and second nodes and a plurality of third nodes, said first, second and third nodes being interconnected by lines having regular and spare channels, said third nodes being located between said first and second nodes, a series of said channels forming a path extending between said first and second nodes, the method comprising the steps of:

a) responsive to a failure in said path terminating at said first node,
  (i) detecting a spare channel from said first node to each of adjacent ones of said third nodes having a required bandwidth equal to or greater than the bandwidth of the failed path, and
  (ii) transmitting a CONTROL packet from said first node to each of adjacent third nodes if a spare channel having said required bandwidth is detected, said CONTROL packet containing a bandwidth identifier indicating said required bandwidth, and a fault path identifier indicating said failed path;

b) at each of said third nodes, responsive to receipt of each of said CONTROL packets,
  (i) detecting a spare channel from the third node to each adjacent node having a bandwidth equal to or greater than the bandwidth indicated by the bandwidth identifier of the received CONTROL packet, and (ii) transmitting a copy of each received CONTROL packet to each adjacent node if a spare channel having said bandwidth is detected, each transmitted copy of CONTROL packet containing copies of the required bandwidth and fault path identifier;

c) at said second node, responsive to each copy of CONTROL packet arriving thereat from a given one of said third nodes, transmitting a RETURN packet from said second node to said given third node, said RETURN packet containing a spare channel identifier indicating a spare channel which leads to said given third node and forms part of an alternate path and a copy of the fault path identifier;

d) at said given third node,
 (i) making a record of all RETURN packets arriving thereat,
 (ii) determining whether there is a spare channel to an adjacent node located on a route leading to said first node,
 (iii) transmitting a copy of each received RETURN packet from said given third node to said adjacent node if a spare channel is detected, and
 (iv) returning a negative acknowledgement packet on a line through which the received RETURN packet was transmitted if no spare channel is detected to cause retransmission of a RETURN packet to another third node, said copy of RETURN packet containing a spare path identifier indicating the detected spare channel and a copy of said fault path identifier;

e) at said first node, responsive to receipt of each copy of RETURN packet, switching a link of the first node from said failed path to a spare channel indicated by the spare path identifier of the received copy of RETURN packet, and transmitting therefrom an END packet on the indicated spare channel, said END packet containing a fault path identifier indicating the failed path of said link and a copy of said spare channel identifier;

f) at each of said third nodes located along a route toward said second node, responsive to receipt of each END packet arriving thereat,
 (i) searching through said record to detect a RETURN packet whose fault path identifier is identical to the fault path identifier of the received END packet,
 (ii) establishing a new link through two spare channels respectively indicated by the spare channel identifiers of the detected RETURN packet and the received END packet, and
 (iii) transmitting a copy of the received END packet to an adjacent node through the new link toward said second node, said copy of END packet containing copies of the fault path identifier and spare channel identifier of the received END packet; and g) at said second node, responsive to receipt of the copy of END packet, switching a link of the second node from a failed path indicated by the fault path identifier of the received copy of END packet to a spare channel indicated by the spare channel identifier of the received copy of END packet.

32. A failure restoration method for a communications network having a plurality of nodes interconnected by lines having regular and spare path sections, there being a plurality of subnetworks each comprising first and second terminal nodes and an intermediate node, the intermediate node providing a connection between regular path sections to establish a regular path between said first and second terminal nodes, the nodes of each subnetwork functioning as third nodes of one or more subnetworks for establishing a link between spare path sections to form an alternate path between the first and second terminal nodes of said other subnetworks, each of said path sections having a different bandwidth, comprising the steps of:

a) responsive to a failure in said regular path in one of said subnetworks,
 (i) transmitting a RELEASE packet from one of said terminal nodes of said subnetwork to the intermediate node thereof to clear a connection so that the other path section of said regular path is made available for use as a spare path section,
 (ii) detecting a spare path section from said first terminal node of said subnetwork to each of adjacent ones of said third nodes having a required bandwidth equal to or greater that the bandwidth of said failed regular path, and
 (iii) transmitting a CONTROL packet from said first node to each of adjacent third nodes if a spare path section having said required bandwidth is detected, said CONTROL packet containing a bandwidth identifier indicating said required bandwidth;

b) at each of said third nodes, responsive to receipt of each of said CONTROL packets,
 (i) detecting a spare path section from the third node to each adjacent node having a bandwidth equal to or greater than the bandwidth indicated by the bandwidth identifier of the received CONTROL packet, and
 (ii) transmitting a copy of each received CONTROL packet to each adjacent node if a spare path section having said bandwidth is detected, each transmitted copy of CONTROL packet containing copies of the required bandwidth;

c) at said second node, responsive to each copy of CONTROL packet arriving thereat from a given one of said third nodes, transmitting a RETURN packet from said second node to said given third node, said RETURN packet containing a spare path-section identifier indicating a spare path section located on a route leading to said given third node;

d) at said given third node, responsive to receipt of said RETURN packet,
 (i) determining whether there is a spare path section to an adjacent node located on a route leading to said first terminal node of said subnetwork, and
 (ii) transmitting a copy of each received RETURN packet from said given third node to said adjacent node if a spare path section is detected,
 (iii) returning a negative acknowledgement packet on a line through which the received RETURN packet was received if no spare path section is detected to cause retransmission of RETURN packet to another third node, said copy of RETURN packet containing a spare path section identifier indicating the detected spare path section;

e) at said first terminal node of said subnetwork, responsive to receipt of each copy of RETURN packet, (i) switching a link of the first terminal node from said failed regular path to a spare path section indicated by the spare path section identifier of the received copy of RETURN packet, and (ii) transmitting therefrom an END packet on the indicated spare path section;

f) at each of said third nodes located along a route toward said second terminal node of said subnetwork, responsive to receipt of each END packet arriving thereat, (i) establishing a new link through said indicated spare path section and a spare path section to said second node, and (ii) transmitting a copy of the received END packet to an adjacent node located on a route toward said second node; and g) at said second terminal node of said subnetwork, responsive to receipt of the copy of END packet, switching a link of the second terminal node from a failed regular path to said new link.

33. A failure restoration method as claimed in claim 30, 31, or 32, further comprising the steps of:

at said first node, inserting into each of said CONTROL packets transmitted therefrom a priority identifier indicating priority given to each one of said failed regular paths;

at said second node, inserting into each of said RETURN packets transmitted therefrom a copy of said priority identifier;

at each of said third nodes, examining the priority identifier contained in a received RETURN packet if a spare channel indicated by a received RETURN packet is already reserved by a transmitted RETURN packet and returning a negative acknowledgement packet to the node form which the RETURN packet was received to cause retransmission of a RETURN packet to another third node if the priority of said received RETURN packet is lower than the priority of said transmitted RETURN packet.

34. A failure restoration method as claimed in claim 30, 31 or 32, further comprising, at said second node, the steps of:

recording all CONTROL packets received from said third nodes;

searching through all CONTROL packets in said record in response to said negative acknowledgement packet to detect whether there is a spare channel to an adjacent node located on a route leading to said first node with a least count of intervening nodes; and transmitting a RETURN packet to an adjacent node indicating the detected spare channel.

35. A failure restoration method as claimed in claim 22, 23, 24, 25, 30, 31, or 32, further comprising the steps of:

at each of said first, second and third nodes, inserting into each of said CONTROL packets a hop count indicating the number of nodes through which the CONTROL packet has travelled; and at each of said third nodes;

examining each of said CONTROL packets, broadcasting said copies of the CONTROL packet if the hop count of the received CONTROL packet is smaller than a predetermined value, inserting an incremented hop count into each copy of the broadcast CONTROL packet, making a record of all CONTROL packets arriving thereat, searching through said record in response to receipt of a RETURN packet for detecting a CONTROL packet having a least hop count along a route having a spare channel, and transmitting a copy of the received RETURN packet on said route.

36. A failure restoration method as claimed in claim 22, 23, 24, 25, 30, 31, or 32, further comprising the steps of:

at each of said first and third nodes, inserting node trace data into each of said CONTROL packets, the node trace data identifying the nodes through which the CONTROL packet has travelled;

at each of said second and third nodes, inserting node trace data into each of said RETURN packets, the node trace data identifying the nodes through which the RETURN packet has travelled; and at each of said third nodes, updating the node trace data of a received packet and transmitting a copy of the received packet to those third nodes which are not indicated in the node trace data of the received packet.

37. A failure restoration method as claimed in claims 22, 23, 24, 25, 30, or 31, wherein the step (d) further comprising the step of inserting to said RETURN packet a reserved channel identifier indicating that a spare channel of a transmission line through which the RETURN packet is sent is reserved to prevent the spare channel from being accessed by other packets.

38. A self-healing communications network having a plurality of nodes interconnected by lines having regular and spare channels, two of said nodes acting as first and second nodes when a failure occurs on a regular channel interconnecting said first and second nodes, and the other nodes functioning as third nodes capable of linking spare channels for establishing an alternate route between said first and second nodes, each of said nodes comprising:

means, used when functioning as said first node and responsive to a failure in regular channels terminating at said first node, for transmitting from the first node as many CONTROL packets as there are failed regular channels to adjacent third nodes;

means, used when functioning as one of said third nodes, for broadcasting copies of a received CONTROL packet to adjacent nodes;

means, used when functioning as said second node and responsive to receipt of each copy of CONTROL packet, for transmitting a RETURN packet to a given third node;

means, used when functioning as one of said third nodes, responsive to the RETURN packet, for checking the RETURN packet to determine whether there is a spare channel to an adjacent node located on a route leading to said first node, transmitting a copy of the received RETURN packet to said adjacent node if a spare channel is detected and returning a negative acknowledgement packet on a line through which said received RETURN packet was transmitted to cause retransmission of a RETURN packet to another third node if no spare channel is detected;

means, used when functioning as said first node and responsive to receipt of each copy of RETURN packet, for switching a link of the first node from one of said failed channels to a spare channel extending to said given third node to thereby establish a switched channel, and transmitting an END packet to the switched channel;

means, used when functioning as said given third node and responsive to receipt of said END packet, for establishing a new link through the switched channel and a spare channel to the second node, and transmitting a copy of the received END packet to said second node through the spare channel of the new link; and means, used when functioning as said second node and responsive to receipt of each copy of END packet, for switching a link of the second node from a failed channel to the new link.

39. A self-healing communications network having a plurality of nodes interconnected by lines having regular and spare channels, two of said nodes functioning as first and second nodes when a failure occurs on a regular channel interconnecting said first and second nodes, and the other nodes functioning as third nodes capable of linking spare channels for establishing an alternate route between said first and second nodes, each of said nodes comprising:

means, used when functioning as said first node and responsive to a failure in regular channels terminating at said first node, for transmitting a CONTROL packet to adjacent ones of said third nodes, said CONTROL packet indicating the number of available spare channels;

means, used when functioning as one of said third nodes, for broadcasting as many copies of a received CONTROL packet to adjacent nodes as there are spare channels indicated by the received CONTROL packet, each copy of CONTROL packet indicating the number of available spare channels;

means, used when functioning as said second node and responsive to each copy of CONTROL packet from a given one of said third nodes, for transmitting as many RETURN packets to said given third node as there are available spare channels indicated by the received copy of CONTROL packet;

means, used when functioning as one of said third nodes, for checking each of the RETURN packets to determine whether there is a spare channel to an adjacent node located on a route leading to said first node, and transmitting a copy of each received RETURN packet to said adjacent node if a spare channel is detected, and returning a negative acknowledgment packet on a line through which said received RETURN packet was transmitted if no spare channel is detected to cause retransmission of a RETURN packet to another third node;

means, used when functioning as said first node and responsive to receipt of each copy of RETURN packet, for switching a link from one of said failed channels to a spare channel extending to said given third node to thereby establish a switched channel, and transmitting an END packet to the switched spare channel;

means, used when functioning as said given third node and responsive to receipt of said END packet, for establishing a new link through the switched spare channel and a spare channel to said second node, and transmitting a copy of the received END packet to the second node through the spare channel of the new link; and means, used when functioning as said second node and responsive to receipt of each copy of END packet, for switching a link of the second node from a failed channel to the new link.

40. A self-healing communications network having a plurality of nodes interconnected by lines having regular and spare channels, two of said nodes functioning as first and second nodes when a failure occurs on a regular channel interconnecting said first and second nodes, and the other nodes functioning as third nodes and capable of linking spare channels for establishing an alternate route between said first and second nodes, each of said nodes comprising:

means, active when functioning as said first node and responsive to a failure in regular channels terminating as said first node, for transmitting as many CONTROL packets as there are failed regular channels from said first node to each adjacent one of said third nodes;

means, active when functioning as each of said adjacent third nodes, for broadcasting copies of a received CONTROL packet to adjacent nodes;

means, active when functioning as said second node and responsive to each copy of CONTROL packet, for transmitting a RETURN packet to a given third node, each of said RETURN packets containing a route index number and a spare channel identifier indicating a spare channel which leads to said given third node and forms part of an alternate route to one of said failed channels;

means, active when functioning as said given third node, for making a record of all RETURN packets arriving thereat to determine whether there is a spare channel to an adjacent node located on a route leading to said first node, transmitting a copy of each received RETURN packet to said adjacent node if a spare channel is detected and returning a negative acknowledgement packet on a line through which received RETURN packet was received to cause retransmission of a RETURN packet to another third node if no spare channel is detected, each copy of RETURN packet containing a copy of the route index number, and a spare channel identifier indicating said detected spare channel;

means, active when functioning as said first node and responsive to receipt of each copy of RETURN packet, for switching a link of the first node from one of said failed channels to a spare channel indicated by the channel identifier of the received copy of RETURN packet, and transmitting therefrom an END packet on the indicated spare channel, said END packet containing a copy of said route index number, and a copy of said spare channel identifier;

means, active when functioning as said given third node and responsive to receipt of said END packet, for searching through said record to detect a RETURN packet having a route index number identical to the route index number of said END packet, establishing a new link through spare channels respectively indicated by the spare channel identifiers of the received END packet and the detected RETURN packet, and transmitting a copy of the received END packet through the new link to said second node, said copy of END packet containing a copy of the spare channel identifier of the received END packet; and means, active when functioning as said second node and responsive to receipt of each copy of END packet, for switching a link of the second node from a failed channel to a spare channel indicated by the spare channel identifier of the received copy of END packet.

41. A self-healing communications network having a plurality of nodes interconnected by lines having regular and spare channels, two of said nodes functioning as first and second nodes when a failure occurs on a regular channel interconnecting said first and second nodes, and the other nodes functioning as third nodes capable of linking spare channels for establishing an alternate route between said first and second nodes, each of said nodes comprising:

means, active when functioning as said first node, and transmitting, in response to a failure in regular channels terminating at said first node, a CONTROL packet therefrom to all adjacent ones of said third nodes, said CONTROL packet indicating the number of available spare channels;

means, active when functioning as said adjacent third nodes and responsive to receipt of a CONTROL packet from the first note, for broadcasting copies of a received CONTROL packet therefrom to adjacent nodes, each copy of CONTROL packets indicating the number of available spare channels;

means, active when functioning as said second node and responsive to receipt of copies of CONTROL packet arriving thereat from a given one of said third nodes, for transmitting as many RETURN packets therefrom to said given third node as there are available spare channels indicated by each of the received copies of CONTROL packet, each of said RETURN packets containing a route index number and a spare channel identifier indicating a spare channel which leads to said given third node and forms part of an alternate route for one of said failed channels;

means, active when functioning as said given third node, for making a record of all RETURN packets arriving thereat, determining whether there is a spare channel to an adjacent node located on a route leading to said first node, transmitting a copy of each received RETURN packet to said adjacent node if a spare channel is detected, and returning a negative acknowledgment packet on a line through which the received RETURN packet was transmitted if no spare channel is detected to cause retransmission of a RETURN packet to another third node, each copy of RETURN packet containing a copy of the route index number and an updated version of the spare channel identifier indicating said detected spare channel;

means, active when functioning as said first node and responsive to receipt of each copy of RETURN packet, for switching a link of the first node from one of said failed channels to a spare channel which is indicated by the spare channel identifier of the received copy of RETURN packet, and transmitting therefrom an END packet on the indicated spare channel, said END packet containing a copy of said route index number and a copy of said spare channel identifier of the received RETURN packet;

means, active when functioning as said given third node and responsive to receipt of said END packet, for searching through the RETURN packets in said record to detect a return packet having a route index number identical to the route index number of said END packet, establishing a new link through spare channels respectively indicated by the spare channel identifiers of the received END packet and the detected return packet through the new link to said second node, said copy of END packet containing a copy of the spare channel identifier of the received END packet; and means, active when functioning as said second node and responsive to receipt of each copy of END packet, for switching a link of the second node from a failed channel to a spare channel indicated by the spare channel identifier of the received copy of END packet.

42. A self-healing communications network as claimed in claim 38, 39, 40 or 41, wherein said failed regular channels are assigned different levels of priority, and wherein said means active when functioning as said first node includes means for switching the link of the first node in an order specified by the assigned priority of the failed regular channels.

43. A self-healing communications network as claimed in claim 38, 39, 40 or 41, wherein:

said means, active when functioning as said first node, includes means for inserting into each of said CONTROL packets transmitted therefrom a fault location identifier indicating the location of said failure in said network; and said means, active when functioning as one of said third nodes, includes means for discriminating between received packets according to said fault location identifier of each of the received packets.

44. A self-healing communications network as claimed in claim 38, 39, 40 or 41, wherein:

said means, active when functioning as said first node, includes means for inserting into each of said CONTROL packets transmitted therefrom a priority identifier indicating priority given to each one of said failed regular channels;

said means, active when functioning as said second node, includes means for inserting into each of said RETURN packets transmitted therefrom a copy of said priority identifier; and said means, active when functioning as one of said third nodes, for examining the priority identifier contained in a received RETURN packet if a spare channel indicated by the spare channel identifier of the received RETURN packet is already reserved by a transmitted RETURN packet and returning a negative acknowledgment packet to the node from which the RETURN packet was received to cause retransmission of a RETURN packet to another third node if the priority of said received RETURN packet is lower than the priority of said transmitted RETURN packet.

45. A self-healing communications network as claimed in claim 38, 39, 40 or 41, wherein said means, active when functioning as said second node, further includes:

means for making a record of all CONTROL packets received from said third nodes;

means for making a search through the CONTROL packets in said record in response to said negative acknowledgment packet to detect whether there is a spare channel to an adjacent node located on a route leading to said first node with a least hop count; and means for transmitting a RETURN packet to said adjacent node containing a spare channel identifier indicating the detected spare channel.

46. A self-healing communications network having a plurality of nodes interconnected by lines having regular and spare channels, two of said nodes functioning as first and second nodes, and the other nodes functioning as third nodes capable of linking spare channels for establishing an alternate route between said first and second nodes, a series of said channels extending between said first and second nodes forming a path, each of said nodes comprising:

means, active when functioning as said first node and responsive to a failure in said path terminating at said first node, for detecting a spare channel from said first node to each of adjacent ones of said third nodes having a required bandwidth equal to or greater than the bandwidth of the failed path, and transmitting a CONTROL packet from said first node to each of adjacent third nodes if a spare channel having said required bandwidth is detected, said CONTROL packet containing a bandwidth identifier indicating said required bandwidth and a fault path identifier indicating said failed path;

means, active when functioning as each of said third nodes and responsive to receipt of each of said CONTROL packets, for making a record of CONTROL packets, detecting a spare channel extending from each of said third nodes to each adjacent node having a bandwidth equal to or greater than the bandwidth indicated by the bandwidth identifier of the received CONTROL packet, and transmitting a copy of each received CONTROL packet to each adjacent node if a spare channel having said bandwidth is detected, each transmitted copy of control packet containing copies of the required bandwidth and fault path identifier;

means, active when functioning as said second node and responsive to each copy of CONTROL packet arriving thereat from a given one of said third nodes, transmitting a RETURN packet from said second node to said given third node, said RETURN packet containing a copy of the fault path identifier;

means, active when functioning as said given third node and responsive to said RETURN packet for determining whether there is a spare channel to an adjacent node located on a route leading to said first node, transmitting a copy of the received RETURN packet to said adjacent node if a spare channel is detected, and returning a negative acknowledgment packet on a line through which the received RETURN packet was transmitted if no spare channel is detected to cause retransmission of a RETURN packet to another third node, said copy of RETURN packet containing a copy of said fault path identifier;

means, active when functioning as said first node and responsive to receipt of each copy of RETURN packet, for switching a link of the first node from said failed path to a spare channel extending to a third node to thereby establish a switched channel, and transmitting therefrom an END packet to the second node through the switched channel, said END packet containing a fault path identifier indicating the switched channel;

means, active when functioning as each of said third nodes and responsive to receipt of each END packet, for establishing a new link through the switched channel and a spare channel to said second node, and transmitting a copy of the received END packet to an adjacent node through said new link to said second node, said copy of END packet containing copies of the fault path identifier; and means, active when functioning as said second node and responsive to receipt of the copy of END packet, for switching a link of the second node from one of said failed paths indicated by the fault path identifier of the received copy of END packet to said new link.

47. A self-healing communications network having a plurality of nodes interconnected by lines having regular and spare channels, two of said nodes functioning as first and second nodes when a failure occurs on a regular channel interconnecting said first and second nodes, and the other nodes functioning as third nodes and capable of linking spare channels for establishing an alternate route between said first and second nodes, a series of said channels extending between said first and second nodes forming a path, each of said nodes comprising:

means, active when functioning as said first node and responsive to a failure in said path terminating at said first node, for detecting a spare channel from said first node to each of adjacent ones of said third nodes having a required bandwidth equal to or greater than the bandwidth of the failed path, and transmitting a CONTROL packet from said first node to each of adjacent third nodes if a spare channel having said required bandwidth is detected, said CONTROL packet containing a bandwidth identifier indicating said required bandwidth, and a fault path identifier indicating said failed path;

means, active when functioning as one of said third nodes and responsive to receipt of each of said CONTROL packets, for detecting a spare channel from the third node to each adjacent node having a bandwidth equal to or greater than the bandwidth indicated by the bandwidth identifier of the received CONTROL packet, and transmitting a copy of each received CONTROL packet to each adjacent node if a spare channel having said bandwidth is detected, each transmitted copy of CONTROL packet containing copies of the required bandwidth and fault path identifier;

means, active when functioning as said second node and responsive to each copy of CONTROL packet arriving thereat from a given one of said third nodes, for transmitting a RETURN packet from said second node to said given third node, said RETURN packet containing a spare channel identifier indicating a spare channel which leads to said given third node and forms part of an alternate path and a copy of the fault path identifier;

means, active when functioning as said given third node, for making a record of all RETURN packets arriving thereat, determining whether there is a spare channel to an adjacent node located on a route leading to said first node, transmitting a copy of each received RETURN packet from said given third node to said adjacent node if a spare channel is detected, and returning a negative acknowledgment packet on a line through which the received RETURN packet was transmitted if no spare channel is detected to cause retransmission of a RETURN packet to another third node, said copy of RETURN packet containing a spare path identifier indicating the detected spare channel and a copy of said fault path identifier;

means, active when functioning as said first node and responsive to receipt of each copy of RETURN packet, for switching a link of the first node from said failed path to a spare channel indicated by the spare path identifier of the received copy of RETURN packet, and transmitting therefrom an END packet on the indicated spare channel, said END packet containing a fault path identifier indicating the failed path of said link and a copy of said spare channel identifier;

means, active when functioning as said first node and responsive to receipt of each copy of RETURN packet, for switching a link of the first node from said failed path to a spare channel indicated by the spare path identifier of the received copy of RETURN packet, and transmitting therefrom an END packet on the indicated spare channel, said END packet containing a fault path identifier indicating the failed path of said link and a copy of said spare channel identifier;

means, active when functioning as one of said third nodes located along a route toward said second node and responsive to receipt of each END packet arriving thereat, for searching through said record to detect a RETURN packet whose fault path identifier is identical to the fault path identifier of the received END packet, establishing a new link through two spare channels respectively indicated by the spare channel identifiers of the detected RETURN packet and the received END packet, and transmitting a copy of the received END packet to an adjacent node through the new link toward said second node, said copy of END packet containing copies of the fault path identifier and spare channel identifier of the received END packet; and means, active when functioning as said second node and responsive to receipt of the copy of END packet, for switching a link of the second node from a failed path indicated by the fault path identifier of the received copy of END packet to a spare channel indicated by the spare channel identifier of the received copy of the END packet.

48. A self-healing communications network having a plurality of nodes interconnected by lines having regular and spare path sections, there being a plurality of subnetworks each comprising first and second terminal nodes and an intermediate node, the intermediate node providing a connection between regular path sections to establish a regular path between said first and second terminal nodes, the nodes of each subnetwork functioning as third nodes of one or more other subnetworks for establishing a link between spare path sections to form an alternate path between the first and second terminal nodes of said other subnetworks, each of said path sections having a different bandwidth, comprising:

means, active when functioning as said first node and responsive to a failure in said regular path in one of said subnetworks, transmitting a RELEASE packet from one of said terminal nodes of said subnetwork to the intermediate node thereof to clear a connection so that the other path section of said regular path is made available for use as a spare path section, detecting a spare path section from said first terminal node of said subnetwork to each of adjacent ones of said third nodes having a required bandwidth equal to or greater than the bandwidth of said failed regular path, transmitting a CONTROL packet from said first node to each of adjacent third nodes if a spare path section having said required bandwidth is detected, said CONTROL packet containing a bandwidth identifier indicating said required bandwidth;

means, active when functioning as one of said third nodes and responsive to receipt of each of said CONTROL packets, detecting a spare path section from the third node to each adjacent node having a bandwidth equal to or greater than the bandwidth indicated by the bandwidth identifier of the received CONTROL packet, and transmitting a copy of each received CONTROL packet to each adjacent node if a spare path section having said bandwidth is detected and each transmitted CONTROL packet containing copies of the required bandwidth;

means, active when functioning as said second node and responsive to each copy of CONTROL packet arriving thereat from a given one of said third nodes, for transmitting a RETURN packet from said second node to said given third node, said RETURN packet containing a spare path-section identifier indicating a spare path section located on a route leading to said given third node;

means, active when functioning as said given third node and responsive to receipt of said RETURN packet, for determining whether there is a spare path section to an adjacent node located on a route leading to said first terminal node of said subnetwork, transmitting a copy of each received RETURN packet from said given third node to said adjacent node if a spare path section is detected, and returning a negative acknowledgment packet on a line through which the received RETURN packet was received if no spare path section is detected to cause retransmission of a RETURN packet to another third node, said copy of RETURN packet containing a spare path section identifier indicating the detected spare path section;

means, active when functioning as said first terminal node of said subnetwork and responsive to receipt of each copy of RETURN packet, for switching a link of the first terminal node from said failed regular path to a spare path section indicated by the spare path-section identifier of the received copy of RETURN packet, and transmitting therefrom an END packet on the indicated spare path section;

means, active when functioning as one of said third nodes located along a route toward said second terminal node of said subnetwork and responsive to receipt of each END packet arriving thereat, for establishing a new link through said indicated spare path section and a spare path section to said second node, and transmitting a copy of the received END packet to an adjacent node located on a route toward said second node; and means, active when functioning as said second terminal node of said subnetwork and responsive to receipt of the copy of END packet, for switching a link of the second terminal node from a failed regular path to said new link.

49. A self-healing communications network as claimed in claim 46, 47 or 48, wherein:
   said means, active when functioning as said first node, includes means for inserting into each of said CONTROL packets transmitted therefrom a priority identifier indicating priority given to each one of said failed regular paths;
   said means, active when functioning as said second node, including means for examining the priority identifier contained in a received RETURN packet if a spare channel indicated by a received RETURN packet is already reserved by a transmitted RETURN packet and returning a negative acknowledgment packet to the node from which the RETURN packet was received to cause retransmission of a RETURN packet to another third node if the priority of said received RETURN packet is lower than the priority of said transmitted RETURN packet.

50. A self-healing communications network as claimed in claim 46, 47 or 48, wherein said means, active when functioning as said second mode, includes:
   means for making a record of all CONTROL packets received from said third nodes;
   means for searching through all CONTROL packets in said record in response to said negative acknowledgment packet to detect whether there is a spare channel to an adjacent node located on a route leading to said first node with a least count of intervening nodes; and
   means for transmitting a RETURN packet to an adjacent node indicating the detecting spare channel.

51. A self-healing communications network as claimed in claim 38, 39, 40, 41, 46, 47 or 48, wherein:
   said means, active when functioning as any one of said first, second and third nodes, includes means for inserting into each of said CONTROL packets a hop count indicating the number of nodes through which the CONTROL packet has travelled; and
   said means, active when functioning as one of said third nodes, includes:
      means for examining each of said CONTROL packets and broadcasting said copies of the CONTROL packet if the hop count of the received CONTROL packet is smaller than a predetermined value,
      means for inserting an incremented hop count into each of the broadcast CONTROL packet,
      means for making a record of all CONTROL packets arriving thereat,
      means for searching through said record in response to receipt of a RETURN packet for detecting a CONTROL packet having a least hop count along a route having a spare channel, and
      means for transmitting a copy of the received RETURN packet on said route.

52. A self-healing communications network as claimed in claim 38, 39, 40, 41, 46, 47 or 48, wherein:
   said means, active when functioning as said first node, includes means for inserting node trace data into each of said CONTROL packets, the node trade data identifying the nodes through which the CONTROL packet has travelled;
   said means, active when functioning as said second node, including means for inserting node trade data into each of said RETURN packets, the node trace data identifying the nodes through which the RETURN packet has travelled,
   said means, active when functioning as one of said third nodes, including means for updating the node trade data of a received packet and transmitting a copy of the received packet to those third nodes which are not indicated in the node trace data of the received packet.

* * * * *

UNITED STATES PATENT AND TRADEMARK OFFICE
CERTIFICATE OF CORRECTION

PATENT NO.   :  5,235,599
DATED        :  August 10, 1993
INVENTOR(S)  :  Nishimura, et al.

It is certified that error appears in the above-indentified patent and that said Letters Patent is hereby corrected as shown below:

Title page, item
[30]   Foreign Application Priority Data -- insert--

```
Jul. 26, 1989  [JP]  Japan...............1-194969
Sep. 29, 1989  [JP]  Japan...............1-254114
Jul.  5, 1990  [JP]  Japan...............2-178131
```

Signed and Sealed this

Nineteenth Day of July, 1994

*Attest:*

BRUCE LEHMAN

*Attesting Officer*     Commissioner of Patents and Trademarks